(12) United States Patent
Asenjo et al.

(10) Patent No.: US 10,564,633 B2
(45) Date of Patent: *Feb. 18, 2020

(54) USING CLOUD-BASED DATA FOR VIRTUALIZATION OF AN INDUSTRIAL AUTOMATION ENVIRONMENT WITH INFORMATION OVERLAYS

(71) Applicant: Rockwell Automation Technologies, Inc., Mayfield Heights, OH (US)

(72) Inventors: Juan Asenjo, Timberlake, OH (US); John Strohmenger, Strongsville, OH (US); Stephen Nawalaniec, Southlake, TX (US); Bradford H. Hegrat, Montville, OH (US); Joseph A. Harkulich, Willoughby, OH (US); Jessica Lin Korpela, Milwaukee, WI (US); Jenifer Rydberg Wright, Renton, WA (US); Rainer Hessmer, Rancho Santa Margarita, CA (US); John Dyck, Chardon, OH (US); Edward Alan Hill, Chagrin Falls, OH (US); Sal Conti, Olmsted Township, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 108 days.

This patent is subject to a terminal disclaimer.

(21) Appl. No.: 15/621,206

(22) Filed: Jun. 13, 2017

(65) Prior Publication Data

US 2017/0277171 A1    Sep. 28, 2017

Related U.S. Application Data

(63) Continuation of application No. 14/088,014, filed on Nov. 22, 2013, now Pat. No. 9,709,978.

(Continued)

(51) Int. Cl.
*G05B 19/418* (2006.01)
*G06Q 10/06* (2012.01)
(Continued)

(52) U.S. Cl.
CPC ......... *G05B 19/4185* (2013.01); *G06F 3/048* (2013.01); *G06Q 10/06* (2013.01); *G05B 23/0272* (2013.01); *Y02P 90/86* (2015.11)

(58) Field of Classification Search
CPC . G05B 19/4185; G05B 23/0272; G06F 3/048; G06Q 10/06; Y02P 90/86
See application file for complete search history.

(56) References Cited

U.S. PATENT DOCUMENTS

| 5,014,317 A | 5/1991 | Kita et al. |
| 5,122,948 A | 6/1992 | Zapolin |

(Continued)

FOREIGN PATENT DOCUMENTS

| CN | 1232553 A | 10/1999 |
| CN | 1529837 A | 9/2004 |

(Continued)

OTHER PUBLICATIONS

Office Action for European Patent Application Serial No. 16160604.1-1802, dated May 17, 2017, 6 pages.

(Continued)

*Primary Examiner* — Michael J Huntley
(74) *Attorney, Agent, or Firm* — Amin, Turocy & Watson, LLP

(57) ABSTRACT

A cloud-based virtualization generation service collects industrial data from multiple industrial automation systems of multiple industrial customers for storage and analysis on a cloud platform. A virtualization management component (VMC) generates a virtualized industrial automation system of an industrial automation system based on data analysis (Continued)

results. The VMC facilitates remotely controlling the industrial automation system based on user interactions with the virtualized industrial automation system, and updates the virtualized industrial automation system based on collected data relating to the industrial automation system. The VMC customizes a user's view of the virtualized industrial automation system based on a user's role, authorization, location, or preferences, wherein different views of the virtualized industrial automation system with different data overlays are presented on different communication devices of different users. The VMC enables a user to filter data of a virtualized view and share information, including virtual notes, with other users.

20 Claims, 26 Drawing Sheets

Related U.S. Application Data

(60) Provisional application No. 61/821,639, filed on May 9, 2013.

(51) Int. Cl.
*G06F 3/048* (2013.01)
*G05B 23/02* (2006.01)

(56) References Cited

U.S. PATENT DOCUMENTS

| | | | |
|---|---|---|---|
| 5,199,009 A | 3/1993 | Svast | |
| 5,598,572 A * | 1/1997 | Tanikoshi | G05B 19/042 |
| | | | 712/30 |
| 5,611,059 A | 3/1997 | Benton et al. | |
| 5,612,869 A | 3/1997 | Letzt et al. | |
| 5,682,460 A | 10/1997 | Hyziak et al. | |
| 5,710,885 A | 1/1998 | Bondi | |
| 5,844,794 A | 12/1998 | Keeley | |
| 5,845,149 A | 12/1998 | Husted et al. | |
| 5,856,931 A | 1/1999 | McCasland | |
| 5,957,985 A | 9/1999 | Wong et al. | |
| 5,966,301 A | 10/1999 | Cook et al. | |
| 5,970,430 A | 10/1999 | Burns et al. | |
| 5,978,568 A | 11/1999 | Abraham et al. | |
| 6,167,337 A | 12/2000 | Haack et al. | |
| 6,175,770 B1 | 1/2001 | Bladow | |
| 6,175,801 B1 * | 1/2001 | Millington | G01C 21/3664 |
| | | | 701/428 |
| 6,199,068 B1 | 3/2001 | Carpenter | |
| 6,279,113 B1 | 8/2001 | Vaidya | |
| 6,282,455 B1 * | 8/2001 | Engdahl | G05B 19/4184 |
| | | | 434/72 |
| 6,324,607 B1 | 11/2001 | Korowitz et al. | |
| 6,381,502 B1 | 4/2002 | Rudder et al. | |
| 6,400,996 B1 | 6/2002 | Hoffberg et al. | |
| 6,412,032 B1 | 6/2002 | Neet et al. | |
| 6,437,692 B1 | 8/2002 | Petite et al. | |
| 6,457,024 B1 | 9/2002 | Felsentein et al. | |
| 6,463,338 B1 | 10/2002 | Neet | |
| 6,466,972 B1 | 10/2002 | Paul et al. | |
| 6,535,926 B1 | 3/2003 | Esker | |
| 6,578,005 B1 | 6/2003 | Lesaint et al. | |
| 6,624,388 B1 | 9/2003 | Blankenship et al. | |
| 6,640,145 B2 | 10/2003 | Hoffberg et al. | |
| 6,651,062 B2 | 11/2003 | Ghannam et al. | |
| 6,675,226 B1 | 1/2004 | Nair et al. | |
| 6,686,838 B1 | 2/2004 | Rezvani et al. | |
| 6,691,159 B1 | 2/2004 | Grewal et al. | |
| 6,705,229 B2 | 3/2004 | Frankenberger | |
| 6,708,074 B1 | 3/2004 | Chi et al. | |
| 6,708,385 B1 | 3/2004 | Lemelson | |
| 6,714,974 B1 | 3/2004 | Machida | |
| 6,728,262 B1 | 4/2004 | Woram | |
| 6,732,165 B1 | 5/2004 | Jennings, III | |
| 6,732,191 B1 | 5/2004 | Baker et al. | |
| 6,774,598 B1 | 8/2004 | Kohler et al. | |
| 6,801,920 B1 | 10/2004 | Wischinski | |
| 6,819,960 B1 | 11/2004 | McKelvey et al. | |
| 6,891,850 B1 | 5/2005 | Vandesteeg et al. | |
| 6,895,532 B2 | 5/2005 | Raynham | |
| 6,904,600 B1 | 6/2005 | James et al. | |
| 6,907,302 B2 | 6/2005 | Karbassi | |
| 6,920,502 B2 | 7/2005 | Araujo et al. | |
| 6,952,680 B1 | 10/2005 | Melby et al. | |
| 6,965,802 B2 | 11/2005 | Sexton | |
| 6,968,242 B1 | 11/2005 | Hwu et al. | |
| 6,970,913 B1 | 11/2005 | Albert et al. | |
| 6,982,953 B1 | 1/2006 | Swales | |
| 7,032,045 B2 | 4/2006 | Kostadinov | |
| 7,085,814 B1 | 8/2006 | Gandhi et al. | |
| 7,103,428 B2 | 9/2006 | Varone et al. | |
| 7,133,900 B1 | 11/2006 | Szeto | |
| 7,149,792 B1 | 12/2006 | Hansen et al. | |
| 7,151,966 B1 | 12/2006 | Baier et al. | |
| 7,203,560 B1 | 4/2007 | Wylie et al. | |
| 7,210,095 B1 | 4/2007 | Mor | |
| 7,233,830 B1 | 6/2007 | Callaghan et al. | |
| 7,242,009 B1 | 7/2007 | Wilson et al. | |
| 7,275,037 B2 | 9/2007 | Lauer | |
| 7,277,865 B1 | 10/2007 | Silverstone et al. | |
| 7,289,994 B2 | 10/2007 | Nixon et al. | |
| 7,298,275 B2 * | 11/2007 | Brandt | G05B 19/4183 |
| | | | 340/573.1 |
| 7,310,344 B1 | 12/2007 | Sue | |
| 7,383,155 B2 | 6/2008 | Rosam et al. | |
| 7,412,548 B2 | 8/2008 | Sichner | |
| 7,428,495 B2 | 9/2008 | Dhar et al. | |
| 7,478,010 B2 | 1/2009 | Hashemian | |
| 7,480,728 B2 | 1/2009 | Evans | |
| 7,539,724 B1 * | 5/2009 | Callaghan | G05B 19/4185 |
| | | | 709/205 |
| 7,734,590 B2 * | 6/2010 | Chand | G06F 8/10 |
| | | | 707/636 |
| 7,827,122 B1 | 11/2010 | Campbell, Jr. et al. | |
| 7,831,317 B2 | 11/2010 | McGreevy et al. | |
| 8,150,959 B1 * | 4/2012 | Bezdicek | G05B 23/027 |
| | | | 709/224 |
| 8,266,066 B1 | 9/2012 | Wezter et al. | |
| 8,353,012 B2 * | 1/2013 | Del Real | G06F 21/6218 |
| | | | 705/326 |
| 8,392,845 B2 * | 3/2013 | Cahill | G05B 15/02 |
| | | | 715/771 |
| 8,451,753 B2 | 5/2013 | Vanga et al. | |
| 8,468,272 B2 | 6/2013 | Giroti | |
| 8,686,871 B2 * | 4/2014 | Jensen | G07C 3/08 |
| | | | 340/691.1 |
| 8,924,328 B1 | 12/2014 | Kozlovsky et al. | |
| 9,024,955 B2 * | 5/2015 | Ramarao | G05B 23/0272 |
| | | | 345/520 |
| 9,117,076 B2 | 8/2015 | Devost | |
| 9,438,648 B2 | 9/2016 | Asenjo et al. | |
| 9,507,807 B1 | 11/2016 | Florissi et al. | |
| 9,685,053 B2 | 6/2017 | Palmeri | |
| 9,690,669 B2 | 6/2017 | Bernal et al. | |
| 10,026,049 B2 | 7/2018 | Asenjo et al. | |
| 10,054,914 B2 * | 8/2018 | Vartiainen | G05B 19/0423 |
| 2001/0035729 A1 * | 11/2001 | Graiger | G08C 17/02 |
| | | | 318/587 |
| 2002/0004798 A1 | 1/2002 | Babula et al. | |
| 2002/0016839 A1 | 2/2002 | Smith | |
| 2002/0042756 A1 | 4/2002 | Kumar et al. | |
| 2002/0046239 A1 | 4/2002 | Stawikowski et al. | |
| 2002/0049833 A1 | 4/2002 | Kikinis | |
| 2002/0065898 A1 | 5/2002 | Leontiev et al. | |
| 2002/0068983 A1 | 6/2002 | Sexton | |
| 2002/0068984 A1 | 6/2002 | Alexander et al. | |
| 2002/0073236 A1 | 6/2002 | Helgeson et al. | |
| 2002/0077711 A1 | 6/2002 | Nixon et al. | |
| 2002/0082966 A1 | 6/2002 | O'Brien et al. | |
| 2002/0094588 A1 | 7/2002 | Fan et al. | |
| 2002/0096077 A1 | 7/2002 | Frankenberger | |

(56) References Cited

U.S. PATENT DOCUMENTS

| | | |
|---|---|---|
| 2002/0107904 A1 | 8/2002 | Talluri et al. |
| 2002/0138378 A1 | 9/2002 | Leskuski |
| 2002/0156872 A1 | 10/2002 | Brown |
| 2002/0156926 A1 | 10/2002 | Batke et al. |
| 2002/0161745 A1 | 10/2002 | Call |
| 2002/0169993 A1 | 11/2002 | Woods et al. |
| 2003/0004937 A1 | 1/2003 | Salmenkaita et al. |
| 2003/0009253 A1 | 1/2003 | McIntyre et al. |
| 2003/0009572 A1 | 1/2003 | Thurner |
| 2003/0011467 A1* | 1/2003 | Suomela ............... G08C 17/02 340/7.1 |
| 2003/0014149 A1 | 1/2003 | Kreidler et al. |
| 2003/0023336 A1 | 1/2003 | Kreidler et al. |
| 2003/0041089 A1 | 2/2003 | Mauro |
| 2003/0051074 A1 | 3/2003 | Edwards |
| 2003/0056224 A1 | 3/2003 | Stone |
| 2003/0105535 A1 | 6/2003 | Rammler |
| 2003/0105585 A1* | 6/2003 | Ukita ............... G01C 21/3682 701/438 |
| 2003/0109942 A1 | 6/2003 | Yeh et al. |
| 2003/0120817 A1 | 6/2003 | Ott et al. |
| 2003/0156639 A1 | 8/2003 | Liang |
| 2003/0167238 A1 | 9/2003 | Zeif |
| 2003/0167449 A1 | 9/2003 | Warren et al. |
| 2003/0177169 A1 | 9/2003 | Nutt et al. |
| 2003/0177201 A1 | 9/2003 | Shen |
| 2003/0198188 A1 | 10/2003 | Castlebury et al. |
| 2003/0208545 A1 | 11/2003 | Eaton et al. |
| 2003/0217100 A1 | 11/2003 | Kronk |
| 2003/0224769 A1 | 12/2003 | Solve et al. |
| 2003/0236576 A1* | 12/2003 | Resnick ............... G05B 15/02 700/9 |
| 2004/0024572 A1 | 2/2004 | Pagnano et al. |
| 2004/0083165 A1 | 4/2004 | Lawrence |
| 2004/0111512 A1 | 6/2004 | Barth |
| 2004/0148039 A1* | 7/2004 | Farchmin ............. G05B 19/122 700/79 |
| 2004/0148187 A1 | 7/2004 | Boettcher et al. |
| 2004/0148383 A1 | 7/2004 | Gonsalves |
| 2004/0159113 A1 | 8/2004 | Singh et al. |
| 2004/0199573 A1 | 10/2004 | Schwartz et al. |
| 2004/0203895 A1* | 10/2004 | Balasuriya ........ H04M 1/72516 455/456.1 |
| 2004/0214566 A1 | 10/2004 | Suzuki et al. |
| 2004/0215551 A1 | 10/2004 | Eder |
| 2004/0225629 A1 | 11/2004 | Eder |
| 2004/0267729 A1 | 12/2004 | Swaminathan et al. |
| 2005/0021158 A1* | 1/2005 | De Meyer ............. G08C 19/28 700/23 |
| 2005/0038528 A1 | 2/2005 | McKelvey et al. |
| 2005/0055429 A1 | 3/2005 | Abele et al. |
| 2005/0080799 A1 | 4/2005 | Hamden et al. |
| 2005/0091410 A1 | 4/2005 | Gibart et al. |
| 2005/0120112 A1 | 6/2005 | Wing et al. |
| 2005/0125441 A1 | 6/2005 | Clemens et al. |
| 2005/0137735 A1 | 6/2005 | Loy et al. |
| 2005/0149922 A1 | 7/2005 | Vincent |
| 2005/0203869 A1 | 9/2005 | Minamino et al. |
| 2005/0209902 A1 | 9/2005 | Iwasaki et al. |
| 2005/0257204 A1 | 11/2005 | Bryant et al. |
| 2005/0278441 A1 | 12/2005 | Bond et al. |
| 2006/0022048 A1 | 2/2006 | Johnson |
| 2006/0046712 A1* | 3/2006 | Shamp ............... G06Q 30/0207 455/426.1 |
| 2006/0077095 A1 | 4/2006 | Tucker et al. |
| 2006/0078859 A1 | 4/2006 | Mullin |
| 2006/0149813 A1 | 7/2006 | Janik |
| 2006/0153089 A1 | 7/2006 | Silverman |
| 2006/0173873 A1 | 8/2006 | Prompt et al. |
| 2006/0190106 A1 | 8/2006 | Kay et al. |
| 2006/0236374 A1 | 10/2006 | Hartman |
| 2006/0253205 A1 | 11/2006 | Gardiner |
| 2006/0259472 A1 | 11/2006 | MacClellan |
| 2006/0282432 A1 | 12/2006 | Cassidy et al. |
| 2007/0008129 A1* | 1/2007 | Soliman ............... G01S 1/68 340/572.1 |
| 2007/0019641 A1 | 1/2007 | Pai et al. |
| 2007/0021968 A1 | 1/2007 | Amir et al. |
| 2007/0050206 A1 | 3/2007 | Whikehart et al. |
| 2007/0061018 A1 | 3/2007 | Callaghan et al. |
| 2007/0073850 A1 | 3/2007 | Callaghan et al. |
| 2007/0078525 A1 | 4/2007 | Chand |
| 2007/0078536 A1 | 4/2007 | Gordon et al. |
| 2007/0078862 A1 | 4/2007 | Chand |
| 2007/0095907 A1 | 5/2007 | Robinson et al. |
| 2007/0112801 A1 | 5/2007 | McGreevy et al. |
| 2007/0118560 A1 | 5/2007 | Bornhoevd et al. |
| 2007/0130112 A1 | 6/2007 | Lin |
| 2007/0192213 A1 | 8/2007 | Wu et al. |
| 2007/0194097 A1 | 8/2007 | Jones |
| 2007/0244892 A1 | 10/2007 | Narancic |
| 2007/0245169 A1 | 10/2007 | Farchmin et al. |
| 2007/0247789 A1 | 10/2007 | Benson et al. |
| 2007/0255431 A1 | 11/2007 | Kinsey |
| 2008/0027704 A1 | 1/2008 | Kephart et al. |
| 2008/0049013 A1 | 2/2008 | Nasle |
| 2008/0065243 A1 | 3/2008 | Fallman et al. |
| 2008/0077512 A1 | 3/2008 | Grewal |
| 2008/0082186 A1 | 4/2008 | Hood et al. |
| 2008/0109099 A1* | 5/2008 | Moshier ............... G06Q 10/06 700/103 |
| 2008/0125887 A1 | 5/2008 | Case |
| 2008/0155064 A1 | 6/2008 | Kosuge et al. |
| 2008/0162688 A1 | 7/2008 | Reumann et al. |
| 2008/0189637 A1* | 8/2008 | Krajewski ............. G06F 9/451 715/771 |
| 2008/0208365 A1 | 8/2008 | Grgic et al. |
| 2008/0209211 A1 | 8/2008 | Grgic et al. |
| 2008/0214104 A1 | 9/2008 | Baumert et al. |
| 2008/0263514 A1 | 10/2008 | DeMesa et al. |
| 2008/0303472 A1 | 12/2008 | John et al. |
| 2009/0037872 A1 | 2/2009 | Schnabele et al. |
| 2009/0063258 A1 | 3/2009 | Mueller et al. |
| 2009/0065578 A1* | 3/2009 | Peterson ............. G05B 19/048 235/382 |
| 2009/0083204 A1 | 3/2009 | Baier et al. |
| 2009/0086692 A1 | 4/2009 | Chen |
| 2009/0088875 A1* | 4/2009 | Baier ............... G05B 19/41865 700/83 |
| 2009/0089032 A1 | 4/2009 | Sturrock et al. |
| 2009/0089233 A1 | 4/2009 | Gach et al. |
| 2009/0089359 A1* | 4/2009 | Siorek ............... G05B 19/4186 709/202 |
| 2009/0089682 A1 | 4/2009 | Baier et al. |
| 2009/0109889 A1 | 4/2009 | Budampati et al. |
| 2009/0125460 A1 | 5/2009 | Hewison et al. |
| 2009/0127325 A1 | 5/2009 | Macurek et al. |
| 2009/0204234 A1 | 8/2009 | Sustaeta et al. |
| 2009/0210071 A1* | 8/2009 | Agrusa ............... G05B 23/0267 700/9 |
| 2009/0210814 A1* | 8/2009 | Agrusa ............... G05B 23/0267 715/772 |
| 2009/0216341 A1 | 8/2009 | Enkerud et al. |
| 2009/0300151 A1 | 12/2009 | Friedman et al. |
| 2010/0023562 A1 | 1/2010 | Kreuch et al. |
| 2010/0057660 A1 | 3/2010 | Kato |
| 2010/0076575 A1 | 3/2010 | Vasko et al. |
| 2010/0082127 A1 | 4/2010 | Plache et al. |
| 2010/0082129 A1* | 4/2010 | McGreevy ............. G06Q 10/06 700/80 |
| 2010/0082453 A1 | 4/2010 | Speers et al. |
| 2010/0082669 A1 | 4/2010 | Obitko et al. |
| 2010/0083232 A1 | 4/2010 | Chouinard et al. |
| 2010/0118895 A1 | 5/2010 | Radulescu |
| 2010/0146014 A1 | 6/2010 | Ionescu et al. |
| 2010/0153487 A1 | 6/2010 | Greven et al. |
| 2010/0192144 A1 | 7/2010 | Schmit |
| 2010/0211509 A1 | 8/2010 | Jacobs |
| 2010/0241260 A1* | 9/2010 | Kilibarda ............. B25J 9/1602 700/95 |
| 2010/0256795 A1 | 10/2010 | McLaughlin et al. |
| 2010/0257227 A1 | 10/2010 | McLaughlin et al. |

(56) References Cited

U.S. PATENT DOCUMENTS

| | | |
|---|---|---|
| 2010/0257228 A1* | 10/2010 | Staggs .................. G06F 9/5027 709/203 |
| 2010/0306377 A1 | 12/2010 | DeHaan et al. |
| 2010/0318837 A1 | 12/2010 | Murphy et al. |
| 2010/0324855 A1 | 12/2010 | Parker |
| 2010/0332008 A1 | 12/2010 | Knipfer et al. |
| 2011/0016058 A1 | 1/2011 | Pinchuk |
| 2011/0047230 A1 | 2/2011 | McGee |
| 2011/0078300 A9 | 3/2011 | Grelewicz et al. |
| 2011/0161378 A1 | 6/2011 | Williamson |
| 2011/0173127 A1 | 7/2011 | Ho et al. |
| 2011/0257766 A1 | 10/2011 | Sundaram et al. |
| 2011/0276498 A1 | 11/2011 | Madhok |
| 2012/0005242 A1 | 1/2012 | Feng et al. |
| 2012/0054246 A1 | 3/2012 | Fischer |
| 2012/0072597 A1 | 3/2012 | Teather et al. |
| 2012/0079461 A1 | 3/2012 | Copass et al. |
| 2012/0083906 A1* | 4/2012 | Weatherhead ..... G05B 23/0267 700/83 |
| 2012/0084400 A1 | 4/2012 | Almadi et al. |
| 2012/0089920 A1 | 4/2012 | Eick |
| 2012/0095808 A1 | 4/2012 | Kattapuram et al. |
| 2012/0101801 A1 | 4/2012 | Van Dorsselaer |
| 2012/0147894 A1 | 6/2012 | Mulligan et al. |
| 2012/0232876 A1 | 9/2012 | Misra |
| 2012/0257544 A1 | 10/2012 | Schein et al. |
| 2012/0262069 A1 | 10/2012 | Reed |
| 2012/0290104 A1 | 11/2012 | Holt et al. |
| 2012/0297249 A1 | 11/2012 | Yang et al. |
| 2012/0304007 A1 | 11/2012 | Hanks et al. |
| 2012/0306620 A1* | 12/2012 | Karaffa ............... H04L 12/2825 340/6.1 |
| 2013/0004281 A1 | 1/2013 | Anders et al. |
| 2013/0012220 A1 | 1/2013 | Waris et al. |
| 2013/0018696 A1 | 1/2013 | Meldrum |
| 2013/0024542 A1 | 1/2013 | Keller et al. |
| 2013/0031158 A1 | 1/2013 | Salsburg |
| 2013/0036198 A1* | 2/2013 | Galm .................. B41F 33/0009 709/217 |
| 2013/0041705 A1 | 2/2013 | Hampapur et al. |
| 2013/0097563 A1 | 4/2013 | Pacheco Rodrigues Velho et al. |
| 2013/0097710 A1 | 4/2013 | Basavapatna et al. |
| 2013/0104236 A1 | 4/2013 | Ray et al. |
| 2013/0107772 A1 | 5/2013 | Splitz et al. |
| 2013/0111034 A1 | 5/2013 | Upadhya |
| 2013/0117064 A1 | 5/2013 | Sadeghi et al. |
| 2013/0117806 A1* | 5/2013 | Parthasarathy ........ G06F 21/53 726/1 |
| 2013/0125233 A1 | 5/2013 | Bush et al. |
| 2013/0138812 A1 | 5/2013 | Assuncao et al. |
| 2013/0138818 A1* | 5/2013 | Wolf .................. G05B 19/4185 709/227 |
| 2013/0145033 A1 | 6/2013 | Polla et al. |
| 2013/0159500 A1 | 6/2013 | Reus et al. |
| 2013/0182107 A1 | 7/2013 | Anderson |
| 2013/0191106 A1* | 7/2013 | Kephart ................ G05B 17/02 703/21 |
| 2013/0204982 A1 | 8/2013 | Kim et al. |
| 2013/0211546 A1 | 8/2013 | Lawson et al. |
| 2013/0211547 A1* | 8/2013 | Buchdunger ...... G05B 19/0426 700/11 |
| 2013/0211559 A1 | 8/2013 | Lawson et al. |
| 2013/0211870 A1 | 8/2013 | Lawson et al. |
| 2013/0212420 A1 | 8/2013 | Lawson et al. |
| 2013/0218971 A1 | 8/2013 | Sasaki et al. |
| 2013/0237204 A1 | 9/2013 | Buck et al. |
| 2013/0257627 A1 | 10/2013 | Rafael |
| 2013/0262654 A1 | 10/2013 | Masli et al. |
| 2013/0283265 A1 | 10/2013 | Acharya et al. |
| 2013/0304237 A1 | 11/2013 | Schroeder et al. |
| 2013/0325545 A1 | 12/2013 | Mordvinova et al. |
| 2013/0347003 A1 | 12/2013 | Whitmore |
| 2014/0013100 A1 | 1/2014 | Menzel et al. |
| 2014/0046618 A1 | 2/2014 | Arunachalam et al. |
| 2014/0046977 A1 | 2/2014 | Gopalakrishnan et al. |
| 2014/0047107 A1 | 2/2014 | Maturana et al. |
| 2014/0052499 A1 | 2/2014 | Wagner et al. |
| 2014/0059056 A1 | 2/2014 | Chaney et al. |
| 2014/0095231 A1 | 4/2014 | Cherusseri et al. |
| 2014/0095654 A1 | 4/2014 | Finnerty et al. |
| 2014/0121789 A1 | 5/2014 | Brandes et al. |
| 2014/0137257 A1 | 5/2014 | Martinez et al. |
| 2014/0156032 A1 | 6/2014 | Jenkins et al. |
| 2014/0156584 A1 | 6/2014 | Motukuri et al. |
| 2014/0250153 A1 | 9/2014 | Nixon et al. |
| 2014/0250337 A1 | 9/2014 | Yamaji et al. |
| 2014/0279641 A1 | 9/2014 | Singh et al. |
| 2014/0279948 A1 | 9/2014 | Mahate et al. |
| 2014/0282257 A1 | 9/2014 | Nixon et al. |
| 2014/0306533 A1 | 10/2014 | Paquin et al. |
| 2014/0335480 A1 | 11/2014 | Asenjo et al. |
| 2014/0336785 A1 | 11/2014 | Asenjo et al. |
| 2014/0336786 A1 | 11/2014 | Asenjo et al. |
| 2014/0336791 A1 | 11/2014 | Asenjo et al. |
| 2014/0336795 A1 | 11/2014 | Asenjo et al. |
| 2014/0337000 A1 | 11/2014 | Asenjo et al. |
| 2014/0358606 A1 | 12/2014 | Hull |
| 2014/0372347 A1* | 12/2014 | Cohen .................. G06F 11/0709 706/12 |
| 2015/0012763 A1 | 1/2015 | Cohen et al. |
| 2015/0019191 A1 | 1/2015 | Maturana et al. |
| 2015/0032886 A1 | 1/2015 | Wang |
| 2015/0048952 A1 | 2/2015 | Murphy |
| 2015/0235161 A1 | 8/2015 | Azar et al. |
| 2015/0278407 A1 | 10/2015 | Vennelakanti et al. |
| 2015/0304193 A1* | 10/2015 | Ishii .................. G05B 19/4185 709/224 |
| 2015/0378356 A1* | 12/2015 | Hefeeda ............. G05B 19/0426 700/9 |
| 2016/0154693 A1 | 6/2016 | Uhde et al. |
| 2016/0217378 A1 | 7/2016 | Bellala et al. |
| 2016/0217410 A1 | 7/2016 | Santos et al. |
| 2017/0019483 A1 | 1/2017 | Maturana et al. |
| 2017/0236391 A1 | 8/2017 | Palmeri |
| 2018/0157995 A1 | 6/2018 | O'Malley |
| 2018/0205803 A1 | 7/2018 | Asenjo et al. |

FOREIGN PATENT DOCUMENTS

| | | |
|---|---|---|
| CN | 1690685 A | 11/2005 |
| CN | 100362442 C | 1/2008 |
| CN | 101114160 A | 1/2008 |
| CN | 101326471 A | 12/2008 |
| CN | 101536002 A | 9/2009 |
| CN | 101739007 A | 6/2010 |
| CN | 101776862 A | 7/2010 |
| CN | 102435870 A | 5/2012 |
| CN | 102449567 A | 5/2012 |
| CN | 102830666 A | 12/2012 |
| CN | 102927937 A | 2/2013 |
| CN | 103019102 | 4/2013 |
| CN | 103403753 A | 11/2013 |
| CN | 104142629 A | 11/2014 |
| CN | 104142630 A | 11/2014 |
| CN | 104142662 A | 11/2014 |
| CN | 104142664 A | 11/2014 |
| CN | 104142679 A | 11/2014 |
| DE | 198 34 456 A1 | 2/2000 |
| DE | 10 2014 102 844 A1 | 9/2014 |
| EP | 1 209 558 A2 | 5/2002 |
| EP | 1 531 373 A2 | 5/2005 |
| EP | 1 686 442 A1 | 8/2006 |
| EP | 1 933 214 A2 | 6/2008 |
| EP | 2 189 900 A1 | 5/2010 |
| EP | 2 293 164 A1 | 3/2011 |
| EP | 2 453 326 A1 | 5/2012 |
| EP | 2 469 466 A1 | 6/2012 |
| EP | 2 660 667 A2 | 11/2013 |
| EP | 2 704 401 A1 | 3/2014 |
| EP | 2 778 816 A1 | 9/2014 |
| EP | 2 790 101 A1 | 10/2014 |
| EP | 2 801 935 A1 | 11/2014 |
| EP | 2 801 936 A1 | 11/2014 |

(56) References Cited

FOREIGN PATENT DOCUMENTS

| EP | 2 801 938 A1 | 11/2014 |
|---|---|---|
| EP | 2 801 940 A1 | 11/2014 |
| EP | 2 801 941 A1 | 11/2014 |
| EP | 3 037 901 A2 | 6/2016 |
| EP | 3 070 550 B1 | 7/2018 |
| WO | 01/11586 A1 | 2/2001 |
| WO | 01/69329 A2 | 9/2001 |
| WO | 02/17131 A2 | 2/2002 |
| WO | 03/007097 A1 | 1/2003 |
| WO | 03/058506 A1 | 7/2003 |
| WO | 2008/133715 A2 | 11/2008 |
| WO | 2009/046095 A1 | 4/2009 |
| WO | 2011/050482 A1 | 5/2011 |
| WO | 2013/007866 A1 | 1/2013 |
| WO | 2014/090310 A1 | 6/2014 |
| WO | 2016/001718 A1 | 1/2016 |

OTHER PUBLICATIONS

Office Action for U.S. Appl. No. 15/143,733 dated Mar. 8, 2018, 141 pages.
Office Action for U.S. Appl. No. 15/490,076 dated Apr. 2, 2018, 23 pages.
Office Action for U.S. Appl. No. 14/658,327 dated Apr. 10, 2018, 43 pages.
Office Action for U.S. Appl. No. 14/658,345 dated Mar. 14, 2018, 56 pages.
Office Action for U.S. Appl. No. 14/658,365, dated Apr. 5, 2018, 64 pages.
Office Action for U.S. Appl. No. 14/658,394, dated Apr. 6, 2018, 40 pages.
Final Office Action received for U.S. Appl. No. 14/658,365, dated Oct. 16, 2018, 42 pages.
Notice of Allowance received for U.S. Appl. No. 15/923,127 dated Nov. 21, 2018, 85 pages.
Non-Final Office Action received for U.S. Appl. No. 14/658,327 dated Nov. 1, 2018, 58 pages.
Final Office Action received for U.S. Appl. No. 14/658,394 dated Nov. 1, 2018, 51 pages.
Second Office Action received for Chinese Patent Application Serial No. 201610149668.1 dated Oct. 24, 2018, 18 pages (including English Translation).
Second Office Action received for Chinese Patent Application Serial No. 201610149635.7 dated Oct. 24, 2018, 24 pages (including English Translation).
First Office Action received for Chinese Patent Application Serial No. 201610151417.7 dated Sep. 18, 2018, 28 pages (including English Translation).
Non-Final Office Action for U.S. Appl. No. 14/088,014 dated Mar. 22, 2016, 98 pages.
Final Office Action for U.S. Appl. No. 14/088,014, dated Jul. 15, 2016, 65 pages.
Office Action for U.S. Appl. No. 14/088,014, dated Nov. 17, 2016, 61 pages.
Final Office Action for U.S. Appl. No. 14/658,365 dated Sep. 8, 2017, 59 pages.
Office Action for U.S. Appl. No. 14/087,821 dated Sep. 7, 2017, 63 pages.
Final Office Action for U.S. Appl. No. 14/087,730 dated Aug. 18, 2017, 72 pages.
Office Action for U.S. Appl. No. 15/214,583 dated Aug. 28, 2017, 80 pages.
Final Office Action for U.S. Appl. No. 14/658,345 dated Sep. 25, 2017, 52 pages.
Final Office Action for U.S. Appl. No. 15/388,260 dated Oct. 18, 2017, 76 pages.
Office Action for U.S. Appl. No. 15/206,744 dated Nov. 6, 2017, 48 pages.
Office Action for U.S. Appl. No. 14/658,327 dated Oct. 30, 2017, 48 pages.
Final Office Action for U.S. Appl. No. 14/658,394 dated Nov. 16, 2017, 49 pages.
Chinese First Office Action for Chinese Application No. 20170339669.7 dated Dec. 11, 2018, 25 pages (Including English Translation).
Office Action for U.S. Appl. No. 15/143,733, dated Jun. 18, 2018, 76 pages.
Office Action for U.S. Appl. No. 15/599,921, dated Jun. 29, 2018, 75 pages.
Office Action for U.S. Appl. No. 14/087,970, dated Aug. 1, 2018, 68 pages.
Wikipedia; "PID Controller"; Jul. 20, 2018; https://en.wikipedia.org/wiki/PID_controller (Year: 2018).
Communication pursuant to Article 94(3) EPC for EP Application Serial No. 14167714.6 dated Aug. 3, 2018, 5 pages.
Communication pursuant to Article 94(3) EPC for EP Application Serial No. 14167708.8 dated Aug. 3, 2018, 5 pages.
Communication pursuant to Article 94(3) EPC for EP Application Serial No. 14167712.0 dated Aug. 3, 2018, 5 pages.
Search Report received for Chinese Application Serial No. 201610149668.1 dated Apr. 2, 2018, 1 page.
Search Report received for Chinese Application Serial No. 201610149635.7 dated Apr. 2, 2018, 1 page.
First Office Action received for Chinese Patent Application Serial No. 201610151380.8 dated Jul. 17, 2018, 65 pages.
Office Action for U.S. Appl. No. 14/658,345, dated Sep. 13, 2018, 79 pages.
Office Action for U.S. Appl. No. 15/490,076 dated Dec. 20, 2017, 37 pages.
Office Action for U.S. Appl. No. 15/278,139 dated Jan. 11, 2018, 103 pages.
Final Office Action for U.S. Appl. No. 14/087,821 dated Dec. 14, 2017, 37 pages.
Final Office Action for U.S. Appl. No. 14/088,011 dated Nov. 22, 2017, 77 pages.
Office Action for U.S. Appl. No. 14/087,970 dated Feb. 12, 2018, 69 pages.
Chinese Office Action for CN Application Serial No. 201410196114.8, dated Dec. 13, 2017, 26 pages.
Non-Final Office Action received for U.S. Appl. No. 10/234,504 dated Oct. 18, 2006, 15 pages.
Final Office Action received for U.S. Appl. No. 10/234,504 dated Feb. 7, 2007, 12 pages.
Final Office Action received for U.S. Appl. No. 10/234,504 dated May 1, 2007, 12 pages.
Non-Final Office Action received for U.S. Appl. No. 10/162,314 dated Dec. 15, 2005, 17 pages.
Final Office Action received for U.S. Appl. No. 10/162,314 dated Jun. 5, 2006, 23 pages.
Non-Final Office Action received for U.S. Appl. No. 10/162,314 dated Nov. 16, 2006, 20 pages.
Final Office Action received for U.S. Appl. No. 10/162,314 dated Apr. 30, 2007, 35 pages.
Non-Final Office Action received for U.S. Appl. No. 10/162,314 dated Oct. 25, 2007, 28 pages.
Final Office Action received for U.S. Appl. No. 10/162,314 dated May 5, 2008, 31 pages.
Non-Final Office Action received for U.S. Appl. No. 10/161,848 dated Nov. 15, 2005, 15 pages.
Final Office Action received for U.S. Appl. No. 10/161,848 dated Mar. 27, 2006, 13 pages.
Non-Final Office Action received for U.S. Appl. No. 10/161,848 dated Sep. 5, 2006, 15 pages.
Final Office Action received for U.S. Appl. No. 10/161,848 dated Feb. 23, 2007, 17 pages.
Non-Final Office Action received for U.S. Appl. No. 10/161,848 dated May 7, 2007, 14 pages.
Final Office Action received for U.S. Appl. No. 10/161,848 dated Oct. 17, 2007, 15 pages.
Non-Final Office Action received for U.S. Appl. No. 10/161,848 dated Feb. 7, 2008, 14 pages.

(56) References Cited

OTHER PUBLICATIONS

Final Office Action received for U.S. Appl. No. 10/161,848 dated Sep. 9, 2008, 17 pages.
Non-Final Office Action received for U.S. Appl. No. 12/410,632 dated Feb. 1, 2011, 56 pages.
Final Office Action received for U.S. Appl. No. 12/410,632 dated May 17, 2011, 17 pages.
Non-Final Office Action received for U.S. Appl. No. 12/410,632 dated Sep. 2, 2011, 11 pages.
Non-Final Office Action received for U.S. Appl. No. 10/298,366 dated Apr. 20, 2006, 13 pages.
Final Office Action received for U.S. Appl. No. 10/298,366 dated Sep. 29, 2006, 16 pages.
Non-Final Office Action received for U.S. Appl. No. 10/298,366 dated Jan. 31, 2007, 12 pages.
Final Office Action received for U.S. Appl. No. 10/298,366 dated Jul. 18, 2007, 14 pages.
Non-Final Office Action received for U.S. Appl. No. 10/298,366 dated Dec. 17, 2007, 10 pages.
Non-Final Office Action received for U.S. Appl. No. 10/298,366 dated Jun. 11, 2008, 24 pages.
Final Office Action received for U.S. Appl. No. 10/298,366 dated Nov. 18, 2008, 20 pages.
Notice of Allowance received for U.S. Appl. No. 10/298,366 dated Feb. 2, 2009, 23 pages.
Non-Final Office Action received for U.S. Appl. No. 13/615,195, dated Aug. 19, 2014, 24 pages.
Communication pursuant to Article 96(2) EPC for EP Application Serial No. 03026339.6 dated Apr. 6, 2006, 6 pages.
Communication pursuant to Article 96(2) EPC for EP Application Serial No. 13166670.3 dated Dec. 14, 2018, 4 pages.
Chinese Third Office Action for Chinese Application No. 201410196114.8 dated Apr. 12, 2017, 25 pages (Including English Translation).
Chinese Fourth Office Action for Chinese Application No. 201410196114.8 dated Aug. 15, 2017, 24 pages (Including English Translation).
Chinese Second Office Action for Chinese Application No. 201410196198.5 dated Dec. 21, 2016, 10 pages (Including English Translation).
Chinese Third Office Action for Chinese Application No. 201410196198.5 dated Mar. 28, 2017, 10 pages (Including English Translation).
Chinese Second Office Action for Chinese Application No. 201410196525.7 dated Dec. 21, 2016, 8 pages (Including English Translation).
Chinese Second Office Action for Chinese Application No. 201410196775.0 dated Dec. 7, 2016, 8 pages (Including English Translation).
Chinese Third Office Action for CN Application Serial No. 201410196150.4, dated Nov. 29, 2017, 10 pages (Including English Translation).
Communication pursuant to Article 94(3) EPC for EP Application Serial No. 14167511.6 dated Jan. 23, 2019, 7 pages.
Communication pursuant to Article 94(3) EPC for EP Application Serial No. 14167703.9 dated Jan. 23, 2019, 6 pages.
Anonymous: "Hash function—Wikipedia", Wikipedia, Apr. 19, 2009, URL:https://en.wikipedia.org/w/index.php?title=Hash_function&oldid=284890279, 9 pages.
Communication pursuant to Article 94(3) EPC for EP Application Serial No. 16160611.6 dated Apr. 5, 2017, 5 pages.
Communication pursuant to Article 94(3) EPC for EP Application Serial No. 16160611.6 dated May 10, 2017, 5 pages.
Second Office Action received for Chinese Patent Application Serial No. 201610151417.7 dated Jan. 22, 2019, 7 pages (Including English Translation).
Communication pursuant to Article 94(3) EPC for EP Application Serial No. 16160604.1 dated Jun. 13, 2017, 6 pages.
Summons to attend oral proceedings pursuant to Rule 115(1) EPC received for EP Patent Application Serial No. 14167706.2 dated Dec. 13, 2018, 65 pages.
Second Office Action received for Chinese Patent Application Serial No. 201410196150.4 dated Aug. 3, 2017, 10 pages (Including English Translation).
Extended European Search Report received for EP Patent Application Serial No. 16160610.8 dated Sep. 8, 2016, 9 pages.
Office Action for U.S. Appl. No. 14/658,345 dated May 13, 2019, 78 pages.
Office Action for U.S. Appl. No. 14/658,365 dated Jun. 3, 2019, 70 pages.
Non-Final Office Action received for U.S. Appl. No. 14/658,365 dated Mar. 23, 2017, 100 pages.
First Office Action received for Chinese Patent Application Serial No. 201410196150.4 dated Mar. 2, 2017, 22 pages (Including English Translation).
Final Office Action received for U.S. Appl. No. 14/087,970 dated Apr. 12, 2017, 59 pages.
Non-Final Office Action received for U.S. Appl. No. 14/658,394 dated Apr. 21, 2017, 97 pages.
Non-Final Office Action received for U.S. Appl. No. 15/388,260 dated Apr. 24, 2017, 101 pages.
Non-Final Office Action received for U.S. Appl. No. 14/658,345 dated Mar. 17, 2017, 95 pages.
Non-Final Office Action received for U.S. Appl. No. 14/658,327 dated May 1, 2017, 99 pages.
Examiner Answer to Appeal Brief received for U.S. Appl. No. 14/087,977, dated Feb. 1, 2017, 12 pages.
Givehchi et al., "Control-as-a-Service from the Cloud: A Case Study for using Virtualized PLCs," 2014 10th IEEE Workshop on Factory Communication Systems (WFCS 2014), May 5, 2014 IEEE, 4 pages.
Non-Final Office Action received for U.S. Appl. No. 14/088,011 dated May 17, 2017, 57 pages.
Rouse et al., "Definition Industrial Control System (ICS)", URL : http://whatis.techtarget.com/definition/industrial-control-system-ICS, whatis.techtarget.com, Jan. 11, 2017, 4 Pages.
Non-Final Office Action received for U.S. Appl. No. 14/087,730, dated Feb. 9, 2017, 78 pages.
Second Office Action received for Chinese Patent Application Serial No. 201410198289.2 dated Dec. 15, 2016, 37 pages (Including English Translation).
Second Office Action received for Chinese Patent Application Serial No. 201410196127.5 dated Nov. 30, 2016, 24 pages (Including English Translation).
Second Office Action received for Chinese Patent Application Serial No. 201410195780.X dated Feb. 3, 2017, 27 pages (Including English Translation).
Non-Final Office Action received for U.S. Appl. No. 14/087,821, dated Mar. 2, 2016, 86 pages.
Non-Final Office Action received for U.S. Appl. No. 14/087,977 dated Mar. 17, 2016, 93 pages.
Recursion Software, Inc., "SCADA-Aware Mobile", URL: http://www.emsenergyautomation.com/brochures/scada.pdf, Aug. 29, 2012, 5 pages.
Ars Technica., "Windows 7 themes: how to unlock them or create your own", URL : http://arstechnica.com/information-technology/2009/11/unlock-hidden-windows-7-themesl, Nov. 12, 2009, 7 pages.
Microsoft., "Sharing Outlook 2010 Contact\Notes/Field?", microsoft.com, URL : http://answers.microsoft.com/en-us/office/forum/office 2010—outlook/sharing—outlook-2010-contactnotes-field/c7e74273-ff60-4da3-a3aa-ccb6cadcd25e?auth= 1, Jun. 23, 2011, 2 pages.
Notice of Allowance received for U.S. Appl. No. 13/608,850 dated Apr. 12, 2016, 37 pages.
Notice of Allowance received for U.S. Appl. No. 14/087,873 dated Apr. 18, 2016, 26 pages.
First Office Action received for Chinese Patent Application Serial No. 201410196198.5 dated Mar. 29, 2016, 28 pages (Including English Translation).
Non-Final Office Action received for U.S. Appl. No. 14/088,011 dated May 12, 2016, 96 pages.

(56) References Cited

OTHER PUBLICATIONS

First Office Action received for Chinese Patent Application Serial No. 201410198289.2 dated Apr. 5, 2016, 27 pages (Including English Translation).
First Office Action received for Chinese Patent Application Serial No. 201410196905.0 dated Apr. 5, 2016, 30 pages (Including English Translation).
First Office Action received for Chinese Patent Application Serial No. 201410196127.5 dated Apr. 7, 2016, 23 pages (Including English Translation).
First Office Action received for Chinese Patent Application Serial No. 201410196775.0 dated May 5, 2016, 19 pages (Including English Translation).
First Office Action received for Chinese Patent Application Serial No. 201410196525.7 dated May 5, 2016, 14 pages (Including English Translation).
Non-Final Office Action received for U.S. Appl. No. 13/615,195 dated Jun. 21, 2016, 27 pages.
Final Office Action received for U.S. Appl. No. 13/725,543 dated Jun. 17, 2016, 19 pages.
Non-Final Office Action received for U.S. Appl. No. 14/087,970 dated Jun. 17, 2016, 76 pages.
First Office Action received for Chinese Patent Application Serial No. 201410196114.8 dated Apr. 25, 2016, 30 pages (Including English Translation).
Communication pursuant to Article 94(3) EPC received for European Patent Application Serial No. 14167707.0 dated Sep. 22, 2015, 9 pages.
First Office Action received for Chinese Patent Application Serial No. 201410195780.X dated May 26, 2016, 19 pages (Including English Translation).
Final Office Action received for U.S. Appl. No. 14/087,977, dated Jul. 13, 2016, 59 pages.
Non-Final Office Action received for U.S. Appl. No. 14/087,922, dated Jul. 19, 2016, 120 pages.
Extended European Search Report for European Patent Application Serial No. 16160604.1, dated Aug. 17, 2016, 8 pages.
Extended European Search Report received for European Patent Application Serial No. 16160611.6 dated Aug. 24, 2016, 9 pages.
Final Office Action received for U.S. Appl. No. 14/087,730, dated Aug. 24, 2016, 113 pages.
Extended European Search Report received for European Patent Application Serial No. 16160602.5 dated Sep. 2, 2016, 9 pages.
"Cloud Computing", Whatis.com, http://searchcloudcomputing.techtarget.com/sDefinition/0, Sid201_gci1287881,00.html, Oct. 27, 2009, 2 pages.
Mell et al., "The NIST Definition of Cloud Computing", http://csrc.nist.gov/groups/SNS/cloud/Computing/index.html, Oct. 7, 2009, 2 pages.
Communication pursuant to Rule 69 EPC received for EP Patent Application Serial No. 16160611.6 dated Sep. 26, 2016, 2 pages.
Communication pursuant to Rule 69 EPC received for EP Patent Application Serial No. 13166670.3 dated Jul. 18, 2016, 2 pages.
Communication pursuant to Rule 69 EPC received for EP Patent Application Serial No. 16160604.1 dated Sep. 26, 2016, 2 pages.
Final Office Action received for U.S. Appl. No. 13/615,195 dated Oct. 21, 2016, 44 pages.
Final Office Action received for U.S. Appl. No. 14/088,011 dated Nov. 1, 2016, 79 pages.
Communication pursuant to Rule 69 EPC received for EP Patent Application Serial No. 16160610.8 dated Oct. 17, 2016, 2 pages.
Communication pursuant to Rule 69 EPC received for EP Patent Application Serial No. 16160602.5 dated Oct. 10, 2016, 2 pages.
Third Office Action received for Chinese Patent Application Serial No. 201610149635.7 dated Apr. 26, 2019, 23 pages (including English Translation).
Notice of Opposition received for EP Patent Application Serial No. 16160611.6 dated Apr. 11, 2019, 789 pages.

Wen et al., "Current Trends and Perspectives in Wireless Virtualization", 2013 International Conference on Selected Topics in Mobile and Wireless Networking (MoWNeT), 2013, 6 pages.
Wang et al., "The Research of Chemical Plant Monitoring Base on the Internet of Things and 3D Visualization Technology", Proceeding of the IEEE International Conference on Information and Automation, Aug. 2013, 5 pages.
Second Office Action received for Chinese Patent Application Serial No. 201410196114.8 dated Nov. 9, 2016, 35 pages (Including English Translation).
Second Office Action received for Chinese Patent Application Serial No. 201410196905.0 dated Nov. 18, 2016, 8 pages (Including English Translation).
Final Office Action received for U.S. Appl. No. 14/087,922 dated Nov. 25, 2016, 65 pages.
Extended European Search Report received for European Patent Application Serial No. 14167714.6 dated Aug. 11, 2014, 5 pages.
Extended European Search Report received for European Patent Application Serial No. 14167706.2 dated Aug. 11, 2014, 7 pages.
Extended European Search Report received for European Patent Application Serial No. 14167626.2 dated Aug. 11, 2014, 9 pages.
Extended European Search Report received for European Patent Application Serial No. 14167627.0 dated Aug. 11, 2014, 6 pages.
Extended European Search Report received for European Patent Application Serial No. 14167703.9 dated Aug. 11, 2014, 7 pages.
Extended European Search Report received for European Patent Application Serial No. 14167707.0 dated Aug. 11, 2014, 7 pages.
Extended European Search Report received for European Patent Application Serial No. 14167708.8 dated Aug. 11, 2014, 5 pages.
Extended European Search Report received for European Patent Application Serial No. 14167712.0 dated Aug. 11, 2014, 5 pages.
Extended European Search Report received for European Patent Application Serial No. 14167511.6 dated Aug. 11, 2014, 6 pages.
Non-Final Office Action received for U.S. Appl. No. 10/162,315 dated Dec. 27, 2004, 10 pages.
Final Office Action received for U.S. Appl. No. 10/162,315 dated Jun. 15, 2005, 11 pages.
Non-Final Office Action received for U.S. Appl. No. 10/162,315 dated Sep. 9, 2005, 22 pages.
Vasudevan, Venu, "A Web Services Primer", URL: http://webservices.xml.com/pub/a/ws/2001/04/04/vebservices/index.html, XML.com, Apr. 4, 2001, 10 pages.
Non-Final Office Action received for U.S. Appl. No. 10/162,315 dated Mar. 6, 2006, 10 pages.
W3C, "Web Services Description Language (WSDL) 1.1", URL: http://www.w3.org!TR/wsd1, W3C Note, Mar. 15, 2001, 36 pages.
European Search Report received for European Patent Application Serial No. 03026339.6 dated Apr. 6, 2004, 4 pages.
Compuquest Inc., "SPM-IM—Instant Messaging Client for SpreadMsg Wireless Messaging Software", URL: http://www.Compuqueslinc.com/spmim.html, Aug. 13, 2002, 4 pages.
Compuquest Inc., "SpreadMsg Lite—Data Capture, Scanning, Extraction, & Rule Based Instant Messaging Software", URL: http://web.archive.org/web/20020813080848/ http://www.compuqueslinc.com/spmsgl.html, retrieved on Jul. 21, 2006, 6 pages.
International Business Machines Corporation, "Cross platform instant messaging using web services", Research Disclosure, Kenneth Mason Publications, vol. 458, No. 156, Jun. 2002, 3 pages.
Non-Final Office Action received for U.S. Appl. No. 13/725,578 dated Jun. 18, 2014, 13 pages.
Non-Final Office Action received for U.S. Appl. No. 13/615,195 dated Aug. 19, 2014, 22 pages.
Non-Final Office Action received for U.S. Appl. No. 13/725,543 dated Oct. 9, 2014, 10 pages.
Final Office Action received for U.S. Appl. No. 13/725,578 dated Dec. 12, 2014, 24 pages.
Final Office Action received for U.S. Appl. No. 13/615,195 dated Jan. 20, 2015, 22 pages.
Third Party Submission received for U.S. Appl. No. 14/087,873 dated Nov. 21, 2014, 26 pages.
Final Office Action received for U.S. Appl. No. 13/725,543 dated May 20, 2015, 15 pages.

(56) References Cited

OTHER PUBLICATIONS

Non-Final Office Action received for U.S. Appl. No. 13/608,821 dated Jun. 1, 2015, 44 pages.
Non-Final Office Action received for U.S. Appl. No. 13/608,850 dated Jun. 1, 2015, 38 pages.
Non-Final Office Action received for U.S. Appl. No. 13/677,060 dated Apr. 24, 2015, 54 pages.
Non-Final Office Action received for U.S. Appl. No. 13/725,619 dated Jul. 17, 2015, 45 pages.
Non-Final Office Action received for U.S. Appl. No. 13/725,660 dated Aug. 18, 2015, 131 pages.
Colombo et al., "Factory of the Future: A Service-oriented System of Modular, Dynamic Reconfigurable and Collaborative Systems", Artificial Intelligence Techniques for Networked Manufacturing Enterprises Management, Springer Series in Advanced Manufacturing, 2010, pp. 459-481.
Colombo et al., "Towards the Factory of the Future: A Service-Oriented Cross-layer Infrastructure", ICT Shaping the World: A Scientific View, 2009, pp. 65-81.
Notice of Allowance received for U.S. Appl. No. 13/725,578 dated Apr. 24, 2015, 23 pages.
Final Office Action received for U.S. Appl. No. 13/677,060 dated Oct. 20, 2015, 48 pages.
Non-Final Office Action received for U.S. Appl. No. 13/615,195 dated Sep. 21, 2015, 19 pages.
Final Office Action received for U.S. Appl. No. 13/725,660 dated Oct. 26, 2015, 79 pages.
Non-Final Office Action received for U.S. Appl. No. 14/087,873 dated Nov. 25, 2015, 59 pages.
Final Office Action received for U.S. Appl. No. 13/725,619 dated Dec. 4, 2015, 21 pages.
Final Office Action received for U.S. Appl. No. 13/608,821 dated Dec. 7, 2015, 39 pages.
Final Office Action received for U.S. Appl. No. 13/615,195 dated Feb. 11, 2016, 19 pages.
Non-Final Office Action received for U.S. Appl. No. 13/725,543 dated Feb. 2, 2016, 15 pages.
Non-Final Office Action received for U.S. Appl. No. 13/725,660 dated Jan. 21, 2016, 72 pages.
Final Office Action received for U.S. Appl. No. 13/608,850 dated Dec. 9, 2015, 25 pages.
Communication pursuant to Article 94(3) EPC received for European Patent Application Serial No. 14167706.2 dated Nov. 24, 2015, 8 pages.
Communication pursuant to Article 94(3) EPC received for European Patent Application Serial No. 14167626.2 dated Nov. 24, 2015, 8 pages.
Notice of Allowance received for U.S. Appl. No. 13/725,619 dated Mar. 31, 2016, 26 pages.
Non-Final Office Action received for U.S. Appl. No. 13/677,060 dated Mar. 10, 2016, 66 pages.
Notice of Allowance received for U.S. Appl. No. 13/725,660 dated Feb. 3, 2016, 47 pages.
Non-Final Office Action received for U.S. Appl. No. 14/087,730 dated Mar. 11, 2016, 81 pages.
Non-Final Office Action received for U.S. Appl. No. 15/714,333 dated Jul. 17, 2019, 113 pages.
Non-Final Office Action received for U.S. Appl. No. 14/658,394 dated Aug. 19, 2019, 70 pages.
First Office Action received for Chinese Patent Application Serial No. 201710778822.6 dated Jun. 24, 2019, 29 pages (Including English Translation).
Second Office Action received for Chinese Patent Application Serial No. 201710339669.7 dated Jul. 2, 2019, 20 pages (Including English Translation).
Final Office Action received for U.S. Appl. No. 15/714,333 dated Oct. 25, 2019, 35 pages.
Non-Final Office Action received for U.S. Appl. No. 15/970,932 dated Nov. 14, 2019, 122 pages.
Second Office Action received for Chinese Patent Application Serial No. 201710778822.6 dated Sep. 20, 2019, 5 pages.

* cited by examiner

USING CLOUD-BASED DATA FOR VIRTUALIZATION OF AN INDUSTRIAL AUTOMATION ENVIRONMENT WITH INFORMATION OVERLAYS

RELATED APPLICATIONS

This application is a continuation of pending U.S. patent application Ser. No. 14/088,014, filed on Nov. 22, 2013, entitled "USING CLOUD-BASED DATA FOR VIRTUALIZATION OF AN INDUSTRIAL AUTOMATION ENVIRONMENT WITH INFORMATION OVERLAYS", which claims the benefit of U.S. Provisional Patent Application Ser. No. 61/821,639, filed on May 9, 2013, and entitled "REMOTE SERVICES AND ASSET MANAGEMENT SYSTEMS AND METHODS." The entireties of the aforementioned applications are hereby incorporated herein by reference.

TECHNICAL FIELD

The subject application relates generally to industrial automation, and, more particularly, to using cloud-based data for virtualization of an industrial automation environment with information overlays.

BACKGROUND

Industrial controllers and their associated input/output (I/O) devices can be useful to the operation of modern industrial automation systems. These industrial controllers can interact with field devices on the plant floor to control automated processes relating to such objectives as product manufacture, material handling, batch processing, supervisory control, and other such applications. Industrial controllers can store and execute user-defined control programs to effect decision-making in connection with the controlled process. Such programs can include, but are not limited to, ladder logic, sequential function charts, function block diagrams, structured text, or other such programming structures. In general, industrial controllers can read input data from sensors and metering devices that can provide discreet and telemetric data regarding one or more states of the controlled system, and can generate control outputs based on these inputs in accordance with the user-defined program.

In addition to industrial controllers and their associated I/O devices, some industrial automation systems also can include low-level control systems, such as vision systems, barcode marking systems, variable frequency drives, industrial robots, and the like, which can perform local control of portions of the industrial process, or which can have their own localized control systems.

During operation of a given industrial automation system, comprising a collection of industrial devices, industrial processes, other industrial assets, and network-related assets, users (e.g., operators, technicians, maintenance personnel, etc.) typically can monitor or manage operations of the industrial automation system, perform maintenance, repairs, or upgrades on the industrial automation system, or perform other tasks in connection with operation of the industrial automation system. The above-described description of today's industrial control and business systems is merely intended to provide a contextual overview of relating to conventional industrial automation systems, and is not intended to be exhaustive.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Various aspects and embodiments of the disclosed subject matter relate to the use of data analysis in a cloud platform to facilitate generating, updating, or using a virtualized industrial automation system to facilitate interacting with (e.g., facilitate remote monitoring of, tracking of, controlling of, etc.) an industrial automation system. A virtualization component can employ a collection component (e.g., a cloud-based collection component) that can collect industrial-automation-system-related data from one or more industrial automation systems of one or more industrial customers for storage (e.g., in a cloud-based data store) and analysis on a cloud platform.

A virtualization management component can analyze the data and can generate a virtualized industrial automation system of the industrial automation system based at least in part on the analysis results. The virtualized industrial automation system can be a multi-dimensional (e.g., three-dimensional (3-D) or two-dimensional (2-D)) virtualized industrial automation system that can present a multi-dimensional virtualized view (e.g., 3-D view or 2-D view) of an industrial automation system, or can be a virtualized dashboard view of the industrial automation system. The virtualization management component also can receive information relating to user interactions with the virtualized industrial automation system via a communication device of the user to facilitate remotely interacting with, monitoring, tracking, and/or controlling the industrial automation system. In some implementations, in response to information relating to user interactions with the virtualized industrial automation system in connection with remotely controlling the industrial automation system, the virtualization management component can generate a corresponding control signal(s), and can communicate (e.g., transmit) the control signal(s) to the industrial automation system to facilitate controlling (e.g., remotely controlling) operation of the industrial automation system. The virtualization management component also can update the virtualized industrial automation system based at least in part on (e.g., in response to) operation of, and user interactions with, the virtualized industrial automation system or the industrial automation system (e.g., via the virtualized industrial automation system).

In some implementations, the virtualization management component can customize a user's view of, and/or a customized data overlay associated with, the virtualized industrial automation system on the user's communication device and/or filter data associated with the virtualized industrial automation system presented on the user's communication device to the user based at least in part on the role of the user in connection with the industrial automation system, the authorization or access rights of a user to access the virtualized industrial automation system or the industrial automation system, the location of the user (e.g., the location of the user's communication device or radio-frequency identification (RFID) tag of the user) in relation to the industrial automation system (e.g., the location of the user within (or outside) the facility (e.g., plant) that comprises the industrial automation system), preferences of the user with respect to the virtualized industrial automation system, a filter(s) (e.g., a selected data filter(s)), or other defined virtualization management criteria, wherein different views of the virtualized industrial automation system, which can comprise different data overlays (e.g., role-centric data overlays), can be presented on different communication devices of different users. The virtualization management component also can facilitate enabling a user, via the user's communication device, to apply a desired filter(s) to filter data associated with the user's view (e.g., customized view) of the virtualized industrial automation system, for example, to present a subset of the data that is relevant to a work task that the user is performing at the time, present more detailed data or a drilled-down view regarding a certain portion of the virtualized industrial automation system and associated industrial automation system, or present data filtered based at least in part on other criteria.

The virtualization management component also can share a customized view (e.g., personalized view) of a virtualized industrial automation system displayed on the communication device of a user with a communication device(s) of another user(s), in accordance with the defined virtualization management criteria (e.g., when another user is authorized to access such personalized view on that other user's communication device, and/or based in part on the role of that other user in connection with the industrial automation system, etc.). The virtualization management component can facilitate enabling a user to use the communication device to generate a virtual note, comprising desired information (e.g., user-generated information relating to a portion of the industrial automation system represented by the virtualized portion of the virtualized industrial automation system, and apply or place the virtual note to the virtualized portion of the virtualized industrial automation system. The virtualization management component can facilitate enabling a user, using the communication device, to control the scope of the virtual note to control the viewability of the virtual note by another user(s), for example, on the communication device(s) of the other user(s), in accordance with the defined virtualization management criteria (e.g., when the other user is authorized to access or view the virtual note on that other user's communication device, and/or based in part on the role of that other user in connection with the industrial automation system, etc.). The virtual note can be employed, for example, to tag a problem or abnormal operating condition associated with the portion of the industrial automation system, for use as a shift report (e.g., from a user on one work shift to another user on the next work shift), to remind the user (or another user(s)) of something in connection with that portion of the industrial automation system, to notify another user(s) that some work task (e.g., maintenance, repair, or replacement task, etc.) is to be performed in connection with the industrial automation system, for another desired reason.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
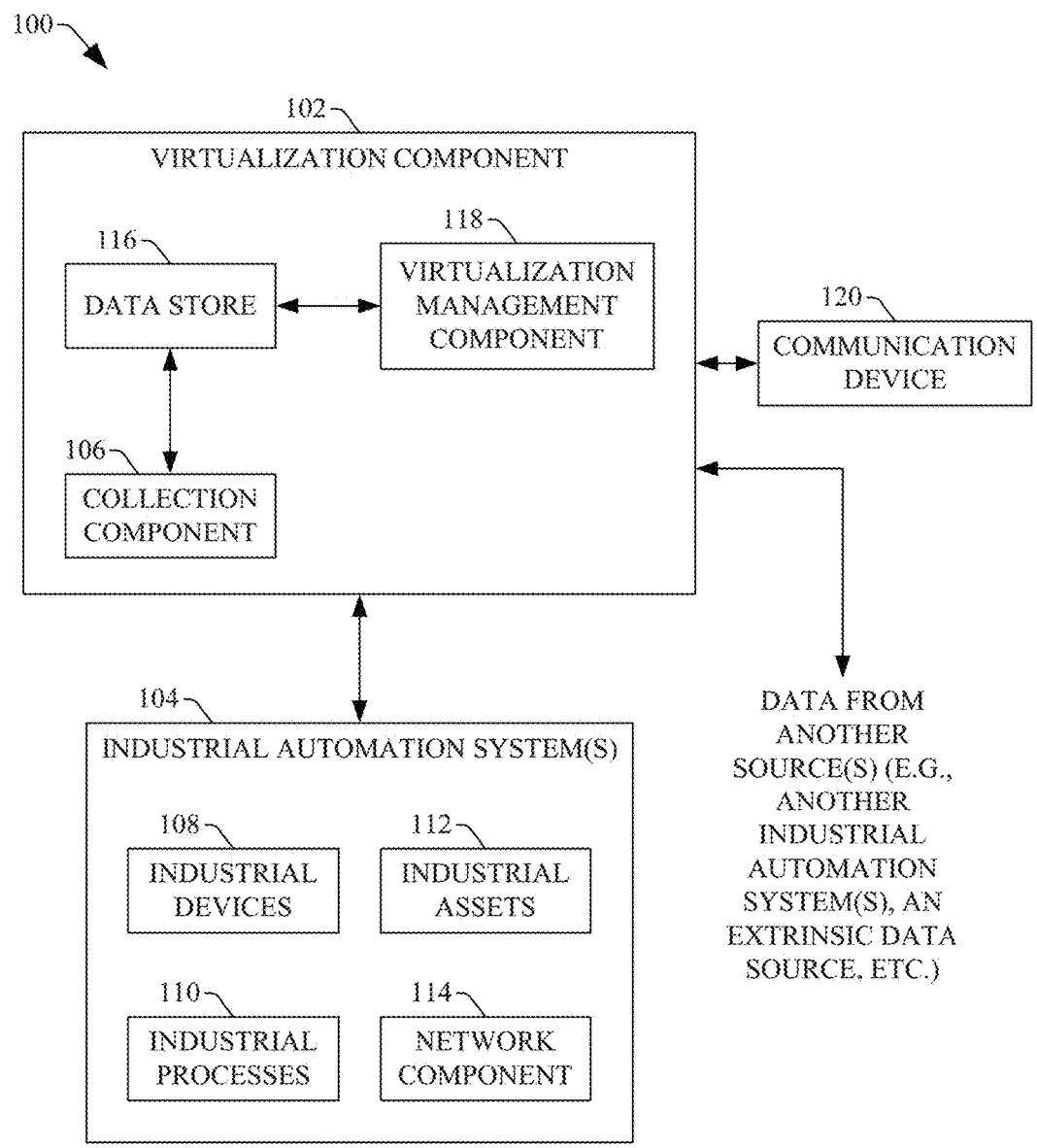
FIG. 1 illustrates a block diagram of an example system (e.g., virtualization system) that can facilitate generation and management of a virtualized industrial automation system that can correspond to an industrial automation system associated with an industrial enterprise based at least in part on cloud-based data relating to the industrial enterprise, in accordance with various implementations and embodiments of the disclosed subject matter.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

Industrial automation systems can perform various processes to produce desired products or processed materials. An industrial automation system can comprise various industrial devices, industrial processes, other industrial assets, and network-related assets (e.g., communication network devices and software). During operation of a given industrial automation system, users, such as, for example, operators, technicians, maintenance personnel, typically can monitor or manage operations of the industrial automation system, perform maintenance, repairs, or upgrades on the industrial automation system, or perform other tasks in connection with operation of the industrial automation system.

To that end, presented are various systems, methods, and techniques of the disclosed subject matter that relate to the use of data analysis (e.g., big data analysis) in a cloud platform to facilitate generating a virtualized industrial automation system of an industrial automation system that can be used to facilitate interacting with (e.g., facilitate remote monitoring operation of, tracking operation of, controlling operation of, etc., via a communication device) the industrial automation system, and providing user's with an augmented reality, unique (e.g., role-centric) information overlays, and information sharing capabilities in connection with the virtualized industrial automation system and associated industrial automation system. The various systems, methods, and techniques of the disclosed subject matter also can facilitate customizing a user's view of the virtualized industrial automation system on the user's communication device based at least in part on the user's role, level of authorization, location, or preferences, or other defined virtualization management criteria in connection with the industrial automation system or associated virtualized industrial automation system.

A cloud-based virtualization generation service (e.g., employing a collection component) can collect industrial-automation-system-related data from one or more industrial automation systems of one or more industrial customers (e.g., industrial enterprises) for storage (e.g., in a cloud-based data store) and analysis on a cloud platform. A virtualization management component can analyze the data and generate (e.g., create, build, construct, etc.) a virtualized industrial automation system that can correspond to and graphically represent the industrial automation system based at least in part on the results of the data analysis. The virtualized industrial automation system also can comprise a virtualized network component that can correspond to and graphically represent a network component (e.g., a wireline and/or wireless communication network) that can be integrated or interfaced with the other portions (e.g., industrial devices, industrial processes, industrial assets, etc.) of the industrial automation system. The virtualization management component also can facilitate interfacing the virtualized industrial automation system with the industrial automation system to facilitate using the virtualized industrial automation system to remotely interact with and/or control operation of the industrial automation system (e.g., via a communication device).

The virtualized industrial automation system can comprise a multi-dimensional virtualized industrial automation system that can provide multi-dimensional virtualized views (e.g., three-dimensional (3-D) views or two-dimensional (2-D views)) of the industrial automation system from various visual perspectives (e.g., various viewing angles). In some implementations, the virtualized industrial automation system can comprise a dashboard (e.g., a graphical representation of a dashboard) that can be a virtual view of all or a portion of the parameters, controls, alert indicators, etc., associated with the industrial automation system. The virtualized industrial automation system can be stored in the cloud-based data store. The virtualized industrial automation system, or a portion thereof, also can be provided to (e.g., communicated to) and displayed on communication devices of respective users (e.g., for remote display of the virtualized industrial automation system on such communication devices).

Using a communication device (e.g., computer, mobile phone (e.g., smart phone), electronic pad or tablet, electronic glasses (e.g., smart glasses) with communication functionality, Internet Protocol (IP) television (IPTV), etc.), a user can interact with a virtual industrial automation system associated with (e.g., interfaced with) a corresponding industrial automation system via a communication device of the user to facilitate interacting with and/or controlling (e.g., remotely interacting with and/or controlling) the industrial automation system based at least in part on the user's interactions with the virtual industrial automation system via the communication device of the user. For instance, the virtualization management component can receive input information (e.g., user input, such as gestures (e.g., gestures on a touch screen), keystrokes, mouse clicks, selections, voice commands, etc., of the user) relating to user interactions with the virtualized industrial automation system via the communication device of the user that can facilitate controlling the virtualized operation of the virtual industrial automation system to facilitate correspondingly controlling the operation of the industrial automation system. The virtualization management component can generate control signals based at least in part on the user interactions with the virtualized industrial automation system, and can transmit the control signals to the industrial automation system to facilitate controlling operation of the industrial automation system in response to, and based at least in part on (e.g., in correspondence with), the user interactions with the virtualized industrial automation system.

The virtualization management component can update (e.g., automatically, dynamically, or continuously update, in real or at least near real time) the virtualized industrial automation system based at least in part on collected data relating to the operation of the industrial automation system (e.g., in response to a user interaction with the virtualized industrial automation system) and user interactions with the industrial automation system. The virtualization management component also can update (e.g., automatically or dynamically update, in real or at least near real time) the virtualized industrial automation system, based at least in part on any modification to the industrial automation system, to generate a modified virtualized industrial automation system that can virtualize any modification made to the industrial automation system.

In some implementations, the virtualization management component can customize a user's view of the virtualized industrial automation system on the user's communication device or filter data associated with the virtualized industrial automation system presented on the user's communication device to the user based at least in part on the role of the user in connection with the industrial automation system, the authorization or access rights of a user to access the virtualized industrial automation system or the industrial automation system, the location of the user (e.g., the location of the user's communication device or radio-frequency identification (RFID) tag of the user) in relation to the industrial automation system (e.g., the location of the user within (or outside) the facility (e.g., plant) that comprises the industrial automation system), preferences of the user with respect to the virtualized industrial automation system, or other defined virtualization management criteria, wherein different views of the virtualized industrial automation system, which can comprise different data overlays (e.g., role-centric data overlays), can be presented on different communication devices of different users. The virtualization management component also can facilitate enabling a user, via the user's communication device, to apply a desired filter(s) to filter data associated with the user's view (e.g., customized view) of the virtualized industrial automation system, for example, to present a subset of the data that is relevant to a work task that the user is performing at the time, present more detailed data or a drilled-down view regarding a certain portion of the virtualized industrial automation system and associated industrial automation system.

The virtualization management component also can share a customized view (e.g., personalized view) of a virtualized industrial automation system displayed on the communication device of a user with a communication device(s) of another user(s), in accordance with the defined virtualization management criteria (e.g., when another user is authorized to access such personalized view on that other user's communication device, and/or based in part on the role of that other user in connection with the industrial automation system, etc.). The virtualization management component can facilitate enabling a user to use the communication device to generate a virtual note, comprising desired information (e.g., information relating to a portion (e.g., an industrial device, an industrial process, an industrial asset, or a network-related device, etc.) of the industrial automation system represented by the virtualized portion (e.g., a virtualized industrial device, virtualized industrial process, virtualized industrial asset, or virtualized network-related device, etc.) of the virtualized industrial automation system, and apply the virtual note to (e.g., attach, link, associate, place, etc., the virtual note to, with, or on) the virtualized portion of the virtualized industrial automation system. The virtualization management component can facilitate enabling a user, using the communication device, to control the scope of the virtual note to control the viewability of the virtual note by another user(s), e.g., on the communication device(s) of the other user(s), in accordance with the defined virtualization management criteria (e.g., when the other user is authorized to access or view the virtual note on that other user's communication device, and/or based in part on the role of that other user in connection with the industrial automation system, etc.). The virtual note can be employed, for example, to tag a problem or abnormal operating condition associated with the portion of the industrial automation system, for use as a shift report (e.g., from a user on one work shift to another user on the next work shift), to remind the user (or another user(s)) of something in connection with that portion of the industrial automation system, to notify another user(s) that some work task (e g, maintenance, repair, or replacement task, etc.) is to be performed in connection with the industrial automation system, for another desired reason.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or application programming interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 illustrates a block diagram of an example system 100 (e.g., a virtualization system) that can facilitate generation and management of a virtualized industrial automation system that can correspond to an industrial automation system associated with an industrial enterprise based at least in part on cloud-based data relating to the industrial enterprise, in accordance with various implementations and embodiments of the disclosed subject matter. The virtualized industrial automation system generated and managed by the system 100 can be customized on a user basis to provide respective users with respective augmented reality representations of the industrial automation system environment and respective data overlays (e.g., role-centric data overlays) associated with respective customized views of the virtualized industrial automation system. The system 100 also can facilitate enabling a user to share the user's customized view of the virtualized industrial automation system and/or desired data relating thereto, create a virtual note that can be associated with (e.g., placed on) a virtualized portion of the virtualized industrial automation system for viewing by the user or another user(s), or utilize other features of the disclosed subject matter, as more fully disclosed herein.

The system 100 can include a virtualization component 102 that can facilitate generation and management of a virtualized industrial automation system that can correspond to an industrial automation system 104 based at least in part on data (e.g., industrial-automation-system-related data) obtained from the industrial automation system 104, another industrial automation system(s), or from other sources (e.g., extrinsic sources), in accordance with defined virtualization management criteria.

The virtualization component 102 can employ and provide a variety of services including a cloud-based virtualization generation service. As part of providing cloud-based virtualization generation service, the virtualization component 102 can perform data analysis (e.g., big data analysis) in a cloud platform to facilitate generating a virtualized industrial automation system of an industrial automation system that can be used to facilitate interacting with (e.g., remotely monitoring operation of, tracking operation of, controlling operation of, etc., via a communication device) the industrial automation system 104. As more fully disclosed herein, the virtualization component 102, as part of providing the cloud-based virtualization generation service, can employ a collection component 106 (e.g., data collection component) that can collect industrial-automation-system-related data from one or more industrial automation systems of one or more industrial customers (e.g., industrial enterprises) for storage (e.g., in a cloud-based data store) and analysis (e.g., by the virtualization component 102) on a cloud platform. The collection component 106 can be associated with (e.g., interfaced with and/or communicatively connected to) the industrial automation system 104 associated with an industrial enterprise.

The industrial automation system 104 can comprise one or more industrial devices 108, industrial processes 110, or other industrial assets 112 that can be distributed throughout an industrial facility(ies) in accordance with a desired industrial-automation-system configuration. The industrial automation system 104 can perform industrial processes or other actions to facilitate producing desired products, processed materials, etc., as an output.

The industrial automation system 104 also can include a network component 114 that can be associated with (e.g., integrated with, interfaced with, and/or communicatively connected to) the various industrial devices 108, industrial processes 110, and/or other industrial assets 112 of the industrial automation system 104 to facilitate communication of information (e.g., command or control information, status information, production information, etc.) between the various industrial devices 108, industrial processes 110, and/or other industrial assets 112 via the network component 114. The network component 114 can be associated with (e.g., interfaced with, communicatively connected to) the collection component 106 to facilitate the communication of data between the industrial automation system 104 and the collection component 106. The network component 114 can comprise network-related devices (e.g., communication devices, routers (e.g., wireline or wireless routers), switches, etc.), wherein respective network-related devices can be connected to or interfaced with certain other network-related devices to form a communication network having a desired communication network configuration. One or more network-related devices of the network component 114 can be connected to or interfaced with one or more industrial devices 108, industrial processes 110, and/or other industrial assets 112 to facilitate collecting data (e.g., industrial-automation-system-related data) from the one or more industrial devices 108, industrial processes 110, and/or other industrial assets 112 or communicating information (e.g., control signals, parameter data, configuration data, etc.) to the one or more industrial devices 108, industrial processes 110, and/or other industrial assets 112.

The virtualization component 102 can monitor or track the operation of the industrial automation system 104, including monitoring and tracking the respective operations of respective industrial devices 108, industrial processes 110, industrial assets 112, and/or network-related devices of the network component 114. The collection component 106 can receive, obtain, detect, or collect data relating to the operation of the industrial automation system 104 and the network component 114, as desired (e.g., automatically, dynamically, or continuously, in real or near real time), in accordance with the defined virtualization management criteria. For example, the collection component 106 can receive data relating to the industrial devices 108 (e.g., operation or status of the industrial devices, properties or characteristics of the industrial devices, maintenance records of the industrial devices, configurations of the industrial devices, etc.), industrial processes 110 (e.g., operation or status of the industrial processes, properties or characteristics of the industrial processes, maintenance records associated with the industrial processes, configurations of the industrial processes, etc.), and the other industrial assets 112 (e.g., operation or status of the industrial assets, properties or characteristics of the industrial assets, maintenance records associated with the industrial assets, configurations of the industrial assets, etc.). The collection component 106 also can receive or collect data relating to operation of the sub-components (e.g., network-related devices) of the network component 114 (e.g., operation or status of the network devices or assets, communication conditions associated with a communication channel, total bandwidth of a communication channel, available bandwidth of a communication channel, properties or characteristics of the network devices or assets, maintenance records associated with the network devices or assets, configurations of the network devices or assets, etc.).

The virtualization component 102 also can comprise a data store 116 that can be associated with (e.g., interfaced with, communicatively connected to) the collection component 106. The collection component 106 can provide (e.g., communicate, write, etc.) the data received or collected from the industrial automation system 104 and the network component 114 to the data store 116 for storage in the data store 116.

The virtualization component 102 further can include a virtualization management component 118 that can generate and manage a virtualized industrial automation system that can correspond to the industrial automation system 104 based at least in part on data obtained from the industrial automation system 104, another industrial automation system(s), or from other sources (e.g., extrinsic sources), in accordance with defined virtualization management criteria. The virtualization management component 118 can be associated with (e.g., interfaced with, communicatively connected to) the data store 116 to facilitate obtaining the data to facilitate generating and managing the virtualized industrial automation system of the industrial automation system 104.

In some implementations, the virtualization component 102, the collection component 106, the data store 116, and/or the virtualization management component 118, can be located in a cloud platform that can be interfaced with the industrial automation system 104. In accordance with various other implementations, one or more of the collection component 106, the data store 116, the virtualization management component 118, and/or various other portions of the virtualization component 102 can be located at the plant or original equipment manufacturer (OEM) level associated with the industrial automation system 104, or can be located in a different platform or level.

The virtualization management component 118 can analyze data stored in the data store 116 and/or other data (e.g., other industrial-automation-system-related data and/or other data, such as extrinsic data), and can generate (e.g., create, build, construct, etc.) a virtualized industrial automation system that can correspond to the industrial automation system 104 based at least in part on the results of the data analysis, in accordance with the defined virtualization management criteria. The virtualized industrial automation system also can comprise a virtualized network component that can correspond to the network component 114 (e.g., a wireline and/or wireless communication network) that can be integrated or interfaced with the other portions (e.g., industrial devices 108, industrial processes 110, industrial assets 112, etc.) of the industrial automation system 104. The virtualization management component 118 can thereby virtualize the automation or control environment as well as the network environment (e.g., an information technology (IT) view of the network environment) that can represent and be associated with (e.g., interfaced with) the industrial automation system 104. For instance, the virtualization management component 118 can generate a virtualized industrial automation system that can virtualize (e.g., comprise virtualized versions of) the industrial devices 108, industrial processes 110, industrial assets 112, and network-related devices of the network component 114, etc., including virtualizing the respective features and configurations (e.g., respective functions, controls, parameters, settings, etc.) of the industrial devices 108, industrial processes 110, industrial assets 112, and network-related devices of the network component 114, etc., and virtualizing respective connections, interactions, or interrelationships between respective industrial devices 108, industrial processes 110, industrial assets 112, and/or network-related devices of the network component 114, etc., to virtualize the configuration of the industrial automation system 104 to generate the corresponding virtualized industrial automation system. In some implementations, to facilitate analyzing the data, as desired (e.g., when appropriate), the virtualization management component 118 can normalize data to facilitate generating data with normalized values that can be used to facilitate generating the virtualized industrial automation system.

To facilitate generating a virtualized industrial automation system that can correspond to and be associated with (e.g., can interact or be interfaced with) the industrial automation system 104, the virtualization management component 118 can access the data store 116 (e.g., cloud-based data store) to obtain a set of data relating to the industrial automation system 104 and/or another industrial automation system (e.g., another system comprising an industrial device(s), process(es), and/or asset(s) that can be the same or similar to an industrial device(s) 108, process(es) 110, and/or asset(s) 112 of the industrial automation system 104). The set of data can comprise information relating to, for example, the respective properties, characteristics, functions, configurations, etc., of respective industrial devices 108, industrial processes 110, other industrial assets 112, or network-related devices of the network component 114; or the configuration of industrial devices 108, industrial processes 110, or other industrial assets 112 in relation to each other. For example, the properties or characteristics for industrial devices 108 or industrial processes 110 can comprise mechanical or process properties or characteristics associated with industrial devices or processes (e.g., mechanical latency, process cycle times, operating schedules, etc., associated with industrial devices). As another example, the properties or characteristics for network-related devices can comprise communication properties or characteristics (e.g., wireless and/or wireline communication functionality, type(s) of network or communication protocol(s), network or communication specifications, total bandwidth, etc.) of the respective network-related devices.

The set of data also can comprise information relating to, for example, the configuration of the network-related devices in relation to each other, or the configuration of network-related devices in relation to the industrial devices 108, industrial processes 110, and/or other industrial assets 112; software, firmware, and/or operating system utilized by the industrial automation system 104 (e.g., type(s), version(s), revision(s), configuration(s), etc., of the software, firmware, and/or operating system); functional and communicative relationships between industrial devices 108, industrial processes 110, industrial assets 112, network-related devices of the network component 114, etc. (e.g., communication connections or conditions between industrial devices, types of connections between industrial devices, communication connections between industrial devices and network-related devices, etc.). The set of data further can include information relating to, for example, human behavior or interaction in connection with the industrial automation system 104 (e.g., maintenance schedules, shift-specific or operator-specific behavior or interaction of operators with the industrial automation system); production or process flows of the industrial automation system 104 at particular times or in connection with particular projects; and/or other aspects or features of the industrial automation system 104.

The virtualized industrial automation system generated and managed by the virtualization management component 118 can be or can comprise a multi-dimensional virtualized industrial automation system that can provide multi-dimensional virtualized views (e.g., three-dimensional (3-D) views or two-dimensional (2-D views)) of the industrial automation system 104, or a portion thereof, from various visual perspectives. In some implementations, the virtualization management component 118 can generate and manage a virtualized industrial automation system that can comprise a dashboard (e.g., a virtualized dashboard, a graphical representation of a dashboard) that can comprise a virtual view of all or a portion of the parameters, controls, alert indicators, etc., associated with the industrial automation system 104. For instance, the virtualization management component 118 can leverage the rich set of historical and live data (e.g., industrial-automation-system-related data and other data) that can be collected in the cloud (e.g., via the collection component 106) to create interactive, multi-dimensional (e.g., 3-D, 2-D) virtualizations or other interactive virtualizations (e.g., a dashboard virtualization) of a user's plant environment (e.g., the portion of the plant relevant to the user's role or job at the plant) that can facilitate remote (virtualized) viewing, interaction with, and/or control of industrial devices 108, industrial processes 110, industrial assets 112, network-related devices, etc., on the plant floor of the industrial automation system 104 via the communication device 120 of the user.

In some implementations, a 3-D virtualized industrial automation system generated by the virtualization management component 118 can comprise parallax information (e.g., horizontal and vertical parallax information) and depth information that can recreate and/or virtualize the industrial automation system, including recreating and/or virtualizing the relationships between objects (e.g., devices, processes, assets, etc.) of the industrial automation system (e.g., recreating and/or virtualizing geo-spatial relationships of objects, relative distances of objects from a user at the user's viewpoint, providing depth perception with respect to objects, etc.). The user can use the user's communication device 120 (e.g., by interacting with controls provided by the virtualization service or application) to interact with the multi-dimensional virtualized industrial automation system. For example, using the user's communication device 120 (e.g., computer, phone, electronic pad or tablet, electronic (e.g., smart) glasses with communication capabilities and functionality, etc.), the user can be immersed (e.g., visually and/or audially) within the multi-dimensional (e.g., 3-D) virtualized industrial automation system associated with an industrial automation system such that the user can experience (e.g., visually or audially) or interact with the multi-dimensional (e.g., 3-D) virtualized industrial automation system in a manner similar to if the user was in the plant viewing the industrial automation system, wherein the user can use controls (e.g., provided by the virtualization service or application) provided on the communication device to virtually walk around through and interact with the virtualized industrial automation system to facilitate remotely interacting with the industrial automation system.

The virtualized industrial automation system generated by the virtualization management component 118 can include graphical and/or virtualized representations of the various industrial devices 108, industrial processes 110, industrial assets 112, network-related devices, etc., of the industrial automation system 104 and data (e.g., industrial-automation-system-related data or other data) that can be overlaid on and/or provided in proximity to the graphical and/or virtualized representations. The graphical and/or virtualized representations of the various industrial devices 108, industrial processes 110, industrial assets 112, network-related devices, etc., generated by the virtualization management component 118 can comprise one or more respective instances (e.g., virtualized instances) of the various industrial devices 108, industrial processes 110, industrial assets 112, network-related devices, etc. The graphical and/or virtualized representations of the various industrial devices 108, industrial processes 110, industrial assets 112, network-related devices, etc., also can comprise (e.g., as applicable) graphical and/or virtualized representations of controls (e.g., virtualized controls), switches (e.g., virtualized switches), conveyors (e.g., virtualized conveyors), or other parts (e.g., virtualized parts), that can correspond to the various controls, switches, conveyors, or other parts of or associated with the various industrial devices 108, industrial processes 110, industrial assets 112, network-related devices, etc., of the industrial automation system 104. When in accordance with the user's access rights to the virtualized industrial automation system and associated industrial automation system (e.g., via the virtualized industrial automation system), the user, using the user's communication device 120, can interact with the virtual industrial automation system to manipulate or adjust the virtualized controls, virtualized switches (e.g., switch a virtual switch on or off), etc., of the graphical and/or virtualized representations of the various industrial devices 108, industrial processes 110, industrial assets 112, network-related devices, etc., to facilitate remotely manipulating or adjusting the controls, switches, etc., of the various industrial devices 108, industrial processes 110, industrial assets 112, network-related devices, etc., of the industrial automation system 104.

In some implementations, the virtualization component 102 can facilitate capturing (e.g., via one or more capture components (e.g., one or more video cameras directed at various parts of the industrial automation system 104)) or obtaining video images of the industrial automation system 104, or a desired portion(s) thereof. The video images can be collected by the collection component 106 and stored in the data store 116. The virtualization management component 118 can overlay and/or integrate the video images (e.g., real time or near real time video images) of the industrial automation system 104 on and/or with the virtualized industrial automation system to augment the virtualized industrial automation system (e.g., to generate an augmented virtualized industrial automation system), wherein the video images of the industrial automation system 104 can provide visual data with the virtualized industrial automation system that may not be available via the virtualized industrial automation system by itself.

The virtualization management component 118 can store the virtualized industrial automation system in the data store 116 (e.g., cloud-based data store). The virtualization management component 118 also can provide (e.g., communicate) the virtualized industrial automation system, or a portion thereof, to the communication device(s) 120 of a user(s) (e.g., operator, technician, engineer, manager, maintenance or repair person, etc.) associated with the industrial automation system 104, wherein the communication device(s) 120 of the user(s) can present (e.g., display) the virtualized industrial automation system, or portion thereof, to the user(s) (e.g., for remote display of the virtualized industrial automation system on such communication device 120 for viewing by the user). For instance, the virtualization management component 118 can provide (e.g., communicate, present, etc.) one or more virtual interfaces comprising all or a portion of the virtualized industrial automation system of the industrial automation system 104 (e.g., comprising all of the virtualized industrial automation system or only the part(s) (e.g., only certain industrial device 108, processes 110, assets 112, or network-related devices) of the virtualized industrial automation system that the user desires or is permitted to access). The communication device 120 can be, for example, a computer (e.g., desktop computer, laptop computer), a mobile phone (e.g., smart phone, cellular phone), an electronic pad or tablet, electronic glasses (e.g., smart glasses) with communication functionality, an electronic watch with communication functionality, an Internet Protocol (IP) television (IPTV), or other type of suitable communication device.

The virtualization management component 118 can monitor the user's location (e.g., in relation to the industrial automation system 104), and interactions and behavior of the user in relation to the industrial automation system 104 or associated virtualized industrial automation system, to facilitate remote interaction with and/or control of (e.g., gesture-based interaction with and/or control of) the industrial devices 108, industrial processes 110, industrial assets 112, and/or network-related devices, etc., of the industrial automation system 104 via the communication device 120 of the user and the cloud platform. In some implementations, a user can interact with the virtual industrial automation system associated with (e.g., interfaced with) the corresponding industrial automation system 104 via the user's communication device 120 to facilitate interacting with and/or controlling (e.g., remotely interacting with and/or controlling) the industrial automation system 104 based at least in part on the user's interactions with the virtual industrial automation system via the communication device 120 of the user.

For instance, the user can view (e.g., monitor and/or track virtualized operation of) the virtual industrial automation system on the user's communication device 120, and can desire to adjust a control on the industrial automation system 104 to facilitate adjusting or controlling the operation of the industrial automation system 104. The virtual industrial automation system can comprise a virtualized control that can correspond to and/or be interfaced with the control of the industrial automation system 104. The user can input information (e.g., user input, such as gestures (e.g., gestures on a touch screen), keystrokes, mouse clicks, selections, voice commands, etc., of the user) to the user's communication device 120 to facilitate manipulating the virtualized control of the virtualized industrial automation system presented by (e.g., displayed on) the user's communication device 120 to facilitate adjusting the virtualized control, which can facilitate adjusting the corresponding control of the industrial automation system 104. The virtualization management component 118 can receive the input information, or corresponding control information (e.g., as generated by the communication device 120 based at least in part on the input information), relating to the user interactions with the virtualized industrial automation system via the communication device 120 of the user and communication network. The input information, or corresponding control information, can facilitate controlling the operation of the industrial automation system 104.

In response to the input information, or corresponding control information, the virtualization management component 118 can generate control signals that can be based at least in part on (e.g., that can correspond to) the user interactions with the virtualized industrial automation system. The virtualization management component 118 can transmit (e.g., in real or near real time) the control signals to the industrial automation system 104 to facilitate controlling (e.g., in real or near real time) operation of (e.g., adjusting the control of) the industrial automation system 104 in response to, and based at least in part on (e.g., in correspondence with), the user interactions with the virtualized industrial automation system.

To facilitate desirable (e.g., accurate, efficient, etc.) control of the operation of the industrial automation system 104 using the virtualized industrial automation system, the virtualization component 102 can obtain (e.g., automatically, dynamically, or continuously obtain, in real or at least near real time) data relating to the operation of the industrial automation system 104, user interactions with the industrial automation system 104 (e.g., either direct user interactions with the industrial automation system 104, or indirect or virtual user interactions with the industrial automation system 104 via user interactions with the virtual industrial automation system), and/or other data. For example, the virtualization component 102 can monitor and track the operational response of the industrial control system 104 in response to the control signals. The collection component 106 can obtain data, which can relate to the operational response of the industrial automation system 104 in response to the control signals, from the industrial control system 104.

The virtualization management component 118 can update the virtualized industrial automation system in response to the user interactions with the virtualized industrial automation system and in response to the data relating to the operational response of the industrial automation system 104 based at least in part on the user interactions with the virtualized industrial automation system. For instance, the virtualization management component 118 can update (e.g., automatically, dynamically, or continuously update, in real or at least near real time) the virtualized industrial automation system based at least in part on collected data relating to the operation of the industrial automation system, the user interactions with the industrial automation system, and/or other data. The virtualization management component 118 also can update (e.g., automatically or dynamically update, in real or at least near real time) the virtualized industrial automation system, based at least in part on any modification to the industrial automation system 104, to generate a modified virtualized industrial automation system that can virtualize any modification made to the industrial automation system 104.

As an exemplary scenario, in the industrial automation system 104, a motor short may have caused a fluid spill. The virtualization component 102 can detect the motor short and the fluid spill in the industrial automation system 104, and can collect data (e.g., via the collection component 106) relating to the motor short and fluid spill. The virtualization management component 118 can analyze the data, and can update the virtualized industrial automation system to present a graphical representation(s) and/or overlaid data associated with the industrial automation system 104 illustrating and/or relating to the motor short and fluid spill, based at least in part on the analysis results.

The virtualization management component 118 can provide (e.g., communicate, present, etc.) the updated virtualized industrial automation system, or desired portion thereof, to the communication device 120 of a user. Using the communication device 120, the user can remotely observe and interact with the virtualized industrial automation system, which can include a 3-D graphical representation of the motor, associated drive, and the portion of the industrial automation system 104 affected by the spill. The virtualization management component 118 can continue to update the virtualized industrial automation system in response to, and to reflect (e.g., to incorporate), changes to the industrial automation system 104 as they occur.

The user can interact with the updated virtualized industrial automation system presented on the communication device 120 to facilitate turning off the motor. For example, the user can make a gesture(s) (e.g., select a button, touch or swipe a control displayed on a touch screen, speak a voice command, type a command, etc.) in relation to the updated virtualized industrial automation system that indicates that the user is turning off the virtualized motor that corresponds to the motor of the industrial automation system 104 to facilitate turning off the motor. The communication device 120 can receive the gesture(s), and can communicate information (e.g., control or command related information) relating to the gesture(s) to the virtualization management component 118.

In response to the information received from the communication device 120, the virtualization management component 118 can detect that the user has performed a gesture(s) that, given the user's current view of the updated virtualized industrial automation system, indicates or corresponds to a command to turn off the motor of the industrial automation system 104. In response, the virtualization management component 118 can further update the virtualized industrial automation system to reflect (e.g., to graphically represent or display data illustrating) that the virtualized motor is being turned off. Further, in response, the virtualization management component 118 can generate and transmit a command (e.g., via the cloud platform) that can instruct a controller (e.g., of the industrial automation system 104) associated with the motor to transmit a stop or shut off command to the motor to facilitate turning off the motor and stopping or mitigating the spill. In response to the command received from the virtualization management component 118, the controller can transmit the stop or shut off command to the motor and the motor can be switched off in response to the stop or shut off command. In this way, the immediate effects of the malfunctioning motor can be curtailed before maintenance personnel are sent to the spill site.

As another example, in some implementations, the virtualization management component 118 can generate a virtualized view of the inner components, configuration of the inner components, operation of the inner components, faults of the inner components (e.g., when they occur), etc., of the industrial devices 108, industrial processes 110, industrial assets 112, and/or network-related devices of the network component 114, based at least in part on the data, in accordance with the defined virtualization management criteria. The virtualization management component 118 can provide (e.g., communicate, present) the inner virtualized view of an industrial device 108, an industrial process 110, an industrial asset 112, and/or a network-related device to the communication device 120 of a user, as desired. For example, if there is a problem with an industrial device 108 of the industrial automation system 104 detected, the user, using the communication device 120, can interact with the corresponding virtualized industrial device of the virtualized industrial automation system to access the virtualized inner components, configuration, operation, and/or fault, etc., of the virtualized industrial device. For instance, the user, using the communication device 120, can interact with the virtualized industrial device on the display screen of the communication device 120 to remove a virtualized panel of the virtualized industrial device to expose (e.g., display, present) the virtualized inner components, configuration, operation, and/or fault, etc., of the virtualized industrial device to the user via the communication device 120. In response to user interaction with the communication device 120, the user can navigate the inside of the virtualized industrial device to facilitate determining and/or rectifying the problem with the industrial device 108.

In some implementations, the virtualization management component 118 can employ or provide virtualization customization and/or data filtering services or applications. Via such virtualization customization and/or data filtering services or applications, the virtualization management component 118 can customize a user's view of the virtualized industrial automation system on the user's communication device 120 or filter data associated with the virtualized industrial automation system (and associated industrial automation system 104) presented on the user's communication device 120 to the user based at least in part on the role (e.g., operator, technician, manager, engineer, or other role) of the user in connection with the industrial automation system 104, the identity of the user or the user's communication device 120 or radio-frequency identification (RFID) tag, the authorization or access rights of a user to access the virtualized industrial automation system or the industrial automation system 104, authentication information (e.g., username, password, biometric information (e.g., voice information, fingerprint information, biometric information relating to the user's eye), etc.) presented by the user, the location of the user (e.g., the location of the user's communication device 120 or RFID tag of the user) in relation to the industrial automation system 104 (e.g., the location of the user within (or outside) the facility (e.g., plant) that comprises the industrial automation system 104), context of the data, preferences of a user (e.g., view customization preferences of the user), or other defined virtualization management criteria. For example, the virtualization management component 118 can customize the user's view of the virtualized industrial automation system on the user's communication device 120 or filter data associated with the virtualized industrial automation system presented on the user's communication device 120 to present, on the user's communication device 120, the portion of the virtualized industrial automation system and the portion of the overlaid data (e.g., industrial-automation-system-related data) desired by (e.g., of interest to) or permitted for viewing by the user. The virtualization management component 118 can generate and provide different views of the virtualized industrial automation system, which can comprise different data overlays (e.g., role-centric and/or user-preference based data overlays), for presentation on different communication devices 120 of different users, wherein the respective users can view and interact with the virtualized industrial automation system (e.g., virtualized plant) through their respective communication devices 120 to facilitate performing their respective work tasks to respectively remotely control the industrial automation system 104 via the respective customized views of the virtualized industrial automation system presented on their respective communication devices 120.

For example, the virtualization management component 118 can analyze data associated with a first user, a second user, and a third user, wherein the data can be data stored in the data store 116, data obtained from the first, second, and third users (e.g., via the users' communication devices 120), and/or data obtained from another data source(s). The data can specify or indicate the respective roles of the first, second, and third users with respect to the industrial automation system. For instance, first data associated with the first user can specify or indicate that the first user is a maintenance engineer, second data associated with the second user can specify or indicate that the second user is a shift supervisor, and third data associated with the third user can specify or indicate that the third user is a network engineer. Based at least in part on the results of the data analysis, the virtualization management component 118 can determine that the first user is a maintenance engineer, the second user is a shift supervisor, and the third user is a network engineer.

The virtualization management component 118 can generate different customized views of the virtualized industrial automation system and customized data overlays for each of the first, second, and third users based at least in part on their respective roles with respect to the industrial automation system 104. For instance, the virtualization management component 118 can determine and generate a first customized view of the virtualized industrial automation system based at least in part on the role of the first user being determined to be a maintenance engineer and/or one or more other customization factors (e.g., location of the first user with respect to the industrial automation system 104, a customization preference(s) of the first user, etc.), in accordance with the defined virtualization management criteria. The virtualization management component 118 also can determine a first subset of operational data that can be relevant to the first user in the first user's role as maintenance engineer, wherein the first subset of operational data can comprise data obtained from the data store 116 (e.g., as collected from the industrial automation system 104) and/or data being obtained from the industrial automation system 104 (e.g., automatically or dynamically, in real or near real time). The virtualization management component 118 can overlay the first subset of operational data on the first customized view of the virtualized industrial automation system. For example, the virtualization management component 118 can overlay the first subset of operational data (e.g., respective status information of respective industrial devices 108, industrial processes 110, and/or industrial assets 112) on or in proximity (e.g., near) to the corresponding virtualized industrial devices, virtualized industrial processes, and/or virtualized industrial assets presented in the first customized view of the virtualized industrial automation system.

The virtualization management component 118 also can determine and generate a second customized view of the virtualized industrial automation system based at least in part on the role of the second user being determined to be a shift supervisor and/or one or more other customization factors (e.g., location of the second user with respect to the industrial automation system 104, a customization preference(s) of the second user, etc.), in accordance with the defined virtualization management criteria. The virtualization management component 118 also can determine a second subset of operational data that can be relevant to the second user in the second user's role as shift supervisor, wherein the second subset of operational data can comprise data obtained from the data store 116 (e.g., as collected from the industrial automation system 104) and/or data being obtained from the industrial automation system 104 (e.g., automatically or dynamically, in real or near real time). The virtualization management component 118 can overlay the second subset of operational data on the second customized view of the virtualized industrial automation system. For example, the virtualization management component 118 can overlay the second subset of operational data (e.g., respective production statistics associated with respective industrial devices 108, industrial processes 110, and/or industrial assets 112) on or in proximity to the corresponding virtualized industrial devices, virtualized industrial processes, and/or virtualized industrial assets presented in the second customized view of the virtualized industrial automation system.

The virtualization management component 118 further can determine and generate a third customized view of the virtualized industrial automation system based at least in part on the role of the third user being determined to be a network engineer and/or one or more other customization factors (e.g., location of the third user with respect to the industrial automation system 104, a customization preference(s) of the third user, etc.), in accordance with the defined virtualization management criteria. The virtualization management component 118 also can determine a third subset of operational data that can be relevant to the third user in the second user's role as network engineer, wherein the third subset of operational data can comprise data obtained from the data store 116 (e.g., as collected from the industrial automation system 104) and/or data being obtained from the industrial automation system 104 (e.g., automatically or dynamically, in real or near real time). The virtualization management component 118 can overlay the third subset of operational data on the third customized view (e.g., IT view) of the virtualized industrial automation system. For example, the virtualization management component 118 can overlay the third subset of operational data (e.g., respective data usage information associated with respective network-related devices) on or in proximity to the corresponding virtualized network-related devices presented in the third customized view of the virtualized industrial automation system.

The virtualization management component 118 also can facilitate enabling a user, via the user's communication device 120, to apply a desired filter(s) to filter data associated with the user's view (e.g., customized view) of the virtualized industrial automation system, for example, to present a subset of the data that is relevant to a work task that the user is performing at the time, present more detailed data and/or a drilled-down view regarding a certain portion of the virtualized industrial automation system and associated industrial automation system 104, or for other reasons, as desired by the user. The virtualization management component 118 can provide a number of different types of filters to the communication devices 120 of users to enable the users to customize, augment, and/or filter data overlays for a user's personalized view of the virtualized industrial automation system. For example, the respective filters can be employed to facilitate filtering data to present a data overlay that can provide a summary or high-level abstract data regarding a particular portion of the industrial automation system 104; filtering data to present a data overlay relating to a particular industrial device 108, industrial process 110, industrial asset 112, or network-related device; filtering data to present a data overlay comprising more detailed information (e.g., drilled-down information) relating to a particular industrial device 108, industrial process 110, industrial asset 112, or network-related device than is presented with a current data overlay; filtering data for a data overlay based at least in part on type of data; filtering data for a data overlay based at least in part on a role of a user; filtering data based at least in part on a location of the user; filtering data based at least in part on a time associated with the data; filtering data based at least in part on a work shift (e.g., work-shift time period) associated with the data; and/or filtering data for a data overlay using another desired type of filter.

As an example of data filtering, the virtualization management component 118 can generate, and provide to the communication device 120 of a user, such as a network engineer, a customized view (e.g., an IT view) of the virtualized industrial automation system associated with the industrial automation system 104 and a data overlay associated with the customized view, based at least in part on the role (e.g., network engineer) of the user and/or preferences of the user, in accordance with the defined virtualization management criteria. For instance, the data overlay for the customized view of the virtualized industrial automation system can comprise bandwidth usage information that can be displayed over all or a desired portion of the virtualized network-related devices presented in the customized view of the virtualized industrial automation system, wherein the virtualized network-related devices can correspond to respective network-related devices of the network component 114 of the industrial automation system 104. In this example, as part of the original data overlay (e.g., original customized data overlay), the display screen of the user's communication device 120 can display an alarm (e.g., a graphical representation of an alarm) on or in proximity to a particular virtualized network-related device, wherein the alarm can indicate (e.g., can be known to indicate or can display data indicating) that bandwidth usage is reaching a slowdown level. If desired, the user (e.g., network engineer) can use the communication device 120 to select a filter (e.g., data filter) that can be placed on or used in connection with the user's customized view of the virtualized industrial automation system. The virtualized management system 118 can receive information relating to the selection of the filter from the communication device 120. In response, the virtualized management system 118 can modify (e.g., augment) the customized view of the virtualized industrial automation system (e.g., modify or augment the data overlay of the customized view of the virtualized industrial automation system) to overlay more detailed information relating to the respective bandwidth usage associated with respective network-related devices on or in proximity to respective virtualized network-related devices. For example, while the original data overlay presented an alarm indicator, on or in proximity to a particular network-related device, that indicates bandwidth usage is reaching a slowdown level, the augmented data overlay can present respective data overlay portions on or in proximity to the respective network-related devices presented on the display screen of the communication device 120, wherein the respective data overlay portions can comprise respective data that can indicate, e.g., which network-related devices are utilizing any of the bandwidth and how much bandwidth each of these network-related devices is using.

Data overlays also can be based at least in part on a current context (e.g., the user's location; a current operating condition associated with an industrial device 108, an industrial process 110, an industrial asset 112, or a network-related device; etc.). As a location-based example, the virtualization management component 118 can update, augment, filter, or customize the view (e.g., customized view), and/or data overlay, of the virtualized industrial automation system presented on the communication device 120 of a user based at least in part on the location of the user (e.g., the location of the user's communication device 120 or RFID tag of the user) with respect to the industrial automation system 104. For example, if the user is located in a first location in relation to the industrial automation system 104, the virtualization management component 118 can customize, augment, or filter a user's view of, and/or the data overlay associated with, the virtualized industrial automation system as presented on the user's communication device 120 so that the user can view a first view of, and/or a first data overlay associated with, the virtualized industrial automation system (e.g., presenting a first portion of the virtualized industrial automation system) that can correspond to the first location (e.g., wherein the first view can comprise an area of the industrial automation system 104 within a defined distance of the first location), in accordance with the access rights to the user, based at least in part on the defined virtualization management criteria. If the user is located in a second location in relation to the industrial automation system 104 (or moves from the first location to the second location), the virtualization management component 118 can update, augment, filter, or customize the user's view of the virtualized industrial automation system as presented on the user's communication device 120 so that the user can view the second view of, and/or a second data overlay associated with, the virtualized industrial automation system (e.g., presenting a second portion of the virtualized industrial automation system) that can correspond to the second location (e.g., wherein the second view can comprise an area of the industrial automation system 104 within a defined distance of the second location), in accordance with the access rights to the user, based at least in part on the defined virtualization management criteria.

The virtualization management component 118 also can share a customized view (e.g., personalized view) of, and/or customized data overlay associated with, a virtualized industrial automation system displayed on the communication device 120 of a user with a communication device(s) 120 of another user(s), in accordance with the defined virtualization management criteria (e.g., when another user is authorized to access such customized view or customized data overlay on that other user's communication device, and/or based in part on the role of that other user in connection with the industrial automation system 104, etc.). For example, a first user (e.g., first operator) can desire to share the first user's first customized view of, and/or first customized data overlay associated with, the virtualized industrial automation system with a second user (e.g., second operator, shift supervisor, maintenance engineer, etc.) via the second user's communication device 120. Alternatively, the second user can desire to view the first user's first customized view of, and/or first customized data overlay associated with, the virtualized industrial automation system. The first user, using the first user's communication device 120, can select a share control, or alternatively, the second user, using the second user's communication device 120, can select a share control (e.g., share request control), and information relating to selection of the share control can be sent from the communication device 120 to the virtualization management component 118.

In response, if the applicable virtualization management criteria have been satisfied (e.g., when it is determined that the second user is authorized to view the first user's first customized view of, and/or first customized data overlay associated with, the virtualized industrial automation system), the virtualization management component 118 can facilitate communicating the first user's first customized view of, and/or first customized data overlay associated with, the virtualized industrial automation system to the second user's communication device 120 for presentation to the second user. In some implementations, the first user's communication device 120 can directly communicate the first user's first customized view of, and/or first customized data overlay associated with, the virtualized industrial automation system to the second user's communication device 120 without the virtualization management component 118 having to be involved in the sharing process or the virtualization management component 118 can manage the authorization process to facilitate determining whether such sharing is permitted, while allowing the first user's communication device 120 to manage the communication of the first customized view and first data overlay to the second user's communication device 120, if such sharing is authorized by the virtualization management component 118.

In some implementations, in addition to or as an alternative to sharing a first user's customized view of, and/or customized data overlay associated with, the virtualized industrial automation system with another user, the virtualization management component 118 can facilitate enabling the first user, using the first user's communication device 120, to share, with another user, a filter, a set of filters, or filter settings, that the first user applied to facilitate generating the first user's customized view of, and/or customized data overlay associated with, the virtualized industrial automation system. The other user, via interacting with that other user's communication device 120, can apply the filter, the set of filters, or the filter settings obtained from the first user to the data overlay and/or the virtualized industrial automation system to facilitate generating the first user's customized view of, and/or customized data overlay associated with, the virtualized industrial automation system. In response, the virtualization management component 118 can facilitate generating and providing the first user's customized view of, and/or customized data overlay associated with, the virtualized industrial automation system to the communication device 120 of the other user for presentation to the user.

The system 100 also can facilitate enabling users to interact with the virtualized industrial automation system (e.g., to interact with the augmented reality representation of the system) to add desired information associated with and/or displayed with the virtualized industrial automation system to facilitate sharing user-generated information relating to the industrial automation system 104 or other user-generated information with other users who can view the virtualized industrial automation system via communication devices 120. For instance, the virtualization management component 118 (e.g., via provision of a virtual note generation service or application) can facilitate enabling a user to use the communication device 120 to generate a virtual note, that can comprise desired information (e.g., information relating to a portion (e.g., an industrial device, an industrial process, an industrial asset, or a network-related device, etc.) of the industrial automation system represented by the virtualized portion (e.g., a virtualized industrial device, virtualized industrial process, virtualized industrial asset, or virtualized network-related device, etc.) of the virtualized industrial automation system. A virtual note can be employed, for example, to tag a problem or abnormal operating condition associated with the portion of the industrial automation system 104, for use as a shift report (e.g., from a user on one work shift to another user on the next work shift to facilitate providing desired information to the other user on the next shift), to remind the user (or another user(s)) of something in connection with that portion of the industrial automation system 104, to notify another user(s) that some work task (e.g., maintenance, repair, or replacement task, etc.) is to be performed in connection with that portion of the industrial automation system 104 (e.g., provide a "breadcrumb" trail for maintenance personnel, e.g., by using a virtual note(s) to flag which machine requires repair, replacement, or installation of replacement part), to facilitate remote monitoring or support for an industrial automation system (e.g., by the entity operating the industrial automation system or by a $3^{rd}$-party entity providing such remote monitoring or support), or for another desired reason.

The virtualization management component 118 can facilitate enabling the user to use the communication device 120 to apply the virtual note to (e.g., attach, link, associate, place, etc., the virtual note to, with, or on) the virtualized portion of the virtualized industrial automation system. For instance, the user, using the communication device 120, can interact (e.g., via user gestures (e.g., on a touch screen), selections, keystrokes, mouse movements or commands, etc.) with the virtual note and/or the virtualized portion of the virtualized industrial automation system, wherein the interaction can indicate that the user is attempting to apply the virtual note on or in proximity to the virtualized portion of the virtualized industrial automation system. For example, the user can interact with the virtual note via the communication device 120 to drag-and-drop the virtual note on or in proximity to the virtualized portion of the virtualized industrial automation system. The virtualization management component 118 can receive information relating to the user's interactions with the virtual note and/or the virtualized portion of the virtualized industrial automation system from the communication device 120. In response, the virtualization management component 118 can facilitate applying the virtual note on or in proximity to the virtualized portion of the virtualized industrial automation system.

The virtualization management component 118 further can facilitate enabling a user, using the communication device 120, to control the scope of the virtual note to control the viewability of the virtual note on or associated with (e.g., in proximity to) the virtualized portion of the virtualized industrial automation system by another user(s), e.g., on the communication device(s) 120 of the other user(s), in accordance with the defined virtualization management criteria (e.g., when the other user is authorized to access or view the virtual note on that other user's communication device 120, and/or based in part on the role of that other user in connection with the industrial automation system 104, etc.). For instance, the user, using the communication device 120, can select a scope control associated with the virtual note, and can input information that can indicate the viewability scope of the virtual note to facilitate controlling which users can view the virtual note. Alternatively or additionally, the virtualization management component 118 can set the viewability scope or specify a minimum or maximum viewability scope for the virtual note, in accordance with the defined virtualization management criteria. The scope for a virtual note can range, for example, from allowing anyone (e.g., regardless of role) to view the virtual note on the virtualized portion of the virtualized industrial automation system, to allowing only users (e.g., regardless of role) who are logged in and authenticated with the virtualization management component 118 to view the virtual note on the virtualized portion of the virtualized industrial automation system, to allowing only users who provide authentication credentials that indicate they satisfy defined security criteria to view the virtual note on the virtualized portion of the virtualized industrial automation system, to allowing only users who have a particular role(s) to view the virtual note on the virtualized portion of the virtualized industrial automation system, to allowing only a certain user(s) specified by the user who created the virtual note to view the virtual note on the virtualized portion of the virtualized industrial automation system, to virtually any other desired viewability scope, in accordance with the defined virtualization management criteria.

As an example of using a virtual note, a user, using the user's communication device 120, can interact with the user's personalized view of the virtualized industrial automation system (e.g., the virtualized plant) to generate a virtual note and place the virtual note (e.g., a virtualized post-it note) on or near one of the virtual machine representations (e.g., on or near a virtualized industrial device) of the virtualized industrial automation system. The virtual note can comprise information from the user (e.g., a maintenance engineer) that can warn other users of an abnormal operating condition observed for a particular industrial device 108 associated with the virtualized industrial device. The user, using the communication device 120, also can interact with the scope control to set the viewability scope of the virtual note to facilitate controlling who is able to view the virtual note in connection with the virtualized industrial automation system. For instance, the user may desire that any user, who performs work tasks (e.g., as an operator, supervisor, engineer, etc.) in connection with any portion of the industrial automation system 104 that can be affected by the abnormal operating condition for the particular industrial device 108, should be able to view the virtual note. The user, using the communication device 120, can interact with the scope control and/or enter information that can indicate that such users are permitted to view the virtual note in connection with viewing the virtualized industrial automation system (e.g., viewing the virtualized industrial device). The virtualization management component 118 can receive information relating to the interaction with the scope control and/or associated information, and, in response, the virtualization management component 118 can set and enforce the viewability scope to allow such users to view the virtual note via their communication devices 120 and to not allow other users to view the virtual note via their communication devices 120.

By enabling users to generate and share user-generated information relating to the industrial automation system 104, the virtualization management component 118 can facilitate further augmenting the data-driven plant virtualizations (e.g., virtualized industrial automation system) to present users with user-provided data to facilitate the sharing of knowledge or observations relating to the industrial automation system 104 with other users. This can enable users to work more efficiently and the industrial automation system 104 to operate more efficiently.

In some implementations, the virtualization management component 118 can facilitate securing or controlling access to the virtualized industrial automation system and the industrial automation system 104, in accordance with the defined virtualization management criteria, to facilitate mitigating security risks associated with presenting the virtualized industrial automation system to communication devices of users and/or the execution of control commands via the system 100 (e.g., the cloud-based virtualized system). The virtualization management component 118 can control access to the virtualized industrial automation system and the industrial automation system 104 (e.g., via the virtualized industrial automation system), control access to a particular customized view or customized data overlay associated with the virtualized industrial automation system, and/or control access to user-generated information (e.g., contained in a virtual note), based at least in part on identity of a user, authentication information (e.g., username, password, passphrase, personal identification number (PIN), biometric information, or other unique identification information) associated with of a user, location of the user (or location of the user's communication device 120 or RFID tag) in relation to the industrial automation system 104, a viewability scope setting, preferences of a user, or other defined virtualization management criteria.

For example, if a user attempts to use the user's communication device to access the virtualized industrial automation system to facilitate controlling the associated industrial automation system 104, the virtualization management component 118 can request that the user provide valid authentication information to the virtualization management component 118 that indicates the user is authorized to gain such access to the virtualized industrial automation system and/or authorized to perform an action (e.g., adjust a virtualized control or switch) with respect to the virtualized industrial automation system or industrial automation system 104. In some implementations, the virtualization management component 118 can grant respective types of access rights to the virtualized industrial automation system and the industrial automation system 104 (e.g., via the virtualized industrial automation system) to respective users based at least in part on respective access permissions of the respective users and respective authentication information of the respective users, wherein the respective access permissions or rights can be associated with (e.g., mapped or linked to) the respective authentication information of the respective users. The access permissions or rights to the virtualized industrial automation system and the industrial automation system 104 (e.g., via the virtualized industrial automation system) can relate to the portion(s) of the virtualized industrial automation system that can be accessed by a user, the commands that can be issued by the user or the portion(s) of the virtualized industrial automation system (and corresponding portion(s) of the industrial automation system 104) that can be controlled by a user, etc. The virtualization management component 118 can grant, to respective users, respective (e.g., different) access permissions or rights the virtualized industrial automation system and the industrial automation system 104 (e.g., via the virtualized industrial automation system) based at least in part on the respective roles of the respective users in connection with the industrial automation system 104 or associated industrial enterprise, a location of a user in relation to the industrial automation system 104, or other defined virtualization management criteria.

If a user does not provide acceptable (e.g., valid) authentication information, or is not within a defined distance of a portion (e.g., an industrial device 108, industrial process 110, industrial asset 112, etc.) of the industrial automation system 104 that the user is attempting to control via a command, the virtualization management component 118 can deny the user access to the virtualized industrial automation system and the industrial automation system 104 (e.g., via the virtualized industrial automation system) or can limit the access rights of the user to the virtualized industrial automation system and the industrial automation system 104 (e.g., via the virtualized industrial automation system) to allow the user to only issue a certain limited subset of commands to facilitate controlling the virtualized industrial automation system and the industrial automation system 104 (e.g., via the virtualized industrial automation system).

In some implementations, the virtualization management component 118 can employ different levels of authentication to a user to facilitate determining access permissions or rights that are to be granted to the user to allow access to the virtualized industrial automation system and the industrial automation system 104 (e.g., via the virtualized industrial automation system) based at least in part on the location (e.g., detected location) of the user (or the user's communication device 120 or identification tag (e.g., RFID tag)) in relation to the industrial automation system 104, in accordance with the defined virtualization management criteria. For instance, if the user (or the user's communication device 120 or identification tag) is within a defined distance of the portion of the industrial automation system 104 that the user is attempting to control via the virtualized industrial automation system presented by the communication device 120 (e.g., within the facility that contains the portion of the industrial automation system 104), the virtualization management component 118 can control access to the portion of the industrial automation system 104 via the virtualized industrial automation system presented by the communication device 120 based at least in part on a first level of authentication (and a corresponding first type of authentication information (e.g., authentication credentials)) that can be lower (e.g., less stringent) than a second level of authentication (and a corresponding second type (e.g., higher or more strict type) of authentication information) associated with a second location of the user (or the user's communication device 120 or identification tag) that is not within a defined distance of the portion of the industrial automation system 104 that the user is attempting to control via the virtualized industrial automation system presented by the communication device 120. If the user (or the user's communication device 120 or identification tag) is in the second location (or is not detected as being located within the defined distance of the portion of the industrial automation system 104), the virtualization management component 118 can control access to the portion of the industrial automation system 104 via the virtualized industrial automation system presented by the communication device 120 based at least in part on the second level of authentication (and a corresponding second type of authentication information).

The virtualization management component 118 can control access to the portion of the industrial automation system 104 to grant a first (e.g., lower) level of access rights to the user in response to receiving the first type of authentication information, and can grant a second (e.g., higher) level of access rights to the user in response to receiving the second type of authentication information, wherein the second level access rights can allow the user to use the communication device 120 to have more access to the virtualized industrial automation system and the industrial automation system 104 (e.g., via the virtualized industrial automation system) or more rights to issue commands in connection with the virtualized industrial automation system and the industrial automation system 104 (e.g., via the virtualized industrial automation system) than the first level of access rights associated with the first type of authentication information. As an example, the first type of authentication information can comprise detection (e.g., by the virtualization management component 118) of a device identifier of the communication device 120 or RFID tag of the user within the defined distance of the portion of the industrial automation system 104 that the user is attempting to control via the virtualized industrial automation system presented by the communication device 120, and the second type of authentication information can comprise a valid username, password, and/or biometric information associated with the user when the user (or the user's communication device 120 or identification tag) is located in the second location (or is not detected as being located within the defined distance of the portion of the industrial automation system 104), e.g., as detected by the virtualization management component 118. It is to be appreciated and understood that, in accordance with various other implementations, additionally or alternatively, the virtualization management component 118 can implement and enforce various other authentication policies in connection with controlling access to the virtualized industrial automation system and the industrial automation system 104 (e.g., via the virtualized industrial automation system) by users, in accordance with the defined virtualization management criteria. For example, the virtualization management component 118 can implement and enforce various different authentication policies based at least in part on the role of the user with respect to the industrial automation system 104, the type of action or task the user is attempting to perform on the virtualized industrial automation system and the industrial automation system 104 (e.g., via the virtualized industrial automation system), identification of the communication device 120 (e.g., based at least in part on the device identifier associated with the device (e.g., mobile subscriber integrated services digital network-number (MSISDN), media access control (MAC) address, etc.)) associated with the user, and/or another authentication policy or criterion, in accordance with the defined virtualization management criteria.

In some implementations, to facilitate desirable (e.g., favorable, beneficial, efficient, etc.) performance of the industrial automation system 104, the virtualization component 102 (e.g., employing a simulation component) can facilitate generating simulation models of the industrial automation system 104 for a number of desired purposes. For example, prior to adjusting a virtualized control or virtualized switch associated with a virtualized industrial device of the virtualized industrial automation system in connection with a corresponding industrial device of the industrial automation system 104, the virtualization component 102 (e.g., in response to a request from a user via a communication device 120) can simulate operation of the industrial automation system 104 in response to the adjusting of the virtualized control or the virtualized switch associated with the virtualized industrial device of the virtualized industrial automation system, based at least in part on the simulation model of the industrial automation system 104, to facilitate determining whether the industrial automation system 104 will operate desirably (e.g., adequately, properly, optimally, etc.) in response to the adjusting of the virtualized control or the virtualized switch associated with the virtualized industrial device of the virtualized industrial automation system. Based at least in part on a result of the simulated operation of the industrial automation system 104, the virtualization component 102 or the user can determine whether to adjust the virtualized control or the virtualized switch associated with the virtualized industrial device of the virtualized industrial automation system to remotely control the operation of the industrial automation system 104, in accordance with the set of defined operation criteria (which can be part of the set of defined virtualization management criteria).

To facilitate generating a simulation model of the industrial automation system 104, the virtualization component 102 (e.g., employing the simulation component) can analyze the set of data relating to the industrial automation system 104 and/or the other industrial automation system to facilitate simulating or emulating the industrial automation system 104 and its constituent devices, processes, and other assets. Based at least in part on the results of the analysis of the set of data, the virtualization component 102 can simulate or emulate (e.g., determine and/or generate a simulation or an emulation for) the industrial automation system 104, including determining respectively simulating or emulating the respective industrial devices 108, industrial processes 110, other industrial assets 112, and network-related devices of the network component 114, simulating or emulating the interrelationships (e.g., system configuration, connections, etc.) between the respective industrial devices 108, industrial processes 110, other industrial assets 112, and network-related devices of the network component 114, and/or simulating or emulating the properties, characteristics, functions, etc., of the respective devices, processes, and/or assets of the industrial automation system 104, etc.

The virtualization component 102 can generate a simulation model of the industrial automation system 104 based at least in part on the simulation or emulation of the industrial automation system 104, including the respective simulations or emulations of the respective industrial devices 108, industrial processes 110, other industrial assets 112, and network-related devices of the network component 114, simulations or emulations of the interrelationships (e.g., system configuration, connections, etc.) between the respective industrial devices 108, industrial processes 110, other industrial assets 112, and network-related devices of the network component 114, etc.

When a set of operation data is applied to the simulation model, a response or behavior of the simulation model can be generated. The virtualization component 102 can utilize the response or behavior produced by the simulation model in response to the application of the set of operation data to the simulation model to facilitate determining or predicting how the industrial automation system 104 will respond (or is expected to respond) when the set of operation data is applied to the industrial automation system 104, and to facilitate determining whether an action (e.g., adjusting a virtualized control or switch associated with the virtualized industrial automation system or corresponding control or switch associated with the industrial automation system 104) is to be performed in connection with the virtualized industrial automation system or the industrial automation system 104. The virtualization component 102 can store the simulation model of the industrial automation system 104, and/or response information relating to determined or predicted responses based on the simulation model, in the data store 116.

It is to be appreciated and understood that, while the virtualization component 102 and virtualization management component 118 can generate graphical representations and/or virtualizations of the various industrial devices 108, industrial processes 110, industrial assets 112, network-related devices, etc., or one or more respective instances (e.g., virtualized instances) of the various industrial devices 108, industrial processes 110, industrial assets 112, network-related devices, etc., the disclosed subject matter is not so limited. In some implementations, another virtualization component, for example, associated with a third-party vendor, can generate all or some of the graphical representations and/or virtualizations of the various industrial devices 108, industrial processes 110, industrial assets 112, network-related devices, etc., or one or more respective instances (e.g., virtualized instances) of the various industrial devices 108, industrial processes 110, industrial assets 112, network-related devices, etc. The virtualization component 102 can receive information relating to the graphical representations and/or virtualizations of the various industrial devices 108, industrial processes 110, industrial assets 112, network-related devices, etc., or one or more respective instances (e.g., virtualized instances) of the various industrial devices 108, industrial processes 110, industrial assets 112, network-related devices, etc., generated by the other virtualization component. Regardless of the source of the graphical representations or virtualizations associated with the industrial automation system 104, the virtualization management component 118 can facilitate managing the graphical representations and/or virtualizations of the various industrial devices 108, industrial processes 110, industrial assets 112, network-related devices, etc., or one or more respective instances (e.g., virtualized instances) of the various industrial devices 108, industrial processes 110, industrial assets 112, network-related devices, etc., and can facilitate managing (e.g., controlling) the various industrial devices 108, industrial processes 110, industrial assets 112, network-related devices, etc., of the industrial automation system.

Figure 2:
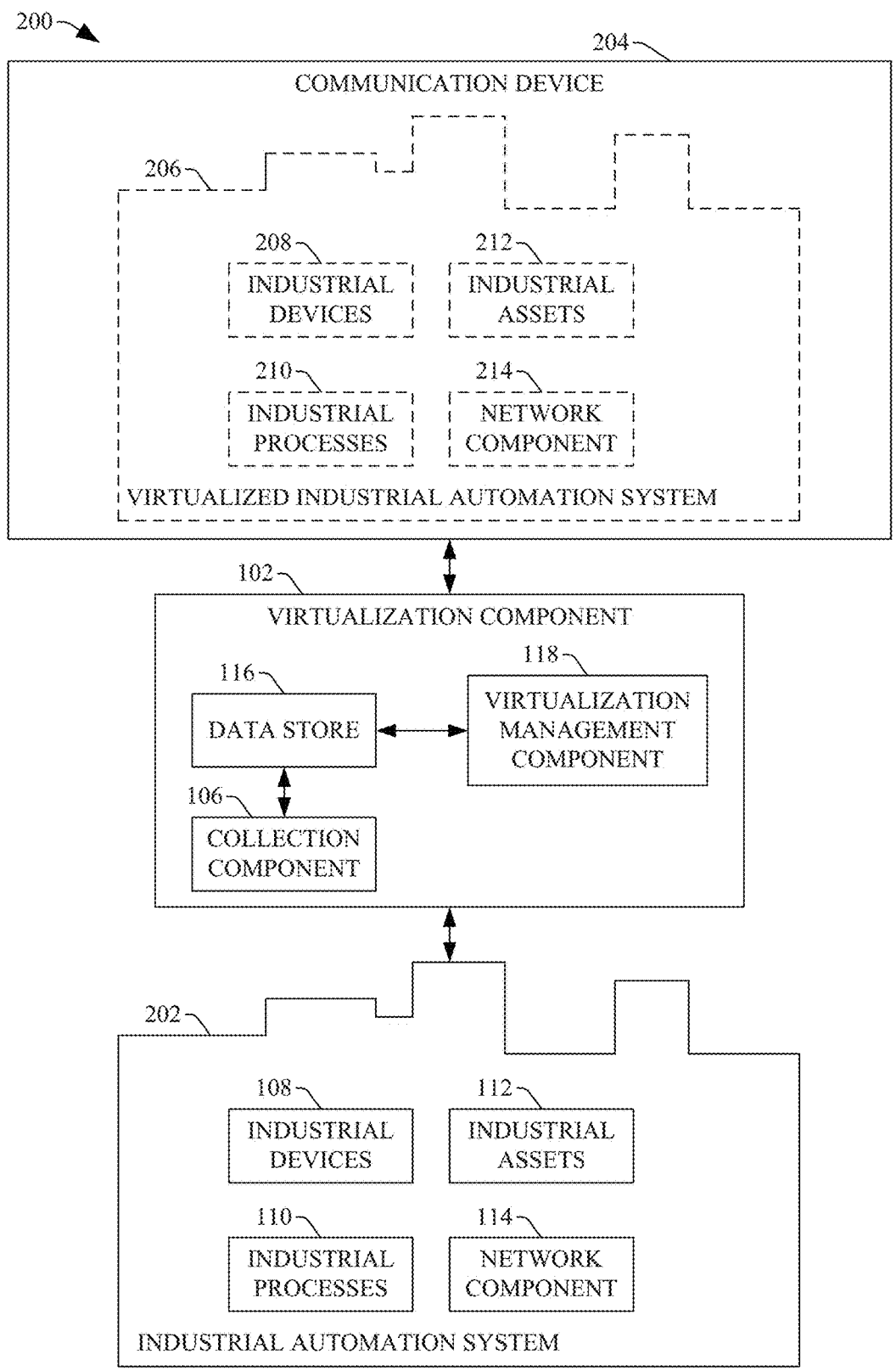
FIG. 2 depicts a diagram of another example system (e.g., a virtualization system) that can facilitate generation and management of a virtualized industrial automation system that can correspond to an industrial automation system associated with an industrial enterprise based at least in part on cloud-based data relating to the industrial enterprise, in accordance with various implementations and embodiments of the disclosed subject matter.

FIG. 2 depicts a diagram of another example system 200 (e.g., a virtualization system) that can facilitate generation and management of a virtualized industrial automation system that can correspond to an industrial automation system associated with an industrial enterprise based at least in part on cloud-based data relating to the industrial enterprise, in accordance with various implementations and embodiments of the disclosed subject matter. The system 200 can comprise a virtualization component 102, which can comprise a collection component 106, a data store 116, and a virtualization management component 118, such as more fully disclosed herein. All or a desired portion of the virtualization component can reside in a cloud platform.

An industrial automation system 202 can be associated with (e.g., communicatively connected to or interfaced with) the virtualization component 102, as more fully disclosed herein. The industrial automation system 202 can comprise one or more industrial devices 108, industrial processes 110, industrial assets 112, network-related devices associated with a network component 114, etc., that can be configured with respect to each other to form the industrial automation system 202. The configuration of the one or more industrial devices 108, industrial processes 110, industrial assets 112, network-related devices associated with a network component 114, etc., to form the industrial automation system 202 can relate to the respective positions (e.g., locations) of these the one or more industrial devices 108, industrial processes 110, industrial assets 112, network-related devices associated with a network component 114, etc., relative to each other in the facility, respective connections (e.g., electrical connections, mechanical connections, communication connections, interfaces, etc.) between respective devices, processes, and/or assets, respective settings or configurations of respective devices, processes, and/or assets, and/or other aspects of the configuration of the industrial automation system 202.

One or more users (e.g., operator, technician, manager, engineer, maintenance or repair person, etc.) can interact with (e.g., perform work tasks in connection with) the industrial automation system 202 to facilitate desired operation of the industrial automation system 202. For example, a first user can interact with a first portion of the industrial automation system 202 to perform a first set of work tasks in connection with the industrial automation system 202, a second user can interact with a second portion of the industrial automation system 202 to perform a second set of work tasks in connection with the industrial automation system 202, and so on, wherein the first portion can comprise a first subset of the industrial devices 108, industrial processes 110, industrial assets 112, and/or network-related devices associated with a network component 114, and the second portion can comprise a second subset of the industrial devices 108, industrial processes 110, industrial assets 112, and/or network-related devices associated with a network component 114. All or some of the users can have a communication device, such as communication device 204, that can be used to communicate voice, data, audio content, video content, etc., and can be used to facilitate interacting with the industrial automation system 202 via the virtualization component 102.

The virtualization management component 118 can generate and manage a virtualized industrial automation system 206 (e.g., an interactive virtualized industrial automation system) that can represent (e.g., graphically depict) the industrial automation system 202 based at least in part on results of an analysis of data obtained from the industrial automation system 202 (e.g., by the collection component 106) and/or other data, in accordance with the defined virtualization criteria, as more fully disclosed herein. As part of generating the virtualized industrial automation system 206, the virtualization management component 118 can generate one or more virtualized industrial devices 208 (e.g., comprising one or more virtualized instances of each industrial device 108), virtualized industrial processes 210 (e.g., comprising one or more virtualized instances of each industrial process 110), virtualized industrial assets 212 (e.g., comprising one or more virtualized instances of each industrial asset 112), virtualized network-related devices associated with a virtualized network component 214 (e.g., comprising one or more virtualized instances of each network-related device), etc., that can virtualize, replicate (e.g., virtually), or correspond to the one or more industrial devices 108, industrial processes 110, industrial assets 112, network-related devices associated with a network component 114, etc., of the industrial automation system 202 and the configuration of the industrial automation system 202 (e.g., the configuration of the one or more industrial devices 108, industrial processes 110, industrial assets 112, network-related devices associated with a network component 114, etc., that form the industrial automation system 202).

The virtualization management component 118 also can update the virtualized industrial automation system 206 in response to changes in the industrial automation system 202 that are detected by the virtualization management component 118, based at least in part on data obtained from the industrial automation system 202 (e.g., by the collection component 106) and/or other data. A user can directly interact with the industrial automation system 202 to facilitate operation of the industrial automation system 202, or the user can indirectly interact with the industrial automation system 202 by interacting with the virtualized industrial automation system 206 via the communication device 204 to facilitate operation of the industrial automation system, as more fully disclosed herein. The virtualization management component 118 also can update the virtualized industrial automation system 206 in response to the direct interaction with the industrial automation system 202 by the user or in response to the indirect interaction with the industrial automation system 202 by interaction with the virtualized industrial automation system 206 via the communication device 204 by the user. The virtualization management component 118 also can operate and manage the virtualized industrial automation system 206 to facilitate interacting with and/or controlling the industrial automation system 202. For instance, in response to user interaction with the virtualized industrial automation system 206 (e.g., in response to adjusting a virtualized control associated with a virtualized industrial device 208) via the communication device 204 to facilitate performing adjusting or controlling the industrial automation system 202, the virtualization management component 118 can generate control signals that can facilitate adjusting or controlling the industrial automation system 202 (e.g., adjusting a corresponding control associated with the corresponding industrial device 108) based at least in part on (e.g., in a corresponding manner to) the adjusting or controlling of the virtualized industrial automation system 206 in response to the user interaction with the virtualized industrial automation system 206. The virtualization management component 118 can transmit the control signals to the industrial automation system 202, wherein the industrial automation system 202 can be correspondingly adjusted or controlled in response to the control signals.

Figure 3:
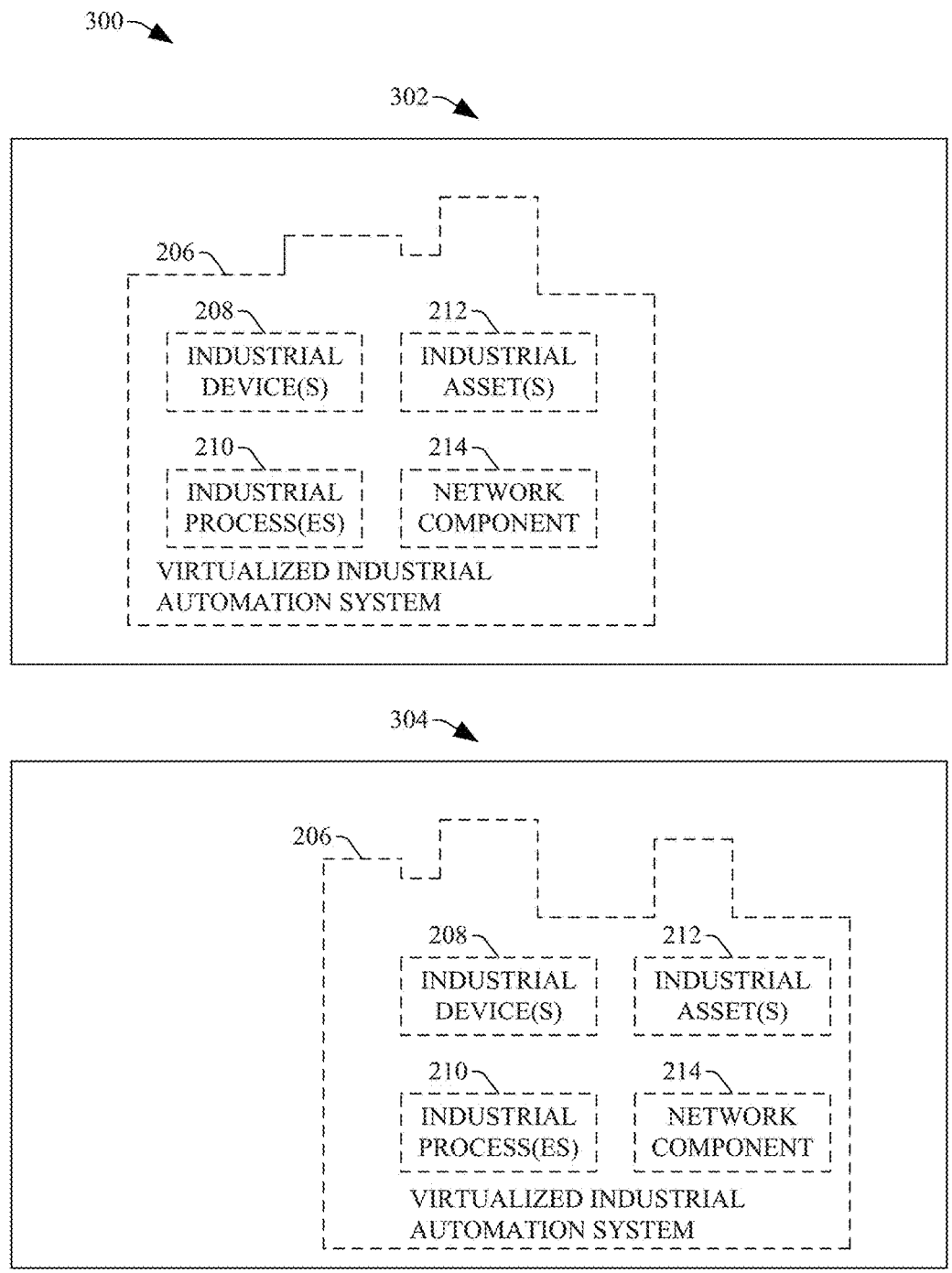
FIG. 3 presents a diagram of example views (e.g., virtual customized or personalized views) of portions of the virtualized industrial automation system, in accordance with various aspects and embodiments of the disclosed subject matter.

Referring briefly to FIG. 3 (along with FIG. 2), FIG. 3 presents a diagram of example views 300 (e.g., virtual customized or personalized views) of portions of the virtualized industrial automation system 206, in accordance with various aspects and embodiments of the disclosed subject matter. The virtualization management component 118 can manage and update the virtualized industrial automation system 206 to provide (e.g., communicate, present) a customized or personalized view of the virtualized industrial automation system 206 to the communication device 204 of the user based at least in part on the role of the user, preferences (e.g., customization preferences) of the user with respect to the industrial automation system 202, the location of the user (e.g., and/or location of the communication device 204 or RFID tag of the user) in relation to the industrial automation system 202, a portion of the industrial automation system 202 that is of interest to the user, and/or other factors or criteria, in accordance with the defined virtualization management criteria.

For example, the virtualization management component 118 can determine that the view of the virtualized industrial automation system 206 for the user is to be customized to present a view of a first portion of the virtualized industrial automation system 206, which can correspond to a first portion of the industrial automation system 202, to the user via the communication device of the user, based at least in part on the user's role, preferences, or location, and/or other factors or criteria, in accordance with the defined virtualization management criteria. In response, the virtualization management component 118 can modify, update, or customize the view of the virtualized industrial automation system 206 that is provided to (e.g., sent to) the communication device 204 for presentation to the user to generate a first customized view 302 of the virtualized industrial automation system 206 that presents the first portion of the virtualized industrial automation system 206 that can correspond to the first portion of the industrial automation system 202. The first customized view 302 of the virtualized industrial automation system 206, which can present the first portion of the virtualized industrial automation system 206, can comprise, for example, a first subset of industrial devices 208, a first subset of industrial processes 210, a first subset of industrial assets 212, and/or a first subset of network-related devices of the network component 214. The virtualization management component 118 can communicate the first customized view 302 of the virtualized industrial automation system 206 to the communication device 204 for presentation to the user via the display screen of the communication device 204.

To continue with the example, at another time, or based in part on a change in circumstances of the user (e.g., change in the user's role, preferences, location, data filter selections, etc.), or with regard to another user, the virtualization management component 118 can determine that the view of the virtualized industrial automation system 206 for the user is to be customized to present a view of a second portion of the virtualized industrial automation system 206, which can correspond to a second portion of the industrial automation system 202, to the user via the communication device of the user, based at least in part on the user's role, preferences, or location, and/or other factors or criteria, in accordance with the defined virtualization management criteria. In response, the virtualization management component 118 can modify, update, or customize the view of the virtualized industrial automation system 206 that is provided to (e.g., sent to) the communication device 204 for presentation to the user to generate a second customized view 304 of the virtualized industrial automation system 206 that presents the second portion of the virtualized industrial automation system 206, which can correspond to the second portion of the industrial automation system 202. The second customized view 304 of the virtualized industrial automation system 206, which can present the second portion of the virtualized industrial automation system 206, can comprise, for example, a second subset of industrial devices 208, a second subset of industrial processes 210, a second subset of industrial assets 212, and/or a second subset of network-related devices of the network component 214. The virtualization management component 118 can communicate the second customized view 304 of the virtualized industrial automation system 206 to the communication device 204 for presentation to the user via the display screen of the communication device 204.

Figure 4:
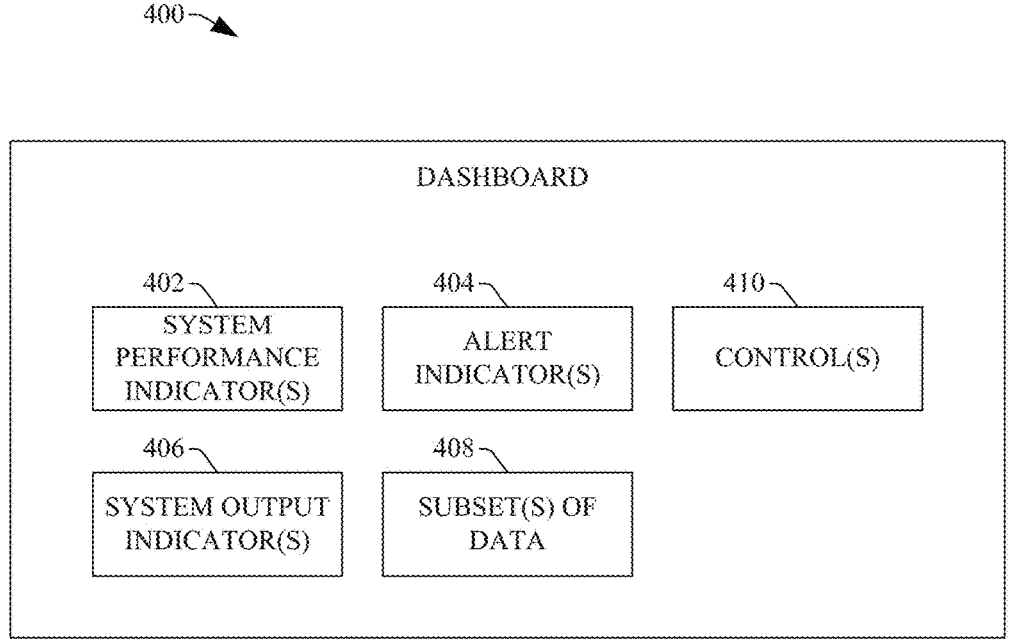
FIG. 4 illustrates a block diagram of an example dashboard view of the virtualized industrial automation system, in accordance with various aspects and embodiments of the disclosed subject matter.

Referring briefly to FIG. 4 (along with FIG. 2), FIG. 4 illustrates a block diagram of an example dashboard view 400 (e.g., virtual standard, customized, or personalized view) of the virtualized industrial automation system 206, in accordance with various aspects and embodiments of the disclosed subject matter. The virtualization management component 118 can generate, manage, and update the virtualized industrial automation system 206 to provide (e.g., communicate, present) a desired dashboard view 400 of the virtualized industrial automation system 206 to the communication device 204 of the user based at least in part on the location of the user (e.g., and/or location of the communication device 204 or RFID tag of the user) in relation to the industrial automation system 202, a portion of the industrial automation system 202 that is of interest to the user, or other factors or criteria, such as more fully disclosed herein, in accordance with the defined virtualization management criteria.

For example, the dashboard view 400 can comprise one or more system performance indicators 402, alert indicators 404, system output indicators 406, subsets of data 408, controls 410 (e.g., virtualized controls), or other desired indicators (e.g., quality indicator, materials indicator, status indicator, etc.), buttons, etc., relating to the industrial automation system 202 to provide a virtualized view (e.g., in the form of a graphical representation of a dashboard) of the industrial automation system 202. The virtualization management component 118 can customize or update the dashboard view 400 of the industrial automation system 202 based at least in part on the location of the user (or the user's communication device 204 or RFID tag), identity of the user, role of the user, information from the user indicating what data or portions of the industrial automation system 202 the user is interest in, or other factors or criteria, as more fully disclosed herein, in accordance with the defined virtualization management criteria. For example, the virtualization management component 118 can customize or update the indicators, controls, buttons, data, etc., that are presented in the dashboard view 400 of the industrial automation system 202. The virtualization management component 118 also can customize or update the size of respective virtualized items (e.g., system performance indicator 402, alert indicator 404, system output indicator 406, subsets of data 408, control 410 (e.g., virtualized control), or other desired indicator, and/or button, etc.) in the dashboard view 400, for example, in accordance with user preferences, relative importance or priority of the respective virtualized dashboard items, role of the user, etc., in accordance with the defined virtualization management criteria. An indicator (e.g., 402, 404, 406, etc.), data, or other dashboard items of information can be presented by the dashboard view 400 in the form of a chart, a graph, a meter, alphanumeric symbols, etc., wherein a chart, graph, or meter can be of desired type (e.g., bar graph, pie chart, etc.) and can have desired colors, shapes, scaling, etc.

Figure 5:
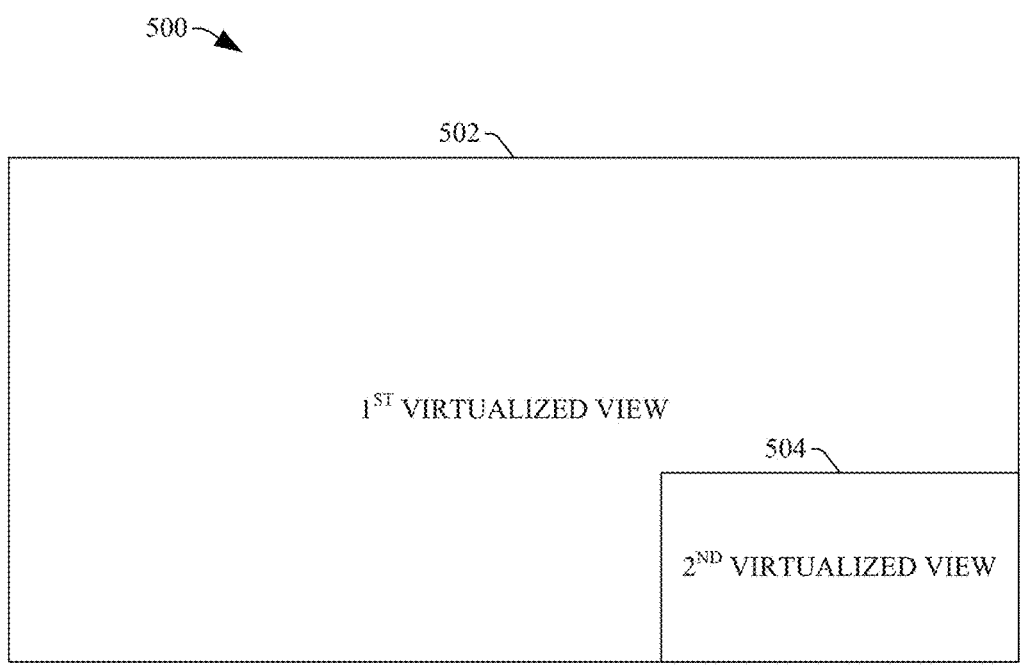
FIG. 5 depicts a block diagram of an example hybrid virtualized view of the virtualized industrial automation system, in accordance with various aspects and embodiments of the disclosed subject matter.

Referring briefly to FIG. 5 (along with FIG. 2), FIG. 5 depicts a block diagram of an example hybrid virtualized view 500 (e.g., virtual standard, customized, or personalized view) of the virtualized industrial automation system 206, in accordance with various aspects and embodiments of the disclosed subject matter. The virtualization management component 118 can generate, manage, and update the virtualized industrial automation system 206 to provide (e.g., communicate, present) a desired hybrid virtualized view 500 of the virtualized industrial automation system 206 to the communication device 204 of the user based at least in part on the location of the user (e.g., and/or location of the communication device 204 or RFID tag of the user) in relation to the industrial automation system 202, a portion of the industrial automation system 202 that is of interest to the user, or other factors or criteria, such as more fully disclosed herein, in accordance with the defined virtualization management criteria.

The hybrid virtualized view 500 generated by the virtualization management component 118 can comprise multiple (e.g., 2 or more) virtualized views of the virtualized industrial automation system 206 from different perspectives. For instance, the virtualized industrial automation system 206 can generate a first virtualized view 502 (e.g., a first view or first customized view) of the virtualized industrial automation system 206 that can be displayed in a first portion of a display screen of the communication device 204, and a second virtualized view 504 (e.g., a second view or second customized view) of the virtualized industrial automation system 206 that can be displayed in a second portion of the display screen of the communication device 204. The first virtualized view 502 and the second virtualized view 504 can be generated by the virtualized industrial automation system 206 and displayed on the display screen of the communication device 204 as a picture-in-picture (PIP) hybrid view (as depicted in FIG. 5), as a side-by-side hybrid view, or in another desired form.

The first virtualized view 502 and the second virtualized view 504 can respectively present different virtualized portions of the virtualized industrial automation system 206. For example, the first virtualized view 502 can present a virtualized view of a first virtualized portion of the virtualized industrial automation system 206 (e.g., that can be of interest to the user), and the second virtualized view 504 can present a virtualized view of a second virtualized portion of the virtualized industrial automation system 206 (e.g., the entire system 206 or a different portion of the system 206). As another example, the first virtualized view 502 can present a virtualized dashboard view of all or a portion of the virtualized industrial automation system 206, and the second virtualized view 504 can present a virtualized view that can graphically depict the physical structure and configuration of a second virtualized portion of the virtualized industrial automation system 206.

Figure 6:
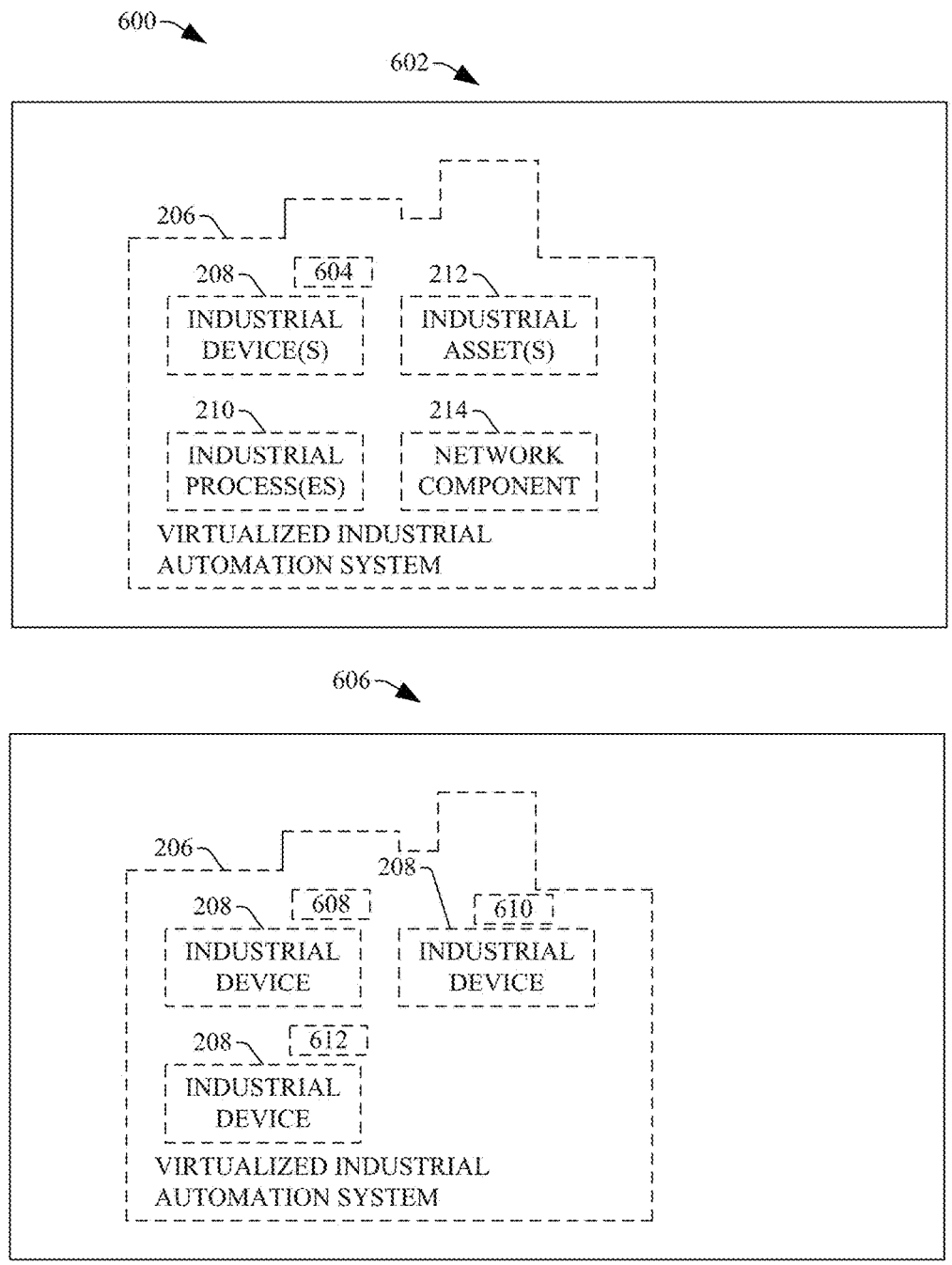
FIG. 6 illustrates a diagram of example customized views of the virtualized industrial automation system that can include data overlays, in accordance with various aspects and embodiments of the disclosed subject matter.

Referring briefly to FIG. 6 (along with FIGS. 2 and 3), FIG. 6 illustrates a diagram of example customized views 600 of the virtualized industrial automation system 206 that can include data overlays, in accordance with various aspects and embodiments of the disclosed subject matter. The virtualization management component 118 can generate the example customized views 600 of the virtualized industrial automation system 206. The example customized views 600 generated by the virtualization management component 118 can comprise, for example, a first customized view 602 of the virtualized industrial automation system 206 that can include a first customized data overlay 604, wherein the first customized view 602, including the first customized data overlay 604, can be displayed on the display screen of the communication device 204 associated with a user (e.g., shift supervisor). The first customized data overlay 604 can be located on or in proximity to (as depicted), for example, a virtualized industrial device 208 in the graphical configuration of the first customized view 602 of the virtualized industrial automation system 206. The first customized data overlay 604 can comprise information relating to a set of industrial devices 108 of the industrial automation system 104 that can correspond to a set of virtualized industrial devices 208 of the virtualized industrial automation system 206. For example, if the first customized view 602 is a view customized for a shift supervisor, the first customized data overlay 604 can comprise information relating to production statistics for the set of industrial devices 108 associated with the set of virtualized industrial devices 208 of the virtualized industrial automation system 206.

The shift supervisor may desire to drill down and obtain more detail regarding the production statistics, for example, to obtain respective production statistics relating to respective industrial devices 108 of the set of industrial devices 108. To achieve this, the shift supervisor, using the communication device 204, can interact with the first customized view 602 of the virtualized industrial automation system 206 to facilitate selecting a desired filter that can facilitate analyzing production statistics associated with the set of industrial devices 108 and filtering those production statistics to generate respective subsets of production statistics for respective industrial devices 108 of the set of industrial devices 108. The virtualization management component 118 can receive information relating to the selection of the filter from the communication device 204. The virtualization management component 118 can apply the filter to the production statistics data associated with the set of industrial devices 108 and can filter the production statistics data to generate the respective subsets of production statistics for respective industrial devices 108 of the set of industrial devices 108. The virtualization management component 118 can update or augment the first customized view 602 of the virtualized industrial automation system 206 to generate a second customized view 606 of the virtualized industrial automation system 206 that can comprise second customized data overlays 608, 610, and 612 that respectively can present the respective subsets of production statistics for the respective industrial devices 108 of the set of industrial devices 108. The virtualization management component 118 can place the respective second customized data overlays 608, 610, and 612 on or in proximity to the respective virtualized industrial devices 208 that correspond to the respective industrial devices 108. It is to be appreciated and understood that, in accordance with various implementations, the second customized view 606 (as depicted) of the virtualized industrial automation system 206 can be structured to not display the virtualized industrial process(es) 210, virtualized industrial asset(s) 212, and network component 214 of the virtualized industrial automation system 206 (as they are shown in the first customized view 602), for example, if the user interaction or preferences result in the second customized view 606 focusing on only the respective virtualized industrial devices 208 and respective second customized data overlays 608, 610, and 612, or can be structured to show the virtualized industrial process(es) 210, virtualized industrial asset(s) 212, and network component 214 of the virtualized industrial automation system 206 in addition to showing the respective virtualized industrial devices 208 and respective second customized data overlays 608, 610, and 612.

Figure 7:
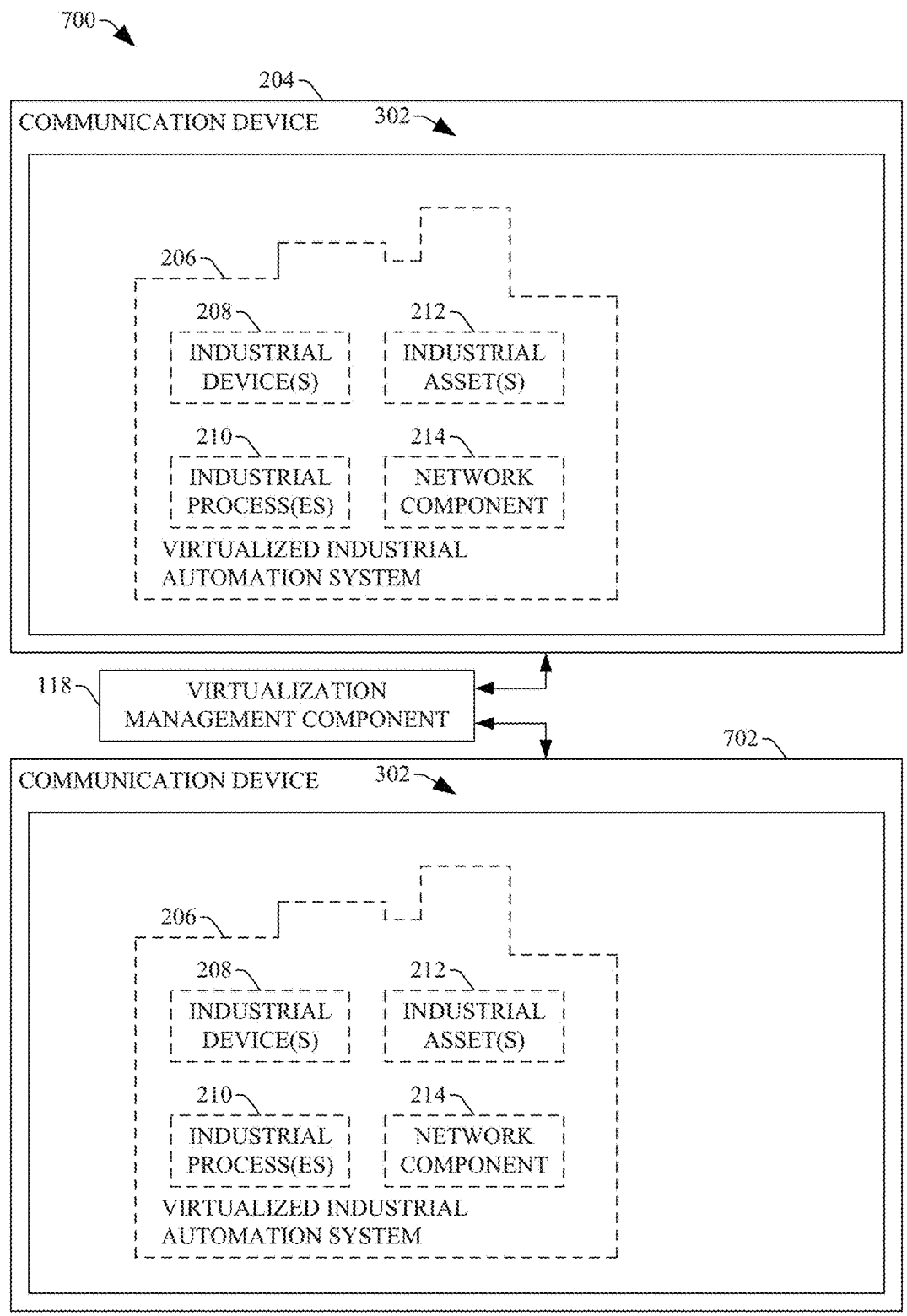
FIG. 7 illustrates a diagram of example system that can facilitate sharing a customized view of, and/or first customized data overlay associated with, a virtualized industrial automation system associated with a first user with a communication device associated with a second user, in accordance with various aspects and embodiments of the disclosed subject matter.

Referring briefly to FIG. 7 (along with FIGS. 2 and 3), FIG. 7 illustrates a diagram of example system 700 that can facilitate sharing a customized view of, and/or first customized data overlay associated with, a virtualized industrial automation system associated with a first user with a communication device associated with a second user, in accordance with various aspects and embodiments of the disclosed subject matter. The virtualization management component 118 can generate the first customized view 302 of the virtualized industrial automation system 206, as more fully disclosed herein, for example, with regard to FIG. 3. In some implementations, the first customized view 302 of the virtualized industrial automation system 206 can comprise a customized data overlay (not shown in FIG. 7). The virtualization management component 118 can communicate the first customized view 302 of, and/or customized data overlay associated with, the virtualized industrial automation system 206 to the communication device 204 for presentation to the first user via the display screen of the communication device 204.

The first user may desire to share the first customized view 302 of, and/or customized data overlay associated with, the virtualized industrial automation system 206 with the second user, or the second user may desire to view the first customized view 302 of, and/or customized data overlay associated with, the virtualized industrial automation system 206 that is being displayed on the communication device 204 of the first user. To facilitate sharing the first customized view, and/or the customized data overlay, the first user, using the first user's communication device 204, can select a share control, or alternatively, the second user, using the second user's communication device 702, can select a share control (e.g., share request control), and information relating to selection of the share control can be sent from the communication device 204, or alternatively the communication device 702, to the virtualization management component 118.

In response to the selection of the share control, if the applicable virtualization management criteria have been satisfied (e.g., when it is determined that the second user is authorized to view the first user's first customized view of, and/or first customized data overlay associated with, the virtualized industrial automation system), the virtualization management component 118 can facilitate communicating the first user's first customized view 302 of, and/or customized data overlay associated with, the virtualized industrial automation system 206 to the second user's communication device 702 for presentation to the second user. In some implementations, the first user's communication device 2044 can directly communicate the first user's first customized view of, and/or customized data overlay associated with, the virtualized industrial automation system 206 to the second user's communication device 702 without the virtualization management component 118 having to be involved in the sharing process or the virtualization management component 118 can manage the authorization process to facilitate determining whether such sharing is permitted, while allowing the first user's communication device 204 to manage the communication of the first customized view 302, and/or the data overlay, to the second user's communication device 702, if such sharing is authorized by the virtualization management component 118.

Figure 8:
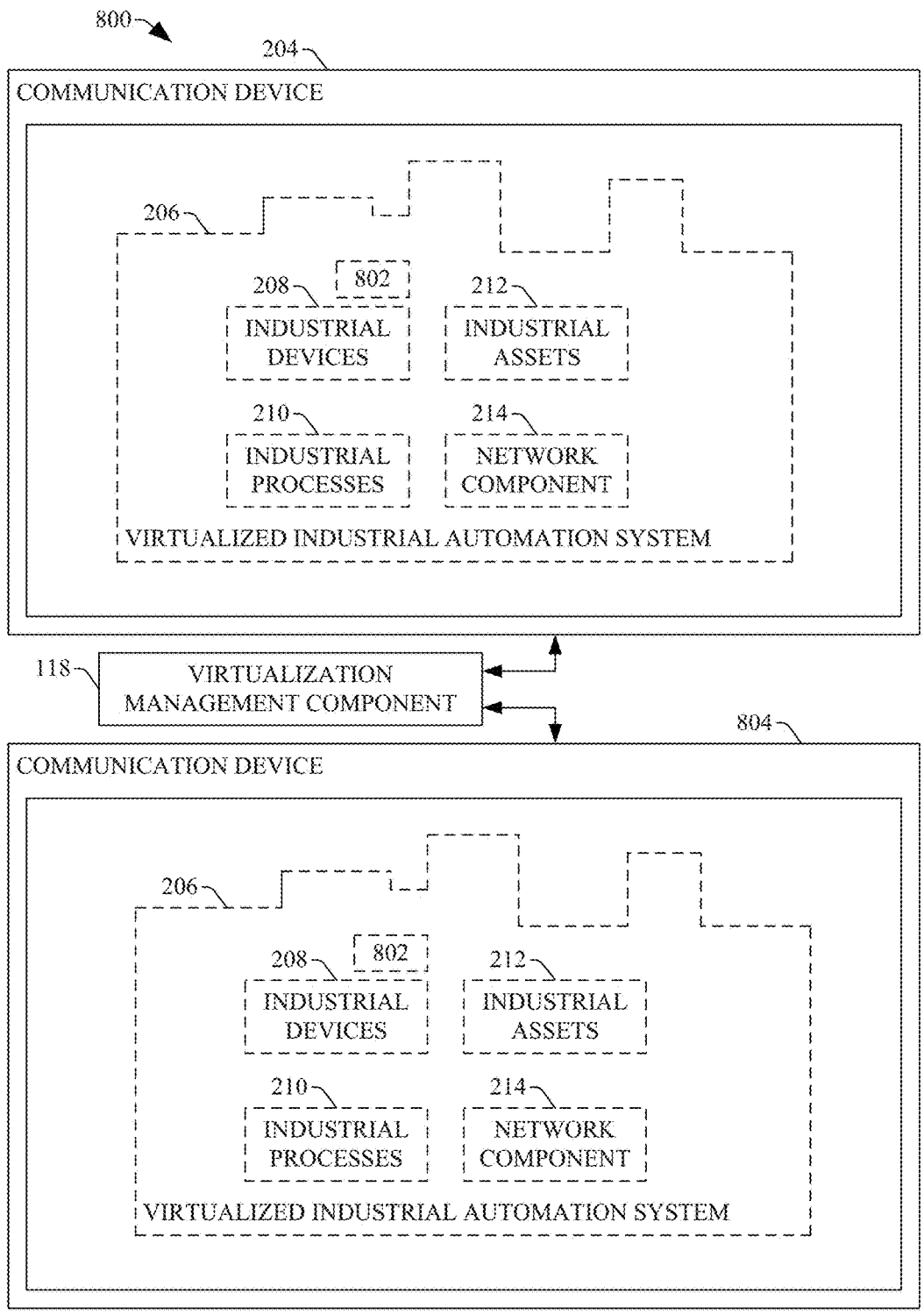
FIG. 8 illustrates a diagram of example system that can facilitate sharing a virtual note associated with a virtualized industrial automation system with a communication device associated with another user, in accordance with various aspects and embodiments of the disclosed subject matter.

Referring briefly to FIG. 8 (along with FIG. 2), FIG. 8 illustrates a diagram of example system 800 that can facilitate sharing a virtual note associated with a virtualized industrial automation system with a communication device associated with another user, in accordance with various aspects and embodiments of the disclosed subject matter. The virtualization management component 118 can generate the virtualized industrial automation system 206, as more fully disclosed herein, for example, with regard to FIG. 3. In some implementations, the virtualization management component 118 can generate a customized view (e.g., a first customized view 302) of the virtualized industrial automation system 206 and/or can generate a data overlay (e.g., a customized data overlay) (not shown in FIG. 8) that can be placed in or near a virtualized object(s) (e.g., virtualized industrial device(s) 208, virtualized industrial process(es) 210, virtualized industrial asset(s) 212, virtualized network component 214 or virtualized network-related device(s) associated therewith) of the virtualized industrial automation system 206. The virtualization management component 118 can communicate the virtualized industrial automation system 206, and/or the associated data overlay, to the communication device 204 for presentation to the first user via the display screen of the communication device 204.

The first user may desire to augment the information presented by the virtualized industrial automation system 206, and/or the associated data overlay, for example, by adding information (e.g., user-generated information) relating to the user's own observations or other desired information regarding the virtualized industrial automation system 206, and/or the associated data overlay, to the information presented by the virtualized industrial automation system 206, and/or the associated data overlay.

For instance, the virtualization management component 118 can facilitate enabling the first user to use the communication device 204 to generate a virtual note 802 (e.g., a graphical representation of a note or message), that can comprise desired information (e.g., information relating to a portion (e.g., an industrial device 108, an industrial process 110, an industrial asset 112, or a network-related device of the network component 114, etc.) of the industrial automation system represented by the virtualized portion (e.g., a virtualized industrial device 208, virtualized industrial process 210, virtualized industrial asset 212, or virtualized network-related device of the virtualized network component 214, etc.) of the virtualized industrial automation system 206. A virtual note 802 can be employed for any number of purposes, such as, for example, to tag a problem or abnormal operating condition associated with the portion of the industrial automation system 104, for use as a shift report, to remind the user (or another user(s)) of something in connection with that portion of the industrial automation system 104, to notify another user(s) that some work task (e.g., maintenance, repair, or replacement task, etc.) is to be performed in connection with that portion of the industrial automation system 104, or for another desired reason.

The virtualization management component 118 can facilitate enabling the first user to use the communication device 120 to apply the virtual note 802 to (e.g., attach, link, associate, place, etc., the virtual note to, with, or on) the virtualized portion of the virtualized industrial automation system 206 that can correspond to the portion of the industrial automation system 104. For instance, the user, using the communication device 204, can interact (e.g., via user gestures, selections, keystrokes, mouse movements or commands, etc.) with the virtual note 802 and/or the virtualized portion of the virtualized industrial automation system 206, wherein the interaction can indicate that the user is attempting to apply the virtual note 802 on or in proximity to the virtualized portion of the virtualized industrial automation system 206. For example, the user can interact with the virtual note 802 via the communication device 204 to drag-and-drop the virtual note 802 on or in proximity to the virtualized portion of the virtualized industrial automation system 206. For example, the virtualized portion of the virtualized industrial automation system 206 can be virtualized industrial device 208, for purposes of illustration. The virtualization management component 118 can receive information relating to the user's interactions with the virtual note 802 and/or the virtualized portion (e.g., virtualized industrial device 208) of the virtualized industrial automation system 206 from the communication device 204. In response, the virtualization management component 118 can facilitate applying the virtual note 802 on or in proximity to the virtualized portion (e.g., virtualized industrial device 208) of the virtualized industrial automation system 206.

The virtualization management component 118 further can facilitate enabling a user, using the communication device 204, to control the scope of the virtual note 802 to control the viewability of the virtual note 802 on or associated with (e.g., in proximity to) the virtualized portion (e.g., virtualized industrial device 208) of the virtualized industrial automation system 206 by another user(s), e.g., on the communication device(s) 804 of the other user(s), in accordance with the defined virtualization management criteria (e.g., when the other user is authorized to access or view the virtual note 802 on that other user's communication device 804, and/or based in part on the role of that other user in connection with the industrial automation system 104, etc.). For instance, the user, using the communication device 204, can select a scope control associated with the virtual note 802, and can input information (e.g., a scope parameter) that can indicate the viewability scope of the virtual note 802 to facilitate controlling which users can view the virtual note 802 in connection with the virtualized industrial automation system 206. Alternatively or additionally, the virtualization management component 118 can set the viewability scope or specify a minimum or maximum viewability scope for the virtual note 802, in accordance with the defined virtualization management criteria. The scope for a virtual note 802 can be ranged, as desired, to facilitate controlling the viewability of the virtual note 802 by another user based at least in part on a role of the other user, an identity of the other user, a location of the user with respect to the industrial automation system 104, the access rights to access the virtualized industrial automation system 206 by the other user, or another desired defined virtualization management criteria, such as disclosed herein. For example, the scope for a virtual note 802 can range from allowing any other user (e.g., regardless of role) to view the virtual note 802 on the virtualized portion of the virtualized industrial automation system 206, to allowing only users (e.g., regardless of role) who are logged in and authenticated with the virtualization management component 118 to view the virtual note 802 on the virtualized portion of the virtualized industrial automation system 206, to allowing only users who provide authentication credentials that indicate they satisfy defined security criteria (e.g., to have access rights) to view the virtual note 802 on the virtualized portion of the virtualized industrial automation system 206, to allowing only users who have a particular role(s) to view the virtual note 802 on the virtualized portion of the virtualized industrial automation system 206, to allowing only a certain user(s) specified by the user who created the virtual note 802 to view the virtual note 802 on or in proximity to the virtualized portion of the virtualized industrial automation system 206, to virtually any other desired viewability scope, in accordance with the defined virtualization management criteria.

The virtualization management component 118 can enforce the scope associated with the virtual note 802, based at least in part on the scope set for the virtual note 802, such that users permitted to view the virtual note 802 (e.g., the user associated with communication device 804) can view the virtual note 802 on or in proximity to the virtualized portion of the virtualized industrial automation system 206, and users who are not permitted to view the virtual note 802 will not be able to view the virtual note 802 that is on or in proximity to the virtualized portion of the virtualized industrial automation system 206 via their communication devices.

With further regard to FIGS. 1-8, the virtualization management component 118 can generate, manage, update, or control the type of virtualized view, size of a virtualized view, shape of a virtualized view, size, shape, or color of an item presented in a virtualized view, etc., of the virtualized industrial automation system (e.g., 206) based at least in part on user preferences or user interaction with the virtualized industrial automation system (e.g., 104, 206) via the communication device (e.g., 120, 204), or automatically or dynamically in response to an occurrence of an event(s) associated with the industrial automation system (e.g., 104, 202), in accordance with the defined virtualization management criteria. For example, the hybrid virtualized view 500 can be a PIP view, wherein the first virtualized view 502 can cover a larger portion of the display screen of the communication device (e.g., 120, 204) and the second virtualized view 504 can cover a relatively smaller portion of the display screen of the communication device. If an event (e.g., fluid spill, motor problem, etc.) occurs in the second portion of the industrial automation system (e.g., 104, 202), the virtualization management component 118 can modify (e.g., dynamically or automatically modify or adjust) the hybrid virtualized view 500 to increase the size of the second virtualized view 504 and/or decrease the size of the first virtualized view 502 as displayed on the display screen of the communication device, reverse (e.g., dynamically or automatically reverse) the display of the first virtualized view 502 and second virtualized view 504 so that the second virtualized view 504 covers the larger portion of the display screen and the first virtual view covers the smaller portion of the display screen, or can send a prompt, notification, or alert to the communication device to notify the user that an event has occurred in the second portion of the industrial automation system (e.g., 104, 202) and recommending that the second virtualized view 504 be modified (e.g., in response to the user interacting with the hybrid virtualized view 500 of the virtualized industrial automation system via the communication device).

The virtualization management component 118 and/or the communication device (e.g., 120, 204) also can facilitate enabling a user to adjust the size of a virtualized view of the virtualized industrial automation system. For example, in response to user interaction (e.g., a gesture or command) with the virtualized industrial automation system via the communication device that indicates that the user is attempting to increase the size of a portion of the view of the virtualized industrial automation system, the virtualization management component 118 and/or the communication device (e.g., 120, 204) can zoom in or drill down to that portion of the view to increase or magnify the size of that portion of the view on the display screen of the communication device. If the size of the virtualized view is greater than the size of the display screen of the communication device, the virtualization management component 118 and/or the communication device (e.g., 120, 204) can facilitate providing a scroll bar or other function that can allow a user to maintain the relatively larger size of the virtualized view, while enabling the user to interact with the virtualized industrial automation system to view different areas of the virtualized industrial automation system (e.g., by moving a different area of the virtualized industrial automation system that is outside the display screen so that it is displayed on the display screen). The virtualization management component 118 and/or the communication device (e.g., 120, 204) also can facilitate presenting a keyboard (e.g., a pop-up touchscreen keyboard) and/or mouse (e.g., virtual or touchscreen mouse) on the display screen of the communication device to facilitate enabling a user to interact with the display screen to input data, select, move, or modify items, and/or interact with the virtualized industrial automation system, etc.

Figure 9:
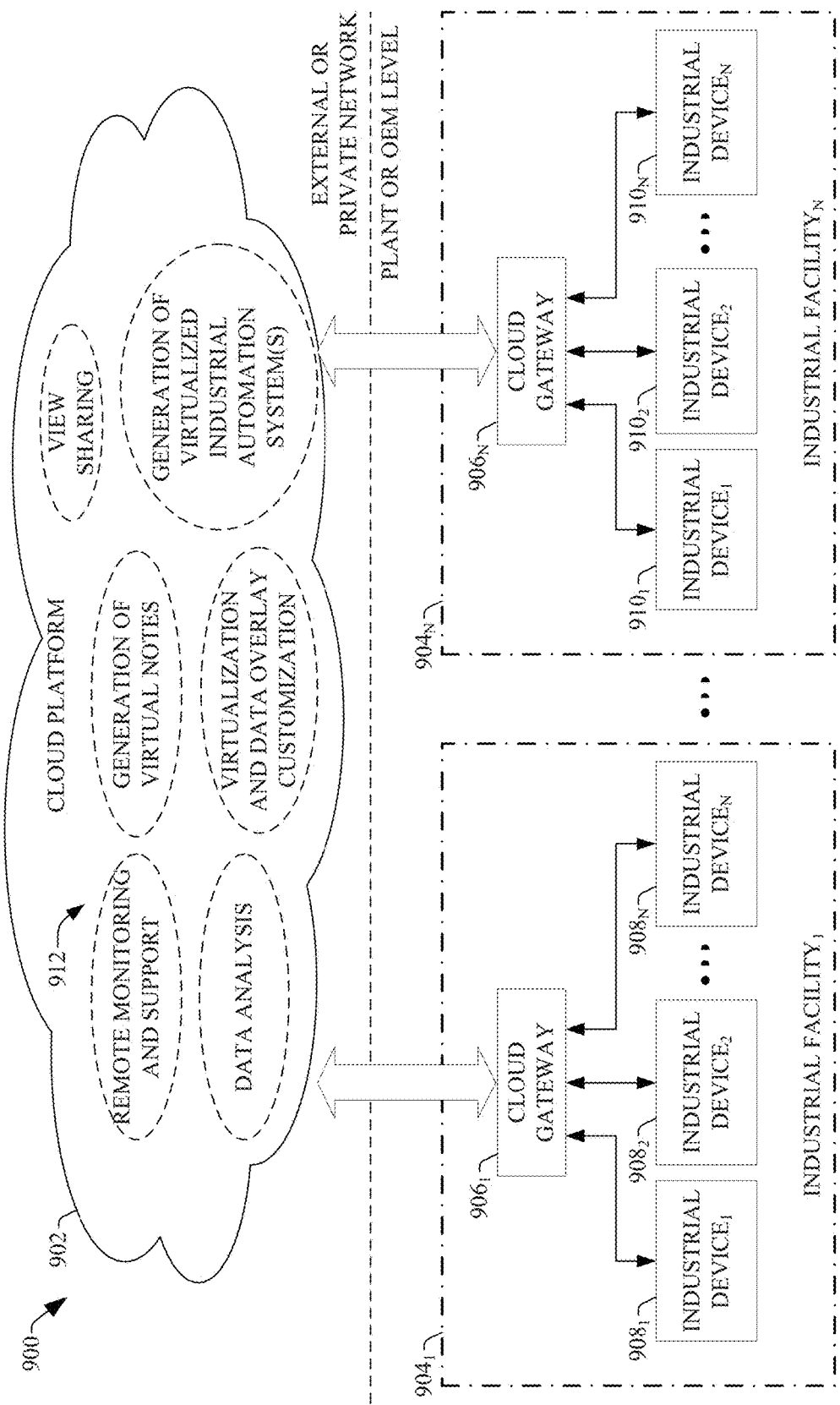
FIG. 9 is a diagram of a high-level overview of an example industrial enterprise that can leverage cloud-based services, including virtualization-related services, data collection services, and data storage services, in accordance with various aspects and embodiments of the disclosed subject matter.

As disclosed herein, the virtualization system (e.g., 100, 200), or a portion thereof, can be located in a cloud platform. To provide a general context for the cloud-based virtualization system and services described herein, FIG. 9 illustrates a block diagram of a high-level overview of an example industrial enterprise 900 that can leverage cloud-based services, including virtualization services, data collection services, and data storage services, in accordance with various aspects and embodiments of the disclosed subject matter. The industrial enterprise 900 can comprise one or more industrial facilities, such as industrial facility$_1$ 904$_1$ up through industrial facility$_N$ 904$_N$, wherein each industrial facilitate can include a number of industrial devices in use. For example, industrial facility$_1$ 904$_1$ can comprise industrial device$_1$ 908$_1$ up through industrial device$_N$ 908$_N$, and industrial facility$_N$ 904$_N$ can comprise industrial device$_1$ 910$_1$ up through industrial device$_N$ 910$_N$. The industrial devices (e.g., 908$_1$, 908$_N$, 910$_1$, 910$_N$, etc.) can make up one or more automation systems that can operate within the respective industrial facilities (e.g., industrial facility$_1$ 904$_1$ up through industrial facility$_N$ 904$_N$). Exemplary industrial automation systems can include, but are not limited to, batch control systems (e.g., mixing systems), continuous control systems (e.g., proportional-integral-derivative (PID) control systems), or discrete control systems. Industrial devices (e.g., 908$_1$, 908$_N$, 910$_1$, 910$_N$, etc.) can include such industrial devices as industrial controllers (e.g., programmable logic controllers or other types of programmable automation controllers); field devices such as sensors and meters; motor drives; HMIs; industrial robots, barcode markers, and readers; vision system devices (e.g., vision cameras); smart welders; or other types of industrial devices.

Exemplary industrial automation systems can include one or more industrial controllers that can facilitate monitoring and controlling of their respective industrial processes. The industrial controllers can exchange data with the field devices using native hardwired input/output (I/O) or via a plant network, such as Ethernet/Internet Protocol (IP), Data Highway Plus, ControlNet, Devicenet, or the like. A given industrial controller typically can receive any combination of digital or analog signals from the field devices that can indicate a current state of the industrial devices and/or their associated industrial processes (e.g., temperature, position, part presence or absence, fluid level, etc.), and can execute a user-defined control program that can perform automated decision-making for the controlled industrial processes based on the received signals. The industrial controller can output appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code that can be used to process input signals read into the controller and to control output signals generated by the industrial controller, including, but not limited to, ladder logic, sequential function charts, function block diagrams, structured text, or other such platforms.

Although the exemplary overview illustrated in FIG. 9 depicts the industrial devices (e.g., 908$_1$, 908$_N$, 910$_1$, 910$_N$) as residing in fixed-location industrial facilities (e.g., industrial facility$_1$ 904$_1$ up through industrial facility$_N$ 904$_N$, respectively), in some implementations, the industrial devices (e.g., 908$_1$, 908$_N$, 910$_1$, and/or 910$_N$) also can be part of a mobile control and/or monitoring application, such as a system contained in a truck or other service vehicle.

According to one or more embodiments of the disclosed subject matter, industrial devices (e.g., 908$_1$, 908$_N$, 910$_1$, 910$_N$, etc.) can be coupled to a cloud platform 902 to facilitate leveraging cloud-based applications and services (e.g., data collection services, data storage services, virtualization services, etc.) associated with the cloud platform 902. That is, the industrial devices (e.g., 908$_1$, 908$_N$, 910$_1$, 910$_N$, etc.) can be configured to discover and interact with cloud-based computing services 912 that can be hosted by the cloud platform 902. The cloud platform 902 can be any infrastructure that can allow cloud services 912 (e.g., cloud-based computing services, shared computing services) to be accessed and utilized by cloud-capable devices. The cloud platform 902 can be a public cloud that can be accessible via a public network, such as the Internet, by devices having public network connectivity (e.g., Internet connectivity) and appropriate authorizations to utilize the cloud services 912. In some scenarios, the cloud platform 902 can be provided by a cloud provider as a platform-as-a-service (PaaS), and the cloud services 912 can reside and execute on the cloud platform 902 as a cloud-based service. In some such configurations, access to the cloud platform 902 and associated cloud services 912 can be provided to customers as a subscription service by an owner of the cloud services 912. Additionally and/or alternatively, the cloud platform 902 can be a private cloud that can be operated internally by the industrial enterprise 900 or an associated enterprise associated with a third-party entity. An exemplary private cloud platform can comprise a set of servers that can host the cloud services 912 and can reside on a private network (e.g., an intranet, a corporate network, etc.) that can be protected by a firewall.

The cloud services 912 can include, but are not limited to, data collection, data storage, data analysis, control applications (e.g., applications that can generate and deliver control instructions to industrial devices (e.g., $908_1$, $908_N$, $910_1$, $910_N$, etc.) based at least in part on analysis of real-time or near real-time system data or other factors), remote monitoring and support, generation and management of a virtualized industrial automation system(s) that can correspond to an industrial automation system(s), remote control of an industrial automation system(s) via a virtualized industrial automation system(s), customization of a virtualized industrial automation system and/or a data overlay on the virtualized industrial automation system, generation of virtual notes, view sharing (e.g., sharing of customized view of, customized data overlay associated with, and/or a virtual note associated with, a virtualized industrial automation system), provision of security in connection with a virtualized industrial automation system and an associated industrial automation system, or provision of other applications or services relating to industrial automation. If the cloud platform 902 is a web-based cloud, industrial devices (e.g., $908_1$, $908_N$, $910_1$, $910_N$, etc.) at the respective industrial facilities 904 can interact with cloud services 912 via the public network (e.g., the Internet). In an exemplary configuration, the industrial devices (e.g., $908_1$, $908_N$, $910_1$, $910_N$, etc.) can access the cloud services 912 through separate cloud gateways (e.g., cloud gateway $906_1$ up through cloud gateway $906_N$) at the respective industrial facilities (e.g., industrial facility$_1$ $904_1$ up through industrial facility$_N$ $904_N$, respectively), wherein the industrial devices (e.g., $908_1$, $908_N$, $910_1$, $910_N$, etc.) can connect to the respective cloud gateways (e.g., cloud gateway $906_1$ up through cloud gateway $906_N$) through a physical (e.g., wireline) or wireless local area network or radio link. In another exemplary configuration, the industrial devices (e.g., $908_1$, $908_N$, $910_1$, $910_N$, etc.) can access the cloud platform 902 directly using an integrated cloud gateway service. Cloud gateways (e.g., cloud gateway $906_1$ up through cloud gateway $906_N$) also can comprise an integrated component of a network infrastructure device, such as a firewall box, router, or switch.

Providing industrial devices with cloud capability via the cloud gateways (e.g., cloud gateway $906_1$ up through cloud gateway $906_N$) can offer a number of advantages particular to industrial automation. For instance, cloud-based storage (e.g., cloud-based data store) offered by the cloud platform 902 can be easily scaled to accommodate the large quantities of data that can be generated daily by an industrial enterprise. Further, multiple industrial facilities (e.g., industrial facility$_1$ $904_1$ up through industrial facility$_N$ $904_N$) at different geographical locations can migrate (e.g., communicate) their respective industrial automation data to the cloud platform 902 (e.g., via the collection component) for aggregation, collation, collective big data analysis, and enterprise-level reporting without the need to establish a private network between the respective industrial facilities. Industrial devices (e.g., $908_1$, $908_N$, $910_1$, $910_N$, etc.) and/or cloud gateways (e.g., cloud gateway $906_1$ up through cloud gateway $906_N$) having smart configuration capability can be configured to automatically detect and communicate with the cloud platform 902 upon installation at any facility, which can thereby simplify integration with existing cloud-based data storage, analysis, or reporting applications used by the industrial enterprise 900. In another exemplary application, cloud-based virtualization applications (e.g., utilized by the virtualization system comprising the virtualization component) can access the data relating to an industrial automation system(s) stored in the cloud-based data store, can generate and/or update a virtualized industrial automation system that can present a virtualized view of an industrial automation system and its operation, remotely control the industrial automation system in response to interaction with (e.g., user interaction to virtually control) a corresponding virtualized industrial automation system, customize a virtualized view of the industrial automation system(s) for a user (e.g., based at least in part on one or more customization factors associated with the user), provide security comprising controlling access to the virtualized industrial automation system and corresponding industrial automation system (e.g., based at least in part on authentication credentials of users and access rights of users), as more fully disclosed herein. These industrial cloud-computing applications are only intended to be exemplary, and the systems and methods described herein are not limited to these particular applications. As these examples demonstrate, the cloud platform 902, working with cloud gateways (e.g., cloud gateway $906_1$ up through cloud gateway $906_N$), can allow builders of industrial applications to provide scalable solutions as a service, removing the burden of maintenance, upgrading, and backup of the underlying infrastructure and framework.

Figure 10:
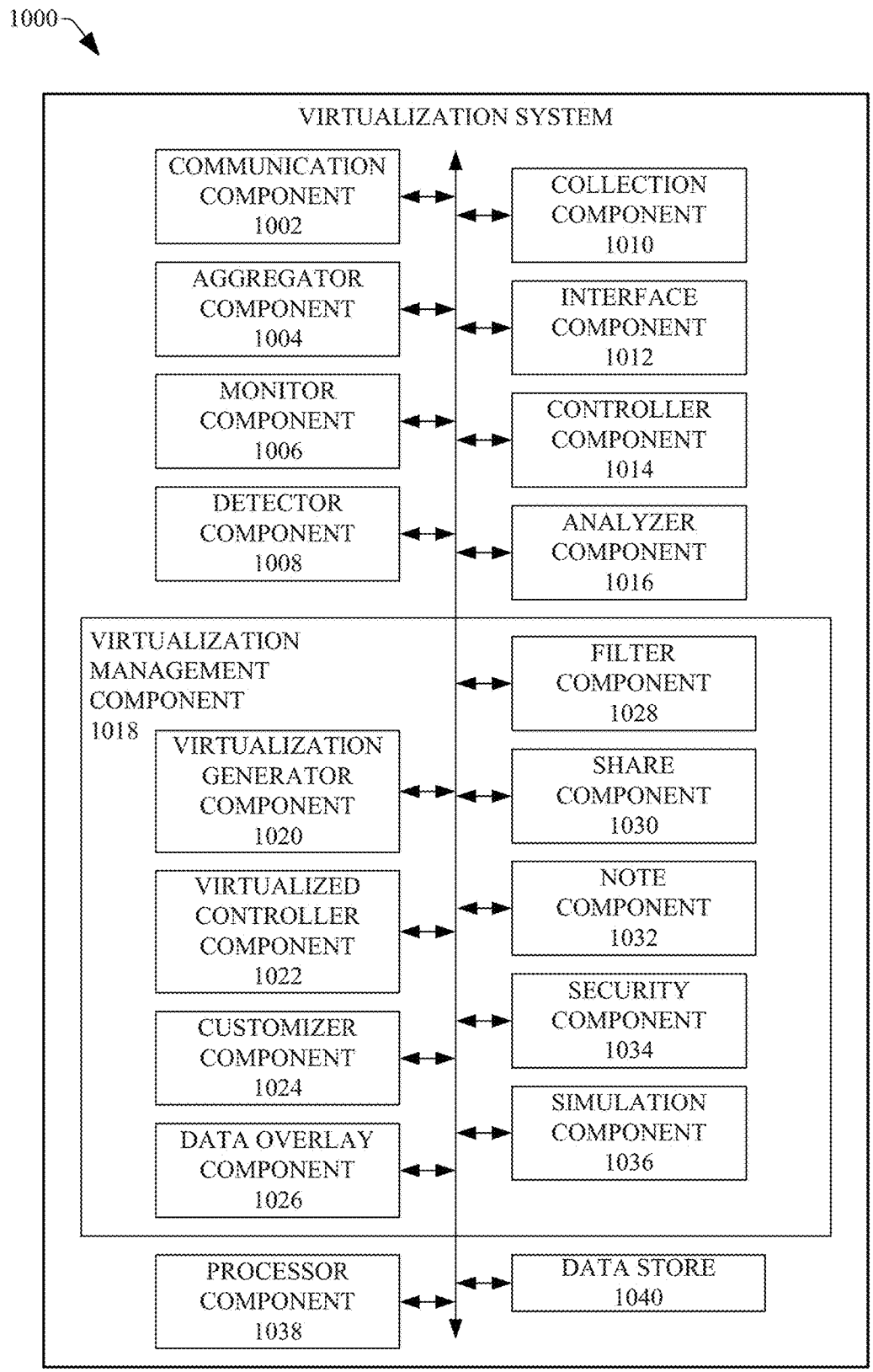
FIG. 10 presents a block diagram of an exemplary system (e.g., cloud-based, or partially cloud-based, virtualization system) according to various implementations and embodiments of the disclosed subject matter.

FIG. 10 presents a block diagram of an exemplary virtualization component 1000 (e.g., cloud-based, or partially cloud-based, virtualization component) according to various implementations and embodiments of the disclosed subject matter. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

The virtualization component 1000 can comprise a communication component 1002 that can be used to communicate (e.g., transmit, receive) information between the virtualization component 1000 and other components (e.g., communication devices, network-related devices, industrial devices, other types of industrial assets that have communication functionality, other devices with communication functionality that are associated with industrial enterprises, cloud gateways, etc.). The information can include, for example, data relating to industrial automation systems, data relating to specifications, properties, or characteristics of industrial devices or other industrial assets, customer-related data, work-order-related data relating to work orders that will or may be handled by an industrial automation system, etc.

The virtualization component 1000 can comprise an aggregator component 1004 that can aggregate data received (e.g., obtained, collected, detected, etc.) from various entities (e.g., communication devices, industrial devices, industrial assets, network-related devices, cloud gateways, other devices with communication functionality that are associated with industrial enterprises, processor component(s), user interface(s), data store(s), etc.). The aggregator component 1004 can correlate respective items of data based at least in part on type of data, source of the data, time or date the data was generated or received, type of device or asset associated with the data, identifier associated with a device or asset, customer associated with the data, user (e.g., operator, supervisor or manager, engineer, technician, etc.) associated with the data, industrial automation system associated with the data, industrial enterprise associated with the system, etc., to facilitate processing of the data (e.g., analyzing of the data, generating simulation models, etc.).

The virtualization component 1000 also can include a monitor component 1006 that can monitor device data, process data, asset data, system data, customer data, and/or other data in connection with the industrial automation systems. For instance, the monitor component 1006 can monitor information (e.g., signals, device or process statuses, network communication of information, process flows, updates, modifications, etc.) associated with industrial automation systems, virtualized industrial automation systems, industrial enterprises, and/or systems or devices of customers associated with the industrial enterprises to facilitate detecting information associated with industrial automation systems that can facilitate generating and updating virtualized industrial automation systems, remotely tracking operation of or controlling operation of an industrial automation system via an associated virtualized industrial automation system, customizing a view of and/or a data overlay associated with a virtualized automation system for a user, sharing a view (e.g., a customized view) of and/or a data overlay (e.g., a customized data overlay) associated with a virtualized automation system with a communication device of another user, generating virtual notes in connection with a virtual automation system, controlling and/or enforcing the viewability scope associated with a virtual note, and/or performing other virtualization-related services. The monitor component 1006 can be associated with sensors, meters, HMIs, communication monitoring components, or other components associated with industrial automation systems, industrial enterprises, and/or systems or devices of the customers to facilitate the monitoring of the industrial automation systems, industrial enterprises, and/or systems or devices of the customers.

The virtualization component 1000 can comprise a detector component 1008 that can detect desired information associated with industrial automation systems that can facilitate performing virtualization-related services in connection with an industrial automation system (e.g., generating or updating a virtualized industrial automation system, remotely interacting with (e.g., monitoring, tracking, and/or controlling, etc., operation of) an industrial automation system via interacting with a virtualized industrial automation system, etc.), in accordance with the defined virtualization management criteria. For instance, the detector component 1008 can detect desired device data, process data, asset data, system data, and/or customer data in connection with the industrial automation systems that can facilitate generating a virtualized industrial automation system that can accurately represent and interface with an industrial automation system, remotely interacting with and/or controlling an industrial automation system via an associated virtualized industrial automation system, and/or performing other virtualization-related services or functions.

The virtualization component 1000 also can include a collection component 1010 that can receive, collect, or obtain data (e.g., desired device data, process data, asset data, system data, and/or customer data) from industrial automation systems, communication devices, virtualized industrial automation systems, extrinsic sources, etc., to facilitate performing virtualization-related services, as more fully disclosed herein. The data collected by the collection component 1010 can be stored in the data store 1040, and/or can be made available to other components (e.g., analyzer component 1016, virtualization management component 1018, etc.) to facilitate generating and updating virtualized industrial automation systems, remotely interacting with (e.g., monitoring, tracking, and/or controlling, etc.) an industrial automation system via an associated virtualized industrial automation system, and/or performing other virtualization-related services or functions.

The virtualization component 1000 can comprise an interface component 1012 that can be employed to facilitate interfacing the virtualization component 1000, including a virtualized industrial automation system generated by the virtualization component 1000, with industrial automation systems and their constituent components (e.g., industrial devices or assets, network-related devices or assets, etc.) or processes, systems or devices associated with customers, systems or devices associated with device manufacturers, etc. For instance, the interface component 1012 can be configured to receive industrial data (e.g., device data, process data, asset data, system data, configuration data, status data, process variable data, etc.) sent by one or more cloud-capable industrial devices, cloud gateways, or other sources of industrial data. The interface component 1012 also can be configured to receive network-related data (e.g., data relating to communication conditions, network-status data, data identifying network-related devices, etc.) communicated by one or more network-related devices of the network component of an industrial automation system. The interface component 1012 also can be configured to interface a virtualized industrial automation system with a corresponding industrial automation system to facilitate remotely interacting with (e.g., monitoring, tracking, and/or controlling, etc., operation of) the industrial automation system via interactions (e.g., user interactions) with the virtualized industrial automation system (e.g., via virtualized control of the virtualized operation of the virtualized industrial automation system). The interface component 1012 further can be configured to exchange data with one or more client or customer devices via an Internet connection. For example, the interface component 1012 can receive customer profile data, requests for firmware upgrades, customer service selections, information relating to work orders for products, customer preferences or requirements with regard to a work order, or other such information from a client device (e.g., an Internet-capable client device, such as a phone, a computer, an electronic tablet or pad, or other suitable Internet-capable device). The interface component 1012 also can deliver upgrade notifications, firmware upgrades, reports or notifications regarding the evaluation of and determinations regarding proposed modifications to an industrial automation system, notifications of impending device failures, identification of asset or system inefficiencies, configuration recommendations, or other such data to the client device.

The system also can contain a controller component 1014 that can control operations relating to processing data, generate or update a virtualized industrial automation system that can represent an industrial automation system, remotely control an industrial automation system using an associated virtualized industrial automation system, customize a view of a virtualized industrial automation system for a user, generate a simulation model of an industrial automation system, perform simulation operations using simulation models, and/or perform other operations in connection with the industrial automation system. The controller component 1014 can facilitate controlling operations being performed by various components of the virtualization component 1000, controlling data flow between various components of the virtualization component 1000, controlling data flow between the virtualization component 1000 and other components or systems associated with the virtualization component 1000, etc.

The analyzer component 1016 can analyze data (e.g., device data, process data, asset data, system data, customer data, user-generated or user-provided data, and/or other data) to facilitate generating a virtualized industrial automation system of an industrial automation system, customizing a view of and/or a data overlay associated with a virtualized industrial automation system, sharing a customized view of and/or a customized data overlay associated with a virtualized industrial automation system, processing virtual notes, etc. The analyzer component 1016 can parse data to facilitate identifying data that is relevant to performing an operation (e.g., generating a virtualized industrial automation system, customizing a view of and/or a data overlay associated with a virtualized industrial automation system, etc.) by the virtualization component 1000. Based at least in part on the analysis of the data, the analyzer component 1016 can generate analysis results that can be provided to another component (e.g., virtualization management component 1018, processor component 1038, etc.) to facilitate the performance of various operations by the virtualization component 1000.

The virtualization component 1000 also can comprise a virtualization management component 1018 that can generate and/or update a virtualized industrial automation system that can represent an industrial automation system, remotely interact with and/or control an industrial automation system using an associated virtualized industrial automation system, customize a view of and/or a data overlay associated with a virtualized industrial automation system for a user, share a customized view of and/or a customized data overlay associated with a virtualized industrial automation system, process virtual notes, generate a simulation model of an industrial automation system, perform simulation operations using simulation models, and/or performing other operations. For instance, the virtualization management component 1018 can include a virtualization generator component 1020 that can generate and/or update a virtualized industrial automation system that can represent an industrial automation system, including generating and/or updating virtualized versions or instances of the constituent components (e.g., industrial devices, industrial processes, industrial assets, network-related devices or assets, etc.) of the industrial control system, the interrelationships between respective constituent components, configurations of respective constituent components, etc., in accordance with the set of defined virtualization management criteria, as more fully disclosed herein.

The virtualization management component 1018 can comprise a virtualized controller component 1022 that can facilitate remotely interacting and/or controlling an industrial automation system using an associated virtualized industrial automation system. For instance, the virtualized controller component 1022 can receive information relating to user interactions with the virtualized industrial automation system from a communication device of the user, and can facilitate remotely interacting with and/or controlling the industrial automation system in response to the information relating to the user interactions with the virtualized industrial automation system, as more fully disclosed herein.

The virtualization management component 1018 can include a customizer component 1024 that can customize a view of, and/or a data overlay associated with, a virtualized industrial automation system that can correspond to and be interfaced with an industrial automation system, for example, based at least in part on one or more customization factors (e.g., associated with a user). The virtualization management component 1018 can facilitate providing (e.g., communicating, presenting, etc.) data relating to the customized view of, and/or a customized data overlay associated with, the virtualized industrial automation system to a communication device of a user to facilitate displaying the customized view of and/or a customized data overlay associated with, the virtualized industrial automation system to the user via the communication device.

The virtualization management component 1018 also can comprise a data overlay component 1026 that can facilitate overlaying a set of data on a virtualized industrial automation system, wherein the set of data can relate to operation of the industrial automation system associated with the virtualized industrial automation system. The data overlay component 1026 can facilitate overlaying a summary or synthesis of data associated with the industrial automation system, or a portion thereof, on the virtualized industrial automation system, or a portion thereof. The data overlay component 1026 can facilitate overlaying respective subsets of data on or in proximity to respective virtualized objects (e.g., virtualized industrial device(s), virtualized industrial process(es), virtualized industrial asset(s), virtualized network-related device(s), etc.) presented in the virtualized industrial automation system, wherein the respective virtualized objects (e.g., industrial device(s), industrial process (es), industrial asset(s), network-related device(s), etc.) can correspond to respective objects of the industrial automation system. In some implementations, the data overlay component 1026 can facilitate overlaying a customized set of data on a virtualized industrial automation system, or customized subsets of data on or in proximity to respective virtualized objects presented in the virtualized industrial automation system, based at least in part on the role of a user, location of the user in relation to the industrial automation system, preferences of the user, and/or other factors, in accordance with the virtualization management criteria.

The virtualization management component 1018 also can include a filter component 1028 that can facilitate filtering data overlaid on the virtualization industrial automation system, wherein the data can relate to the operation of the industrial automation system and/or a user associated therewith. The filter component 1028 can facilitate providing one or more filters to a communication device of a user to enable the user to filter the data, or the view of the data, overlaid on the virtualized industrial automation system (e.g., the user's customized view of the virtualized industrial automation system). The user, via the communication device, can manipulate or select a filter control and/or input filter-related information to facilitate setting or selecting a desired filter(s) that can be used to filter the data associated with the industrial automation system. The virtualization management component 1018 can receive the information relating to setting or selection of the filter(s) and/or other filter-related information from the communication device for processing. The filter component 1029 can facilitate setting or implementing the filter(s) based at least in part on the information relating to setting or selection of the filter(s) and/or other filter-related information. The filter component 1028 (and/or the analyzer component 1016) can analyze data relating to the industrial automation system, and can filter such data to generate a set of filtered data relating to the industrial automation system. The data overlay component 1026 can facilitate overlaying the set of filtered data on the virtualized industrial automation system, or a portion thereof (e.g., facilitate overlaying the set of filtered data on or in proximity to a virtualized object(s) of the virtualized industrial automation system).

For instance, the filter component 1028 can facilitate enabling a user, via the user's communication device, to select and apply a desired filter(s) to filter data associated with the user's view (e.g., customized view) of the virtualized industrial automation system, for example, to present (on the virtualized industrial automation system) a subset of the data that is relevant to a work task that the user is performing at the time, present (on the virtualized industrial automation system) more detailed data and/or a drilled-down view regarding a certain portion of the virtualized industrial automation system and associated industrial automation system 104, as desired by the user. The filter component 1028 can facilitate providing a number of different types of filters to the communication devices of users to enable the users to customize, augment, and/or filter data overlays for a user's personalized view of the virtualized industrial automation system, as more fully disclosed herein.

The virtualization management component 1018 also can include a share component 1030 that can facilitate sharing a customized view of, and/or a customized data overlay associated with, a virtualized industrial automation system with a communication device of another user. The share component 1030 can facilitate presenting a share control or another control(s) to a user via the user's communication device. If the user desires to share the user's customized view of, and/or customized data overlay associated with, the virtualized industrial automation system with a communication device of another user, the user can manipulate or select the share control and/or another control(s). In response, the share component 1030 can facilitate determining whether the other user is authorized to access and view the user's customized view of, and/or customized data overlay associated with, the virtualized industrial automation system, based at least in part on the role of the other user, location of the other user in relation to the industrial automation system, access rights of the other user to access information associated with the virtualized industrial automation system, and/or other factors, in accordance with the defined virtualization management criteria. If the share component 1030 determines that the other user is permitted to access and view the user's customized view of, and/or customized data overlay associated with, the virtualized industrial automation system, the share component 1030 can facilitate communicating the user's customized view of, and/or customized data overlay associated with, the virtualized industrial automation system to the communication device of the other user for presentation to the other user. If the share component 1030 determines that the other user is not permitted to access and view the user's customized view of, and/or customized data overlay associated with, the virtualized industrial automation system, the share component 1030 can deny the request to share and/or can communicate a denial message to the communication device of the user and/or to the communication device of the other user.

The virtualization management component 1018 further can comprise a note component 1032 that can facilitate generating and posting virtual notes to a virtual industrial automation system. A virtual note can be a graphical representation of a note and can comprise information (e.g., user-generated information) relating to the industrial automation system or other desired information presented by a user. In some implementations, the note component 1032 can present (e.g., communicate) a note generation control or another control, which can facilitate creating virtual notes, to a communication device of a user. If the user desires to create a virtual note, the user can manipulate or select the note generation control or other control presented on the communication device to facilitate generating and sending a request to create a virtual note to the virtualization management component 1018. The note component 1032 can receive the request to create the virtual note from the communication device of the user. In response, the note component 1032 can facilitate generating the virtual note. The user can enter desired information (e.g., user-generated information) for inclusion in the virtual note via the communication device, and the communication device can communicate the desired information to the virtualization management component 1018. The note component 1032 can insert the desired information in the virtual note. The user, via the communication device, also can manipulate or select a control (e.g., note placement control) to facilitate placing, applying, or inserting the virtual note in a desired location of the virtualized industrial automation system. The manipulation or selection of the control and/or other gestures or input information (e.g., touch screen gesture, mouse click, mouse movement, keystroke, etc.) of the user can facilitate generating note placement information, which can facilitate placing, applying, or inserting the virtual note in the desired location of the virtualized industrial automation system, and can be sent to the virtualization management component 1018 for processing. The note component 1032 can facilitate placing, applying, or inserting the virtual note, with the desired information, in the desired location of the virtualized industrial automation system, based at least in part on the note placement information.

In some implementations, the note component 1032 can facilitate setting and enforcing a viewability scope for a virtual note, and can control which entities (and associated communication devices) can view (or present) the virtual note posted (e.g., placed) on the virtualized industrial automation system. For instance, the user may desire that only a certain user(s) be able to view the virtual note based at least in part on the role of another user with respect to the industrial automation system, an identity of the other user, a location of the other user in relation to the industrial automation system, and/or another factor(s), in accordance with the defined virtualization management criteria. The user, using the user's communication device, can manipulate or select the scope control and/or can input scope-related information to the communication device to facilitate setting the viewability scope for the virtual note. The communication device can send the information relating to the scope control and/or the other scope-related information to the virtualization management component 1018 for processing. The note component 1032 can set and enforce the viewability scope for the virtual note based at least in part on the information relating to the scope control and/or the other scope-related information, as more fully disclosed herein. The note component 1032 can facilitate controlling which entities (e.g., users) can view the virtual note posted (e.g., placed) on the virtualized industrial automation system using their respective communication devices, based at least in part on the viewability scope associated with the virtual note, as more fully disclosed herein.

The virtualization management component 1018 also can contain a security component 1034 that can facilitate securing a virtualized industrial automation system and associated industrial automation system. The security component 1034 can facilitate controlling access to a virtualized industrial automation system (or a particular (e.g., customized) view of a virtualized industrial automation system) and/or an associated industrial automation system (e.g., via the virtualized industrial automation system), based at least in part on respective authentication credentials of user, respective access rights of users, respective locations of users, etc., as more fully disclosed herein.

The virtualization management component 1018 also can comprise a simulation component 1036 that can generate a simulation model of the industrial automation system based at least in part on the simulation or emulation of the industrial control system, in accordance with the set of defined virtualized management criteria. The simulation component 1036 can integrate the respective simulations or emulations of the constituent components of the industrial automation system, the interrelationships between respective constituent components, configurations of respective constituent components, etc., to facilitate generating the simulation model that can simulate or emulate the industrial automation system. The simulation component 1036 also can use the simulation model to facilitate simulating operation of the industrial automation system under (e.g., in response to) a given set of conditions (e.g., under a set of conditions associated with a modification (e.g., adjustment to a virtualized control, virtualized switch, etc.) to the virtualized industrial control system that is under consideration). The virtualization management component 1018 or a user can analyze the results of the simulated operation of the industrial automation system, and can determine whether the modification to the virtualized industrial control system that is under consideration is to be performed based at least in part on the analysis results.

The virtualization component 1000 also can comprise a processor component 1038 that can operate in conjunction with the other components (e.g., communication component 1002, aggregator component 1004, monitor component 1006, etc.) to facilitate performing the various functions and operations of the virtualization component 1000. The processor component 1038 can employ one or more processors (e.g., central processing units (CPUs), graphical processing units (GPUs), field-programmable gate arrays (FPGAs), etc.), microprocessors, or controllers that can process data, such as industrial data (e.g., device data, process data, asset data, system data, etc.) associated with industrial control systems, customer or client related data, data relating to parameters associated with the virtualization component 1000 and associated components, etc., to facilitate generating or updating a virtualized industrial automation system that can represent an industrial automation system, remotely interacting with and/or controlling an industrial automation system using an associated virtualized industrial automation system, customizing a view of and/or a data overly associated with a virtualized industrial automation system for a user, filter data relating to the industrial automation system in connection with a data overlay, share a customized view and/or a customized data overlay associated with a user with a communication device of another user, generate or post a virtual note, generating a simulation model of an industrial automation system, performing simulation operations using simulation models to facilitate determining whether to perform a particular action in connection with a virtualized industrial automation system or associated industrial automation system, performing other virtualization-related operations, etc.; and can control data flow between the virtualization component 1000 and other components associated with the virtualization component 1000.

In yet another aspect, the virtualization component 1000 can contain a data store 1040 that can store data structures (e.g., user data, metadata); code structure(s) (e.g., modules, objects, classes, procedures), commands, or instructions; industrial data or other data associated with industrial automation systems or industrial enterprises; customer or client related information; data relating to virtualization-related services in connection with industrial automation systems; parameter data; algorithms (e.g., algorithm(s) relating to generating or updating a virtualized industrial automation system that can represent an industrial automation system, including its industrial devices, industrial processes, industrial assets, network-related devices, interrelationships between such devices, processes, or assets, etc.); algorithm(s) relating to remotely interacting with (e.g., monitoring, tracking, controlling, etc.) an industrial automation system using an associated virtualized industrial automation system, algorithm(s) relating to customizing a view of and/or a data overlay associated with a virtualized industrial automation system, filtering data, sharing a customized view of and/or a customized data overlay associated with a virtualized industrial automation system, generating or posting a virtual note, etc.); a set of defined virtualization management criteria; and so on. In an aspect, the processor component 1038 can be functionally coupled (e.g., through a memory bus) to the data store 1040 in order to store and retrieve data desired to operate and/or confer functionality, at least in part, to the communication component 1002, aggregator component 1004, monitor component 1006, etc., of the virtualization component 1000 and/or substantially any other operational aspects of the virtualization component 1000. It is to be appreciated and understood that the various components of the virtualization component 1000 can communicate data, instructions, or signals between each other and/or between other components associated with the virtualization component 1000 as desired to carry out operations of the virtualization component 700. It is to be further appreciated and understood that respective components (e.g., communication component 1002, aggregator component 1004, monitor component 1006, etc.) of the virtualization component 1000 each can be a stand-alone unit, can be included within the virtualization component 1000 (as depicted), can be incorporated within another component of the virtualization component 1000 (e.g., within the virtualization management component 1018) or a component separate from the virtualization component 1000, and/or virtually any suitable combination thereof, as desired.

In accordance with various embodiments, one or more of the various components of the virtualization component 1000 (e.g., communication component 1002, aggregator component 1004, monitor component 1006, etc.) can be electrically and/or communicatively coupled to one another to perform one or more of the functions of the virtualization component 1000. In some implementations, one or more components of the virtualization component 1000 (e.g., communication component 1002, aggregator component 1004, monitor component 1006, . . . , virtualization management component 1018) can comprise software instructions that can be stored in the data store 1040 and executed by the processor component 1038. The virtualization component 1000 also can interact with other hardware and/or software components not depicted in FIG. 10. For example, the processor component 1038 can interact with one or more external user interface devices, such as a keyboard, a mouse, a display monitor, a touchscreen, or other such interface devices.

Figure 11:
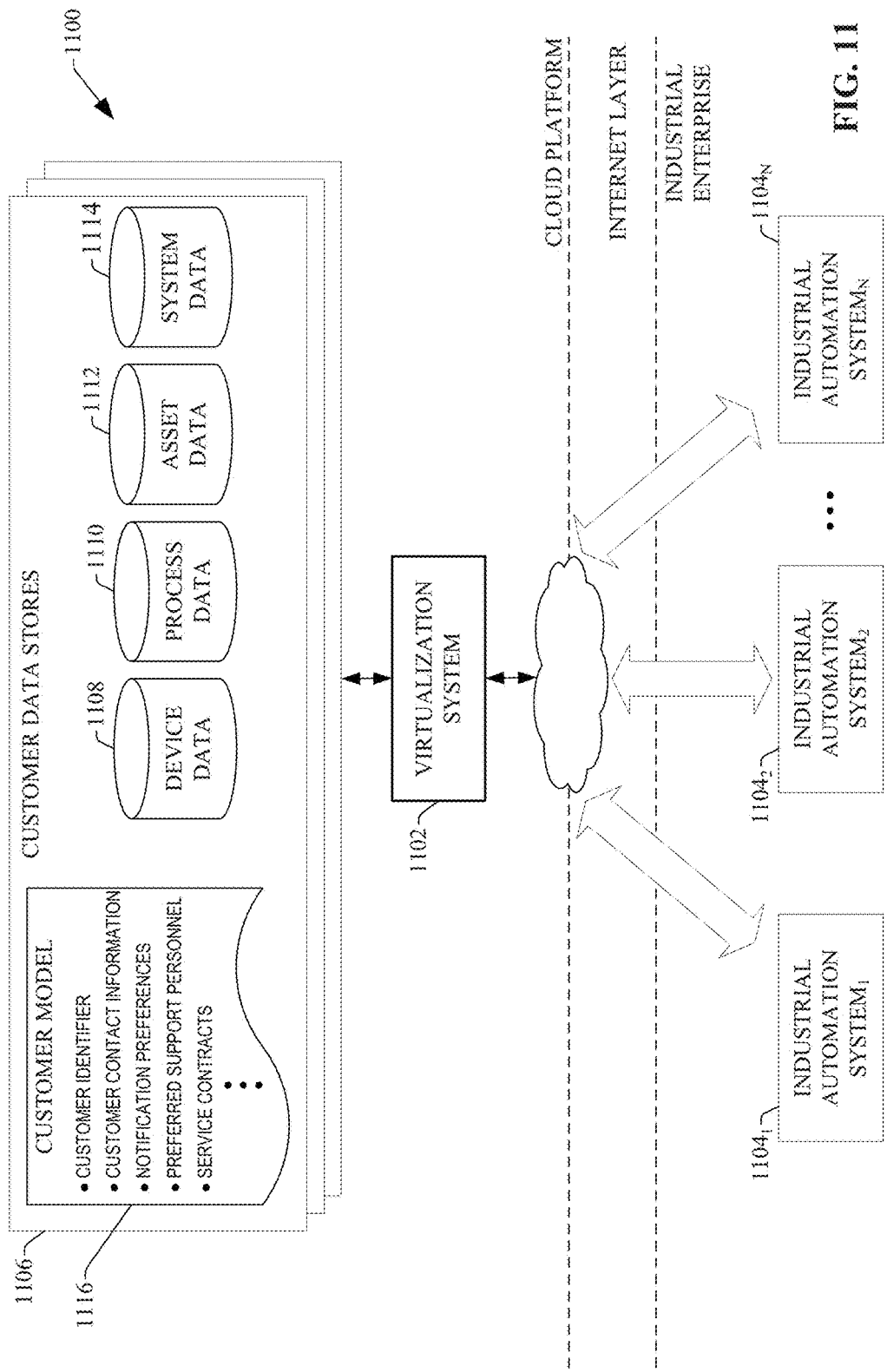
FIG. 11 illustrates a diagram of an example system that can facilitate generation of a virtualized industrial automation system representative of an industrial automation system and the performance of other virtualization-related services based at least in part collection of customer-specific industrial data by a cloud-based virtualization system, in accordance with various aspects and embodiments of the disclosed subject matter.

FIG. 11 illustrates a diagram of an example system 1100 that can facilitate generation of a virtualized industrial automation system representative of an industrial automation system and the performance of other virtualization-related services based at least in part collection of customer-specific industrial data by a cloud-based virtualization system, in accordance with various aspects and embodiments of the disclosed subject matter. The system 1100 can include a virtualization system 1102 that can execute as a cloud-based service on a cloud platform (e.g., cloud platform 902 of FIG. 9), and can collect data from multiple industrial automation systems, such as industrial automation system$_1$ 1104$_1$, industrial automation system$_2$ 1104$_2$, and/or (up through) industrial automation system$_N$ 1104$_N$. The industrial automation systems (e.g., 1104$_1$, 1104$_2$, 1104$_N$) can comprise different industrial automation systems within a given facility and/or different industrial facilities at diverse geographical locations. Industrial automation systems (e.g., 1104$_1$, 1104$_2$, 1104$_N$) also can correspond to different business entities (e.g., different industrial enterprises or customers), wherein the virtualization system 1102 can collect and maintain a distinct customer data store 1106 for each customer or business entity.

The virtualization system 1102 can organize manufacturing data collected from the industrial automation systems (e.g., 1104$_1$, 1104$_2$, 1104$_N$) according to various classes. In the illustrated example, manufacturing data can be classified according to device data 1108, process data 1110, asset data 1112, and system data 1114.

Figure 12:
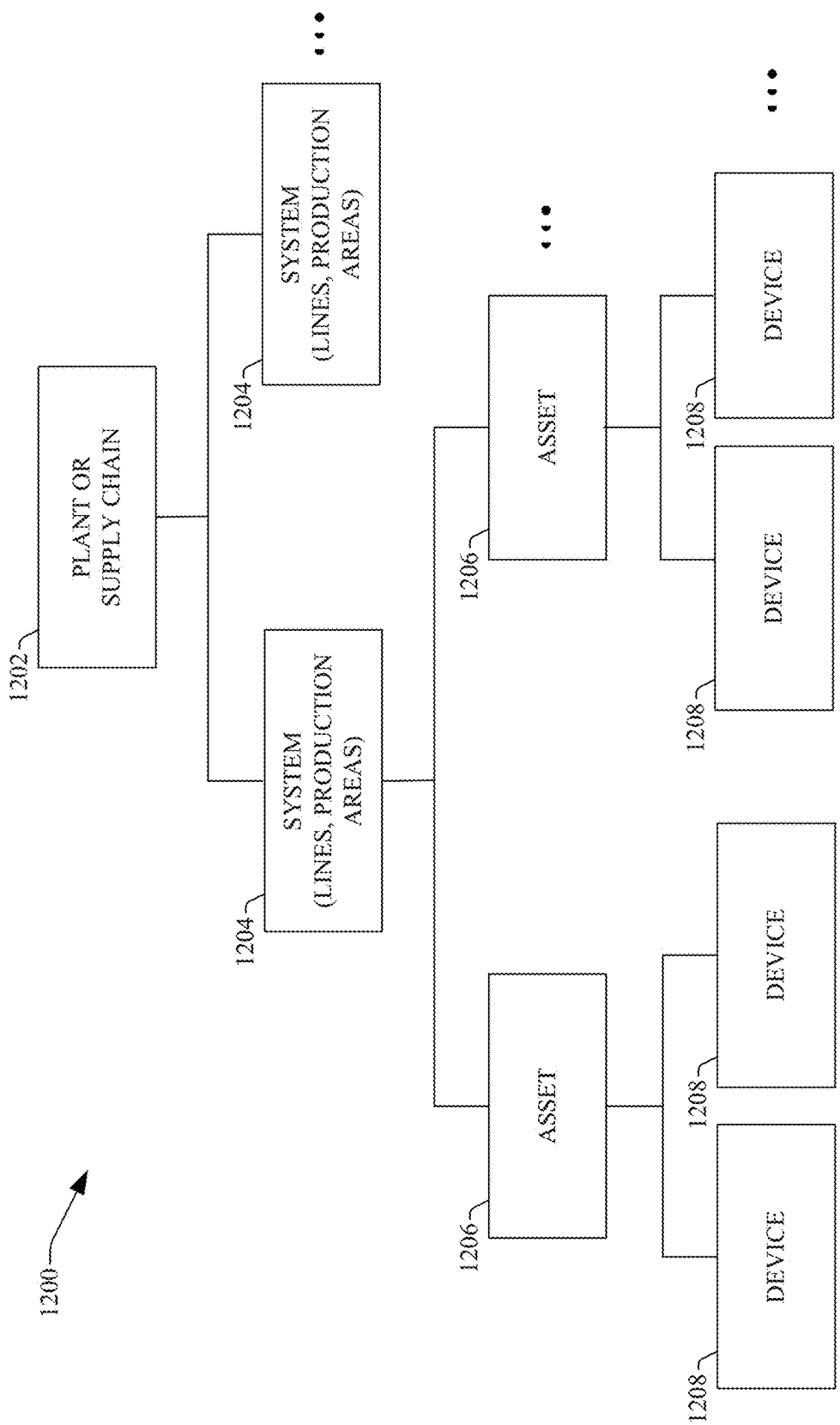
FIG. 12 illustrates a diagram of an example hierarchical relationship between these example data classes.

Referring briefly to FIG. 12, FIG. 12 illustrates a diagram of an example hierarchical relationship 1200 between these example data classes. A given plant or supply chain 1202 can comprise one or more industrial automation systems 1204. The industrial automation systems 1204 can represent the production lines or productions areas within a given plant facility or across multiple facilities of a supply chain. Each industrial automation system 1204 can comprise a number of assets 1206 that can represent the machines and equipment that make up the industrial automation system (e.g., the various stages of a production line). In general, each asset 1206 can comprise one or more industrial devices 1208, which can include, for example, the programmable controllers, motor drives, HMIs, sensors, meters, etc. comprising the asset 1206. The various data classes depicted in FIGS. 11 and 12 are only intended to be exemplary, and it is to be appreciated that any organization of industrial data classes maintained by the virtualization system 1102 is within the scope of one or more embodiments of the disclosed subject matter.

Returning again to FIG. 11, the virtualization system 1102 can collect and maintain data from the various devices and assets that make up the industrial automation systems 1204 and can classify the data according to the aforementioned classes for the purposes of facilitating analysis of the data, generation of simulation models of the industrial automation systems (e.g., 1104$_1$, 1104$_2$, 1104$_N$), and/or performing other operations by the virtualization system 1102. Device data 1108 can comprise device-level information relating to the identity, configuration, and status of the respective devices comprising the industrial automation systems (e.g., 1104$_1$, 1104$_2$, 1104$_N$), including but not limited to device identifiers, device statuses, current firmware versions, health and diagnostic data, device documentation, identification and relationship of neighboring devices that interact with the device, etc.

The process data 1110 can comprise information relating to one or more processes or other automation operations carried out by the devices; e.g., device-level and process-level faults and alarms, process variable values (speeds, temperatures, pressures, etc.), and the like.

The asset data 1112 can comprise information generated, collected, determined, or inferred based on data that can be aggregated from various (e.g., multiple) industrial devices over time, which can yield higher asset-level views of the industrial automation systems (e.g., 1104$_1$, 1104$_2$, 1104$_N$). Example asset data 1112 can include performance indicators (KPIs) for the respective assets, asset-level process variables, faults, alarms, etc. Since the asset data 1112 can yield a relatively longer term view of asset characteristics relative to the device and process data, the virtualization system 1102 can leverage the asset data 1112 to facilitate identifying operational patterns and correlations unique to each asset, among other types of analysis, and this can facilitate generating respective virtualization assets that can correspond to the respective assets, and generating, updating, using, customizing, etc., of a virtualized industrial automation system of an industrial control system based at least in part on the respective virtualizations of the respective assets associated with the industrial control system.

The system data 1114 can comprise collected, determined, or inferred information that can be generated based on data that can be aggregated from various (e.g., multiple) assets over time. The system data 1114 can characterize system behavior within a large system of assets, yielding a system-level view of each of the industrial automation systems (e.g., 1104$_1$, 1104$_2$, 1104$_N$). The system data 1114 also can document the particular system configurations in use and industrial operations performed at each of the industrial automation systems (e.g., 1104$_1$, 1104$_2$, 1104$_N$). For example, the system data 1114 can document the arrangement of assets, interconnections between devices, the product being manufactured at a given facility, an industrial process performed by the assets, a category of industry of each industrial system (e.g., automotive, oil and gas, food and drug, marine, textiles, etc.), or other relevant information. Among other functions, this data can be accessed by technical support personnel during a support session so that particulars of the customer's unique system and device configurations can be obtained without reliance on the customer to possess complete knowledge of their assets.

As an example, a given industrial facility can include a packaging line (e.g., the system), which in turn can comprise a number of individual assets (e.g., a filler, a labeler, a capper, a palletizer, etc.). Each asset can comprise a number of devices (e.g., controllers, variable frequency drives, HMIs, etc.). Using an architecture similar to that depicted in FIG. 9, the virtualization system 1102 can collect industrial data from the individual devices during operation and can classify the data in the customer data store 1106 according to the aforementioned classifications. Note that some data may be duplicated across more than one class. For example, a process variable classified under process data 1110 also can be relevant to the asset-level view of the system represented by the asset data 1112. Accordingly, such process variables can be classified under both classes. Moreover, subsets of data in one classification can be derived, determined, or inferred based on data under another classification. For example, subsets of system data 1114 that can characterize certain system behaviors can be derived, determined, or inferred based on a long-term analysis of data in the lower-level classifications.

In addition to maintaining the data classes (e.g., 1108, 1110, 1112, 1114), each customer data store also can maintain a customer model 1116 that can contain data specific to a given industrial entity or customer. The customer model 1116 can contain customer-specific information and preferences, which can be leveraged by (e.g., used by) the virtualization system 1102 to facilitate generating or updating a virtualized industrial automation system that can represent an industrial automation system, remotely interacting with (e.g., monitoring, tracking, controlling, etc.) an industrial automation system using an associated virtualized industrial automation system, customizing a view of and/or a data overlay associated with a virtualized industrial automation system for a user, sharing a customized view of and/or a customized data overlay associated with a virtualized industrial automation system for a user, processing virtual notes, generating a simulation model of an industrial automation system, performing simulation operations using simulation models, and/or performing other operations in connection with the industrial automation system, etc. Example information that can be maintained in the customer model 1116 can include a client identifier, client preferences or requirements with regard to production or work orders associated with an industrial automation system, client contact information specifying which plant personnel are to be notified in response to results of a response of the industrial automation system to a user interaction with an associated virtualized industrial automation system, notification preferences that can specify how plant personnel are to be notified (e.g., email, mobile phone, text message, etc.), service contracts that are active between the customer and the technical support entity, and other such information. The virtualization system 1102 can marry (e.g., associate, link, unite, map, etc.) data collected for each customer with the corresponding customer model 1116 for identification and event handling purposes.

As noted above, industrial data can be migrated (e.g., communicated) from industrial devices to the cloud platform (e.g., comprising the virtualization system 1102) using cloud gateways. To this end, some devices can include integrated cloud gateways that can directly interface each device to the cloud platform. Additionally or alternatively, some configurations can utilize a cloud proxy device that can collect industrial data from multiple devices associated with the industrial automation systems (e.g., 1104$_1$, 1104$_2$, 1104$_N$) and can send (e.g., transmit) the data to the cloud platform. Such a cloud proxy can comprise a dedicated data collection device, such as a proxy server that can share a network (e.g., communication network) with the industrial devices. Additionally or alternatively, the cloud proxy can be a peer industrial device that can collect data from other industrial devices.

Figure 13:
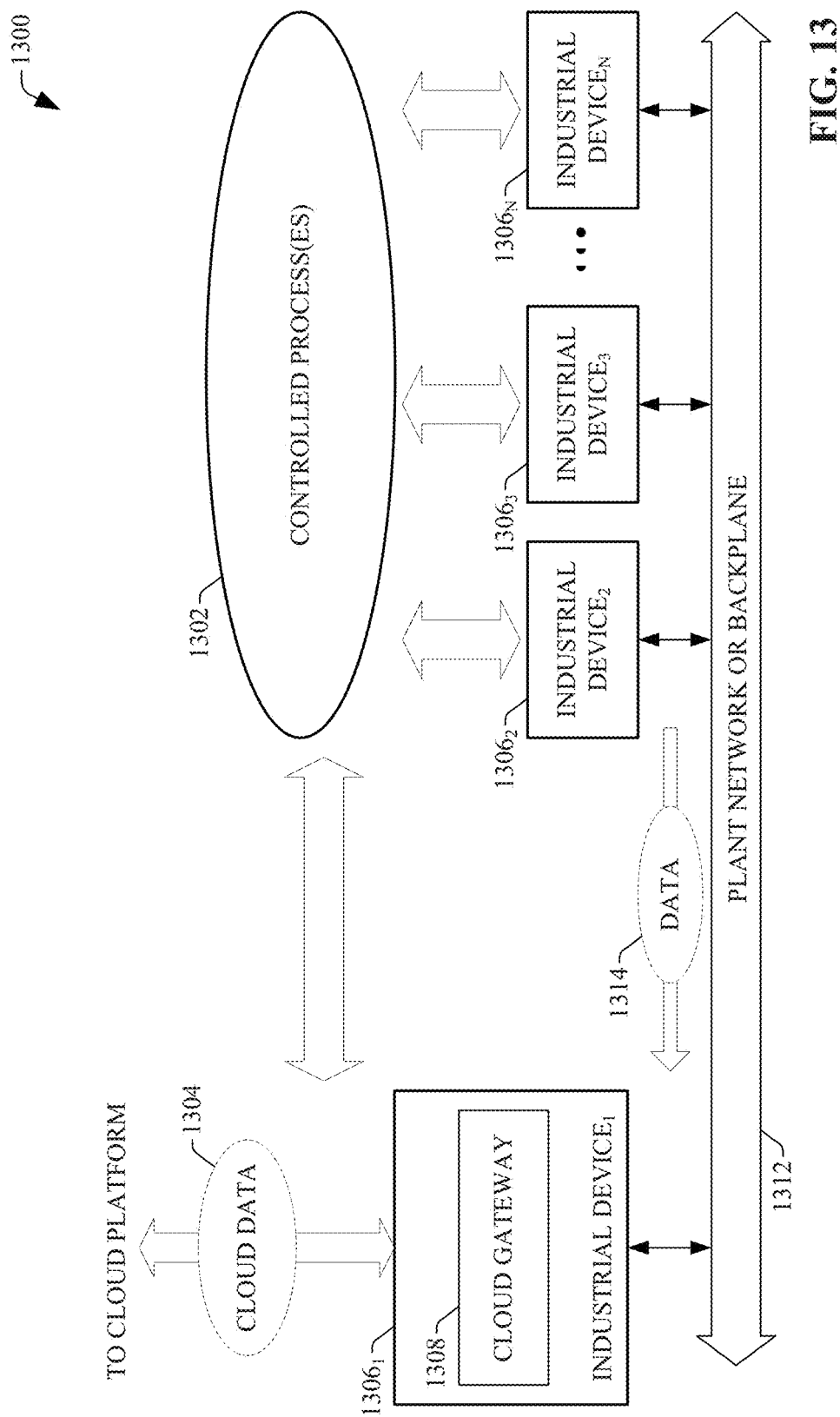
FIG. 13 depicts a block diagram of an example system that can be configured to comprise an industrial device that can act or operate as a cloud proxy for other industrial devices of an industrial automation system to facilitate migrating industrial data to the cloud platform for classification and analysis by the virtualization system, in accordance with various aspects and implementations of the disclosed subject matter.
Figure 14:
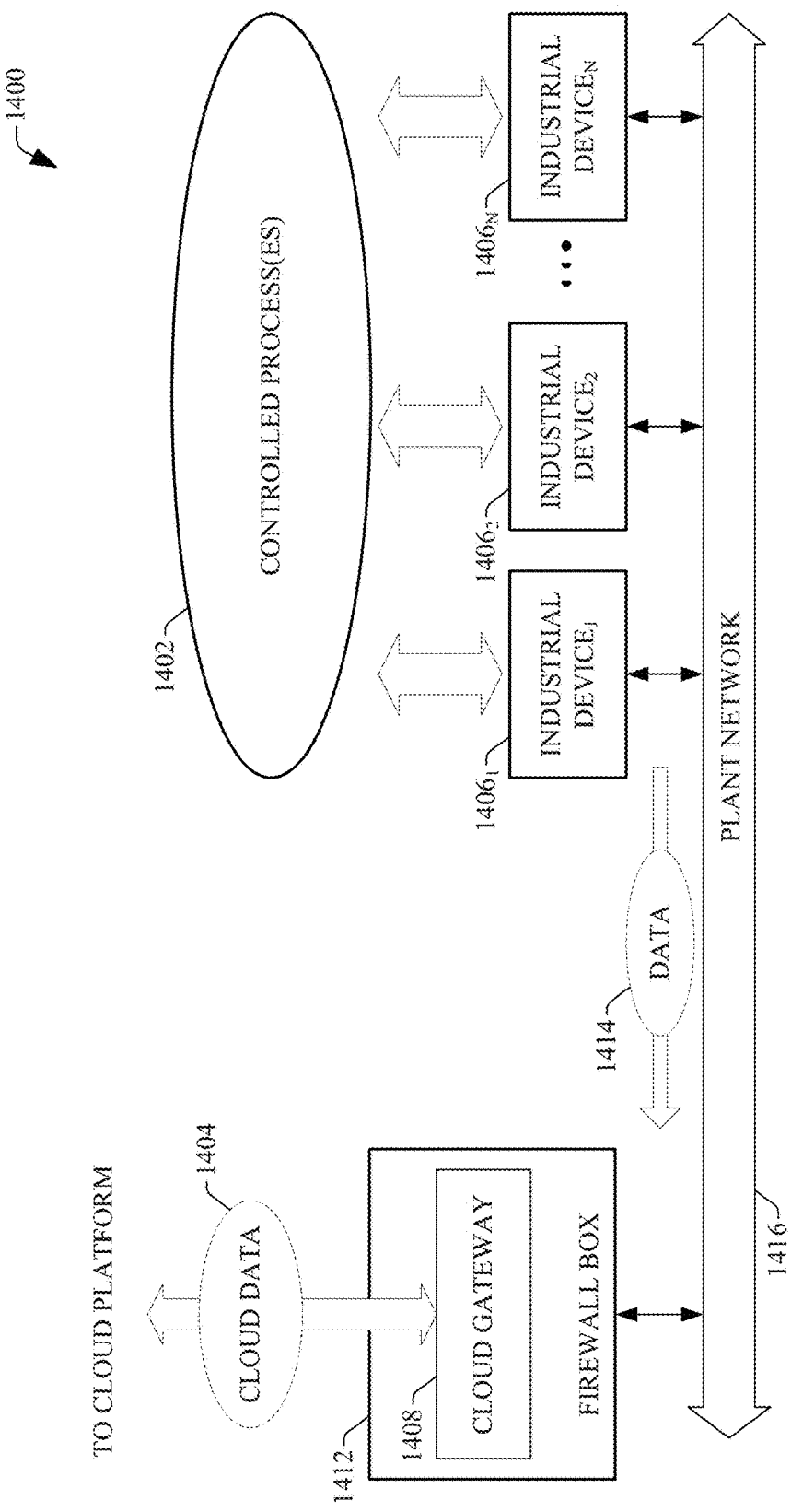
FIG. 14 illustrates a block diagram of an example system that can employ a firewall box that can serve as a cloud proxy for a set of industrial devices to facilitate migrating industrial data to the cloud platform for classification and analysis by the virtualization system, in accordance with various aspects and implementations of the disclosed subject matter.

FIGS. 13 and 14 depict block diagrams of example systems 1300 and 1400, respectively, illustrating respective techniques that can facilitate migrating industrial data to the cloud platform via proxy devices for classification and analysis by the virtualization system, in accordance with various aspects and implementations of the disclosed subject matter. FIG. 13 depicts the system 1300 that can be configured to comprise an industrial device that can act or operate as a cloud proxy for other industrial devices of an industrial automation system. The industrial automation system can comprise a plurality of industrial devices, including industrial device$_1$ 1306$_1$, industrial device$_2$ 1306$_2$, industrial device$_3$ 1306$_3$, and/or (up through) industrial device$_N$ 1306$_N$, that collectively can monitor and/or control one or more controlled processes 1302. The industrial devices 1306$_1$, 1306$_2$, 1306$_3$, and/or (up through) 1306$_N$ respectively can generate and/or collect process data relating to control of the controlled process(es) 1302. For industrial controllers such as PLCs or other automation controllers, this can include collecting data from telemetry devices connected to an industrial controller's I/O, generating data internally based on measured process values, etc.

In the configuration depicted in FIG. 13, industrial device$_1$ 1306$_1$ can act, operate, or function as a proxy for industrial devices 1306$_2$, 1306$_3$, and/or (up through) 1306$_N$, whereby the data 1314 from devices 1306$_2$, 1306$_3$, and/or (up through) 1306$_N$ can be sent (e.g., transmitted) to the cloud via proxy industrial device$_1$ 1306$_1$. Industrial devices 1306$_2$, 1306$_3$, and/or (up through) 1306$_N$ can deliver their respective data 1314 to the proxy industrial device$_1$ 1306$_1$ over the plant network or backplane 1312 (e.g., a Common Industrial Protocol (CIP) network or other suitable network protocol). Using such a configuration, as desired, one industrial device can be interfaced to the cloud platform (via cloud gateway 1308). In some embodiments, the cloud gateway 1308 can perform preprocessing on the gathered data prior to migrating the data to the cloud platform (e.g., time stamping, filtering, formatting, normalizing, summarizing, compressing, etc.). The collected and processed data can be pushed (e.g., transmitted) to the cloud platform as cloud data 1304 via cloud gateway 1308. Once migrated to the cloud platform, the cloud-based virtualization system can classify the data according to the example classifications described herein and/or can utilize the data to facilitate performing various operations relating to generating or updating virtualized industrial automation systems and using virtualized industrial automation systems (e.g., to facilitate remotely interacting with and/or controlling operation of associated industrial automation systems).

While the proxy device illustrated in FIG. 13 is depicted as an industrial device that itself can perform monitoring, tracking, and/or controlling of a portion of controlled process(es) 1302, other types of devices also can be configured to serve as cloud proxies for multiple industrial devices according to one or more implementations of the disclosed subject matter. For example, FIG. 14 illustrates an example system 1400 that can comprise a firewall box 1412 that can serve as a cloud proxy for a set of industrial devices 1406$_1$, 1406$_2$, and/or (up through) 1406$_N$. The firewall box 1412 can act as a network infrastructure device that can allow the plant network 1416 to access an outside network such as the Internet, while also providing firewall protection that can prevent unauthorized access to the plant network 1416 from the Internet. In addition to these firewall functions, the firewall box 1412 can include a cloud gateway 1408 that can interface the firewall box 1412 with one or more cloud-based services (e.g., virtualization-related services, data collection services, data storage services, etc.). In a similar manner to the proxy industrial device 1306$_1$ of FIG. 13, the firewall box 1412 of FIG. 14 can collect industrial data 1414 from including industrial device₁ 1406ₖ, industrial device₂ 1406₂, and/or (up through) industrial device_N 1406_N, which can monitor and control respective portions of controlled process(es) 1402. Firewall box 1412 can include a cloud gateway 1408 that can apply appropriate pre-processing to the gathered industrial data 1414 prior to pushing (e.g., communicating) the data to the cloud-based virtualization system as cloud data 1404. Firewall box 1412 can allow industrial devices 1406₁, 1406₂, and/or (up through) 1406_N to interact with the cloud platform without directly exposing the industrial devices to the Internet.

In some embodiments, the cloud gateway 1308 of FIG. 13 or cloud gateway 1408 of FIG. 14 can tag the collected industrial data (e.g., 1314 or 1414) with contextual metadata prior to pushing the data as cloud data (e.g., 1304 or 1404) to the cloud platform. Such contextual metadata can include, for example, a time stamp, a location of the device at the time the data was generated, or other contextual information. In another example, some cloud-aware devices can comprise smart devices capable of determining their own context within the plant or enterprise environment. Such devices can determine their location within a hierarchical plant context or device topology. Data generated by such devices can adhere to a hierarchical plant model that can define multiple hierarchical levels of an industrial enterprise (e.g., a workcell level, a line level, an area level, a site level, an enterprise level, etc.), such that the data can be identified (e.g., by the virtualization system) in terms of these hierarchical levels. This can allow a common terminology to be used across an entire industrial enterprise to identify devices and their associated data. Cloud-based applications and services that model an enterprise according to such an organizational hierarchy can represent industrial controllers, devices, machines, or processes as data structures (e.g., type instances) within this organizational hierarchy to provide context for data generated by respective devices within the enterprise relative to the enterprise as a whole. Such a convention can replace the flat name structure that is employed by some industrial applications.

In some embodiments, the cloud gateway 1308 of FIG. 13 or cloud gateway 1408 of FIG. 14 can comprise unidirectional "data only" gateways that can be configured only to move data from the premises (e.g., industrial facility) to the cloud platform. Alternatively, the cloud gateways 1308 and 1408 can comprise bi-directional "data and configuration" gateways that additionally can be configured to receive configuration or instruction data from services running on the cloud platform. Some cloud gateways can utilize storeand-forward technology that can allow the gathered industrial data (e.g., 1314 or 1414) to be temporarily stored locally on storage associated with the cloud gateway (e.g., 1308 or 1408) in the event that communication between a gateway and the cloud platform is disrupted. In such events, the cloud gateway (e.g., 1308 or 1408) can forward (e.g., communicate) the stored data to the cloud platform when the communication link is re-established.

To ensure a rich and descriptive set of data for analysis purposes, the cloud-based virtualization system can collect device data in accordance with one or more standardized device models. To this end, a standardized device model can be developed for each industrial device. Device models can profile the device data that is available to be collected and maintained by the virtualization system.

Figure 15:
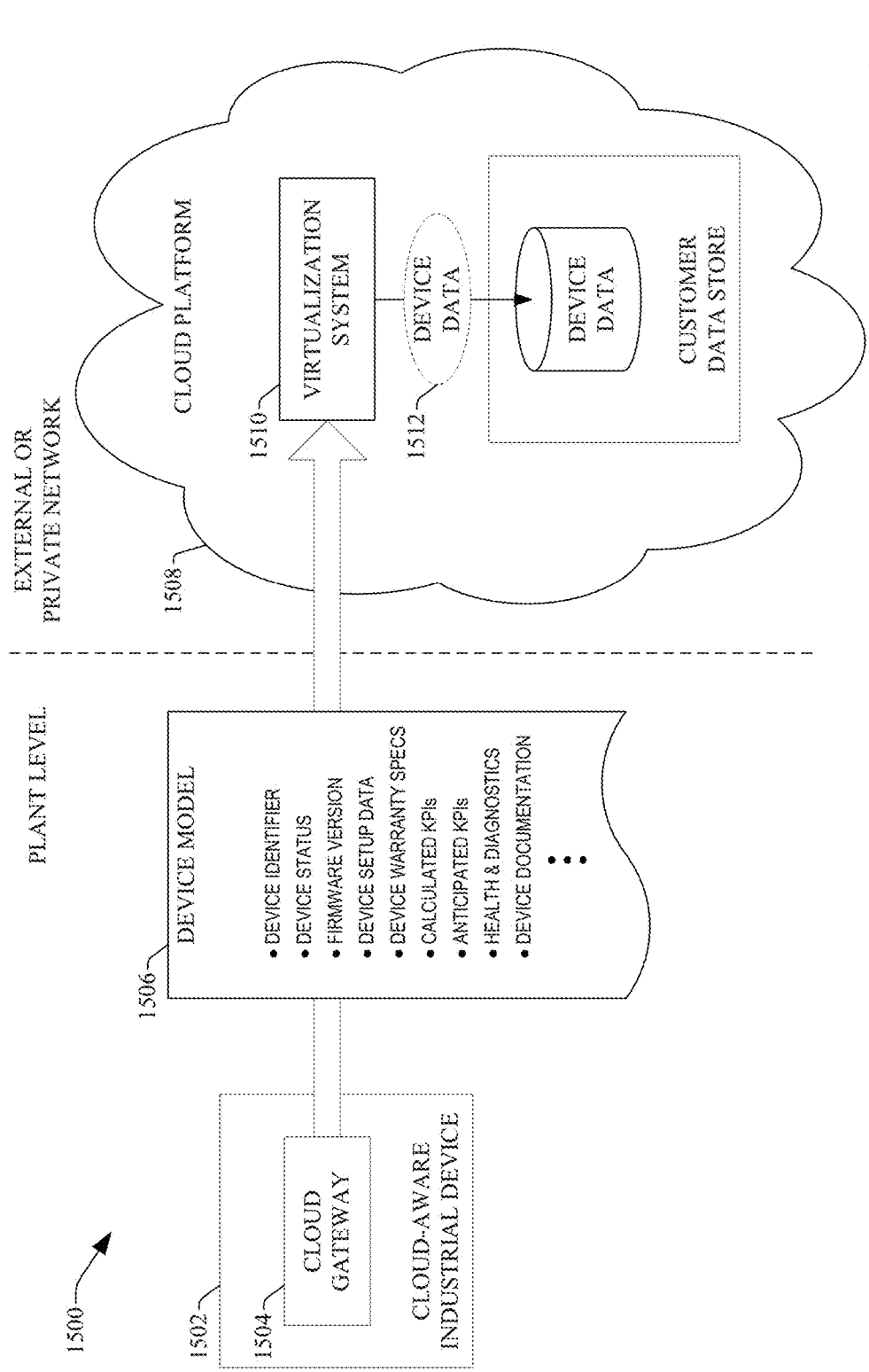
FIG. 15 illustrates a block diagram of an example device model according to various aspects and implementations of the disclosed subject matter.

FIG. 15 illustrates a block diagram of an example device model 1500 according to various aspects and implementations of the disclosed subject matter. In the illustrated example model 1500, the device model 1506 can be associated with a cloud-aware industrial device 1502 (e.g., a programmable logic controller, a variable frequency drive, an HMI, a vision camera, a barcode marking system, etc.). As a cloud-aware device, the industrial device 1502 can be configured to automatically detect and communicate with the cloud platform 1508 upon installation at a plant facility, simplifying integration with existing cloud-based data storage, analysis, and applications (e.g., as performed by the virtualization system described herein). When added to an existing industrial automation system, the industrial device 1502 can communicate with the cloud platform and can send identification and configuration information in the form of the device model 1506 to the cloud platform 1508. The device model 1506 can be received by the virtualization system 1510, which can update the customer's device data 1512 based on the device model 1506. In this way, the virtualization system 1510 can leverage the device model 1506 to facilitate integrating the new industrial device 1502 into the greater system as a whole. This integration can include the virtualization system 1510 updating cloud-based applications or services to recognize the new industrial device 1502, adding the new industrial device 1502 to a dynamically updated data model of the customer's industrial enterprise or plant, modifying a virtualization industrial automation system associated with the industrial automation system to integrate, incorporate, or include a virtualized version of the new industrial device 1502 based at least in part on the identification and configuration information (or other data), determining or predicting a response of the modified industrial automation system based at least in part on a modified simulation model that integrates the new industrial device 1502, making other devices on the plant floor aware of the new industrial device 1502, or other desired integration functions. Once deployed, some data items comprising the device model 1506 can be collected and monitored by the virtualization system 1510 on a real-time or near real-time basis.

The device model 1506 can comprise such information as a device identifier (e.g., model and serial number) associated with the industrial device 1502, status information for the industrial device 1502, a currently installed firmware version associated with the industrial device 1502, device setup data associated with the industrial device 1502, warranty specifications associated with the industrial device 1502, calculated and/or anticipated KPIs associated with the industrial device 1502 (e.g., mean time between failures), health and diagnostic information associated with the industrial device 1502, device documentation, or other such parameters.

Figure 16:
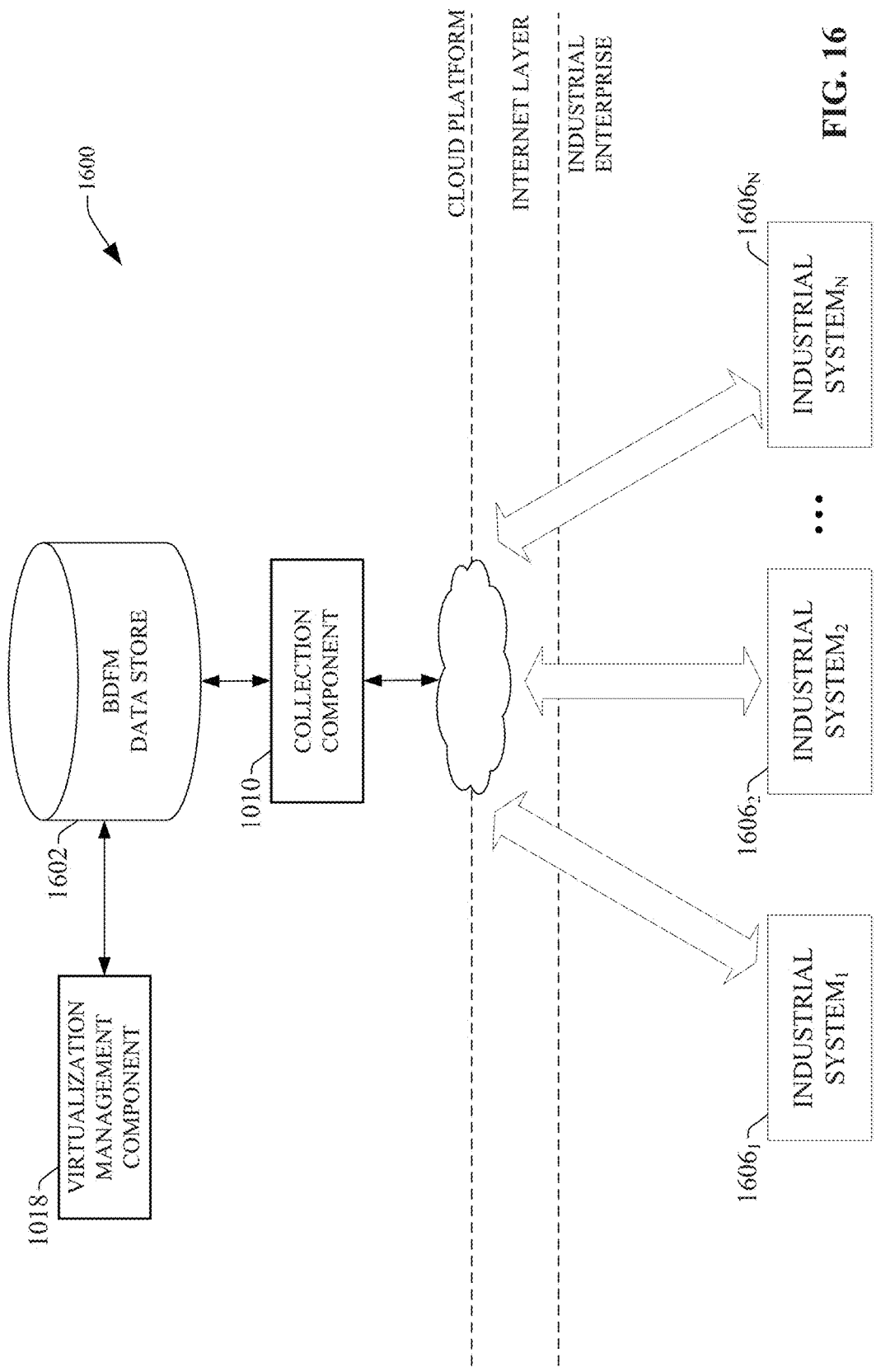
FIG. 16 presents a block diagram of an example system that can facilitate collection of data from devices and assets associated with respective industrial automation systems for storage in cloud-based data storage, in accordance with various aspects and implementations of the disclosed subject matter.

In addition to maintaining individual customer-specific data stores for each industrial enterprise, the virtualization system (e.g., cloud-based virtualization system) also can feed (e.g., transmit) sets of customer data to a global data storage (referred to herein as cloud-based data store or Big Data for Manufacturing (BDFM) data store) for collective big data analysis in the cloud platform (e.g., by the virtualization system). FIG. 16 presents a block diagram of an example system 1600 that can facilitate collection of data from devices and assets associated with respective industrial automation systems for storage in cloud-based data storage, in accordance with various aspects and implementations of the disclosed subject matter. As illustrated in FIG. 16, the collection component 1010 of the virtualization system (e.g., as facilitated by the interface component 1012) can collect data from devices and assets comprising respective different industrial automation systems, such as industrial automation system₁ 1606ₖ, industrial automation system₂ 1606₂, and/or (up through) industrial automation system$_N$ 1606$_N$, for storage in a cloud-based BDFM data store 1602. In some embodiments, data maintained in the BDFM data store 1602 can be collected anonymously with the consent of the respective customers. For example, customers can enter into a service agreement with a technical support entity whereby the customer can agree to have their device and asset data collected by the virtualization system in exchange for virtualization-related services or a credit towards virtualization-related services. The data maintained in the BDFM data store 1602 can include all or portions of the classified customer-specific data described in connection with FIG. 11, as well as additional data (e.g., derived, determined, or inferred data). The virtualization component 1000 (e.g., aggregator component 1004, virtualization management component 1018, etc.) or another component of the virtualization system can organize the collected data stored in the BDFM data store 1602 according to device type, system type, application type, applicable industry, or other relevant categories. The virtualization management component 1018 can analyze data stored in the resulting multi-industry, multi-customer data store (e.g., BDFM data store 1602) to facilitate learning, determining, or identifying industry-specific, device-specific, and/or application-specific trends, patterns, thresholds (e.g., device-related thresholds, network-related thresholds, etc.), industrial-automation-system interrelationships between devices or assets, etc., associated with the industrial automation systems associated with the cloud platform. In general, the virtualization management component 1018 can perform a data analysis (e.g., big data analysis) on data (e.g., the multi-industrial enterprise data) maintained (e.g., stored in) the BDFM data store 1602 to facilitate learning, determining, identifying, characterizing, virtualizing, simulating, and/or emulating operational industrial-automation-system interrelationships, thresholds, trends, or patterns associated with industrial automation systems as a function of industry type, application type, equipment in use, asset configurations, device configuration settings, or other types of variables.

For example, it can be known that a given industrial asset (e.g., a device, a configuration of device, a machine, etc.) can be used across different industries for different types of industrial applications. Accordingly, the virtualization management component 1018 can identify a subset of the global data stored in BDFM data store 1602 relating to the asset or asset type, and perform analysis on this subset of data to determine how the asset or asset type performs over time and under various types of operating conditions for each of multiple different industries or types of industrial applications. The virtualization management component 1018 also can determine the operational behavior of the asset or asset type over time and under various types of operating conditions for each of different sets of operating constraints or parameters (e.g. different ranges of operating temperatures or pressures, different recipe ingredients or ingredient types, etc.). The virtualization management component 1018 can leverage (e.g., use) a large amount of historical data relating to the asset or asset type that has been gathered (e.g., collected and/or aggregated) from many different industrial automation systems to facilitate learning or determining common operating characteristics of many diverse configurations of industrial assets or asset types at a relatively high degree of granularity and under many different operating contexts. The virtualization management component 1018 can use the learned or determined operating characteristics relating to the industrial assets or asset types to facilitate generating, updating, and/or using virtualized versions of the industrial assets or asset types when employed in an industrial automation system to facilitate generating, updating, and/or using a virtualized industrial automation system that can be based at least in part on the virtualized versions of the industrial assets or asset types.

Figure 17:
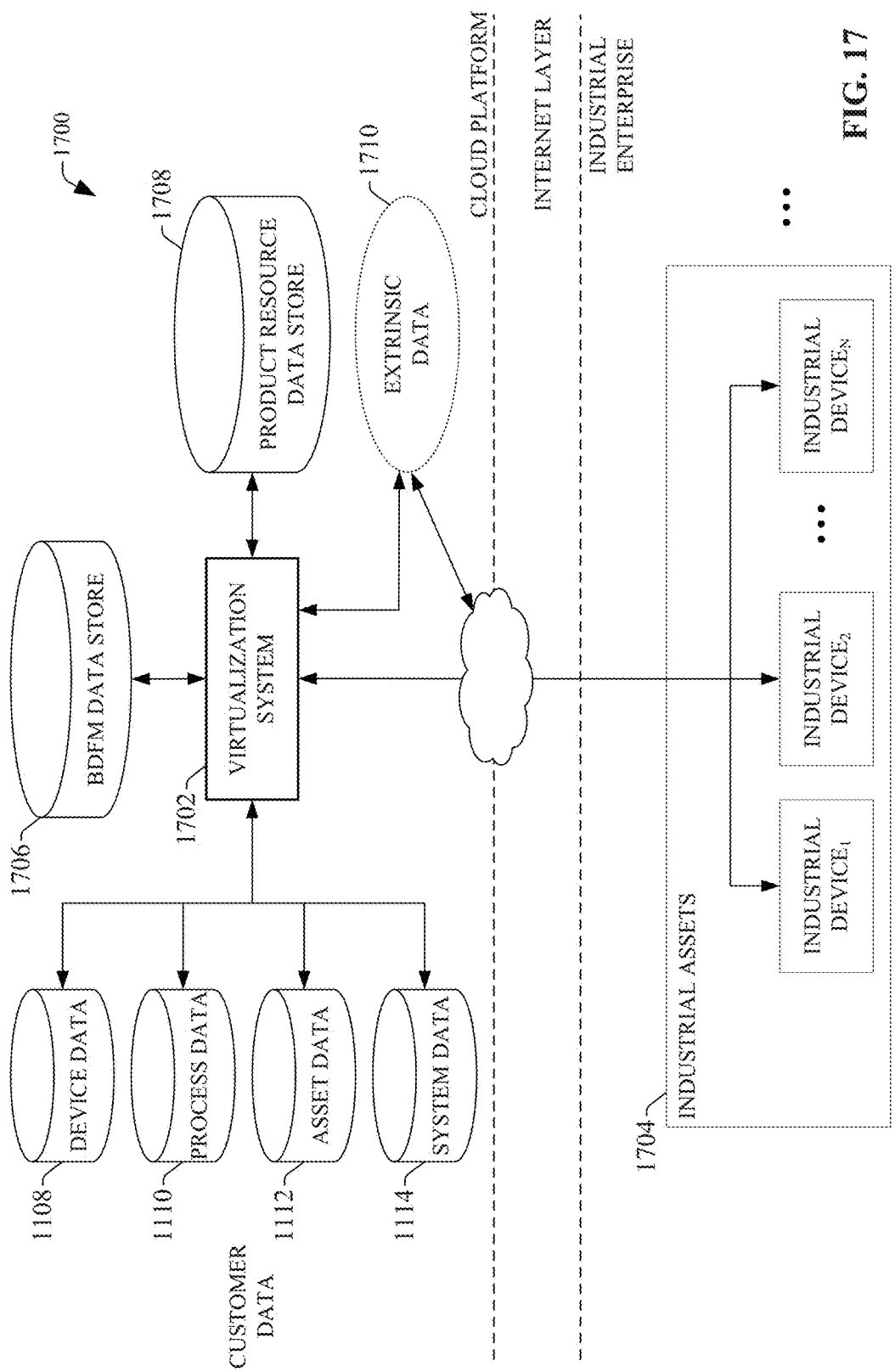
FIG. 17 illustrates a block diagram of a cloud-based system that can employ a virtualization system to facilitate performing or providing virtualization-related services associated with industrial automation systems, in accordance with various aspects and embodiments of the disclosed subject matter.

FIG. 17 illustrates a block diagram of a cloud-based system 1700 that can employ a virtualization system to facilitate performing or providing virtualization-related services associated with industrial automation systems, in accordance with various aspects and embodiments of the disclosed subject matter. As disclosed herein, the virtualization system 1702 can collect, maintain, and monitor customer-specific data (e.g. device data 1108, process data 1110, asset data 1112, and system data 1114) relating to one or more industrial assets 1704 of an industrial enterprise. In addition, the virtualization system 1702 can collect and organize industrial data anonymously (with customer consent) from multiple industrial enterprises, and can store such industrial data in a BDFM data store 1706 for collective analysis by the virtualization system 1702, for example, as described herein.

The virtualization system 1702 also can collect product resource information and maintain (e.g., store) the product resource information in the cloud-based product resource data store 1708. In general, the product resource data store 1708 can maintain up-to-date information relating to specific industrial devices or other vendor products in connection with industrial automation systems. Product data stored in the product resource data store 1708 can be administered by the virtualization system 1702 and/or one or more product vendors or OEMs. Exemplary device-specific data maintained by the product resource data store 1708 can include product serial numbers, most recent firmware revisions, preferred device configuration settings and/or software for a given type of industrial application, or other such vendor-provided information.

The system depicted in FIG. 17 can provide virtualization-related services to subscribing customers (e.g., owners of industrial assets 1704). For example, customers can enter an agreement with a product vendor or technical support entity to allow their system data to be gathered anonymously and fed into (e.g., communicated to and stored in) the BDFM data store 1706, and this thereby can expand the store of global data available for collective analysis by the virtualization system 1702. In exchange, the vendor or technical support entity can agree to provide virtualization-related services (e.g., customized virtualization-related services) to the customer (e.g., real-time or near real-time system monitoring; real-time or near real-time generation, updating, and/or use of a virtualized industrial automation system associated with an industrial automation system, etc.). Alternatively, the customer can subscribe to one or more available virtualization-related services that can be provided by the virtualization system 1702, and optionally can allow their system data to be maintained in the BDFM data store 1706. In some embodiments, a customer can be given an option to subscribe to virtualization-related services without permitting their data to be stored in the BDFM data store 1706 for collective analysis with data from other systems (e.g., industrial automation systems). In such cases, the customer's data will only be maintained as customer data (e.g., in customer data store 1106) for the purposes of real-time or near real-time generation, updating, and/or use of a virtualized industrial automation system associated with an industrial automation system relating to that particular customer, and the collected customer data will be analyzed in connection with data stored in the BDFM data store 1706 and the product resource data store 1708 without that customer data being migrated for storage in the BDFM data store 1706 for long-term storage and analysis. In another exemplary agreement, customers can be offered a discount on virtualization-related services in exchange for allowing their system data to be anonymously migrated to the BDFM data store 1706 for collective analysis by the virtualization system 1702.

In accordance with various aspects, the customer-specific data can include device and/or asset level faults and alarms, process variable values (e.g., temperatures, pressures, product counts, cycle times, etc.), calculated or anticipated key performance indicators for the customer's various assets, indicators of system behavior over time, and other such information. The customer-specific data also can include documentation of firmware versions, configuration settings, and software in use on respective devices of the customer's industrial assets. Moreover, the virtualization system 1702 can take into consideration customer information encoded in customer model 1116, which can have a bearing on inferences made by the virtualization system 1702 based at least in part on the analysis (e.g., big data analysis) stored in the BDFM data store 1706. For example, customer model 1116 may indicate a type of industry that is the focus of the customer's business (e.g., automotive, food and drug, oil and gas, fibers and textiles, power generation, marine, etc.). Knowledge of the customer's industry can facilitate enabling the virtualization system 1702 to correlate the customer-specific data with data relating to similar systems and applications in the same industry, as documented by the data stored in the BDFM data store 1706.

Taken together, customer-specific data and a customer model (e.g., 1116) can facilitate accurately modeling the customer's industrial enterprise at a highly granular level, from high-level system behavior over time down to the device and software level. The analyzing (e.g., by the virtualization system 1702) of this customer-specific data in view of global industry-specific and application-specific trends learned via analysis of data stored in the BDFM data store 1706, as well as vendor-provided device information maintained in the product resource data store 1708, can facilitate real-time or near real-time generation, updating, and/or use of a virtualized industrial automation system associated with an industrial automation system to facilitate real-time or near real-time remote interaction with (e.g., monitoring, tracking, controlling, etc., of) the industrial automation system using the virtualized industrial automation system (e.g., based at least in part on user interactions of the virtualized industrial automation system by a user via a communication device).

In some implementations, the system 1700 (e.g., via the collection component or virtualization system 1702) also can receive, collect, or capture extrinsic data 1710 from one or more sources (e.g., external data sources). The virtualization system 1702 can use or leverage the extrinsic data 1710 received, collected, or captured from sources external to a customer's industrial enterprise, wherein the extrinsic data 1710 can have relevance to operation of the customer's industrial automation system(s). Example extrinsic data 1710 can include, for example, energy cost data, material cost and availability data, transportation schedule information from companies that provide product transportation services for the customer, market indicator data, web site traffic statistics, information relating to known information security breaches or threats, or other information relevant to the operation of the customer's industrial automation system(s). The virtualization system 1702 can retrieve extrinsic data 1710 from substantially any data source, such as, e.g., servers or other data storage devices linked to the Internet, cloud-based storage that maintains extrinsic data of interest, or other sources. The virtualization system 1702 can analyze the extrinsic data 1710 and/or other data (e.g., user-related data associated with users (e.g., operators, managers, technicians, other workers) associated with the industrial automation system(s), device data 1108, process data 1110, asset data 1112, system data 1114, etc.) to facilitate performing virtualization-related or other services in connection with the industrial automation system(s).

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 18-24 illustrate various methods in accordance with one or more embodiments of the subject application. While, for purposes of simplicity of explanation, the one or more methods shown herein are shown and described as a series of acts, it is to be understood and appreciated that the disclosed subject matter is not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Furthermore, interaction diagram(s) may represent methods, in accordance with the subject disclosure when disparate entities enact disparate portions of the methods. Further yet, two or more of the disclosed example methods can be implemented in combination with each other, to accomplish one or more features or advantages described herein.

Figure 18:
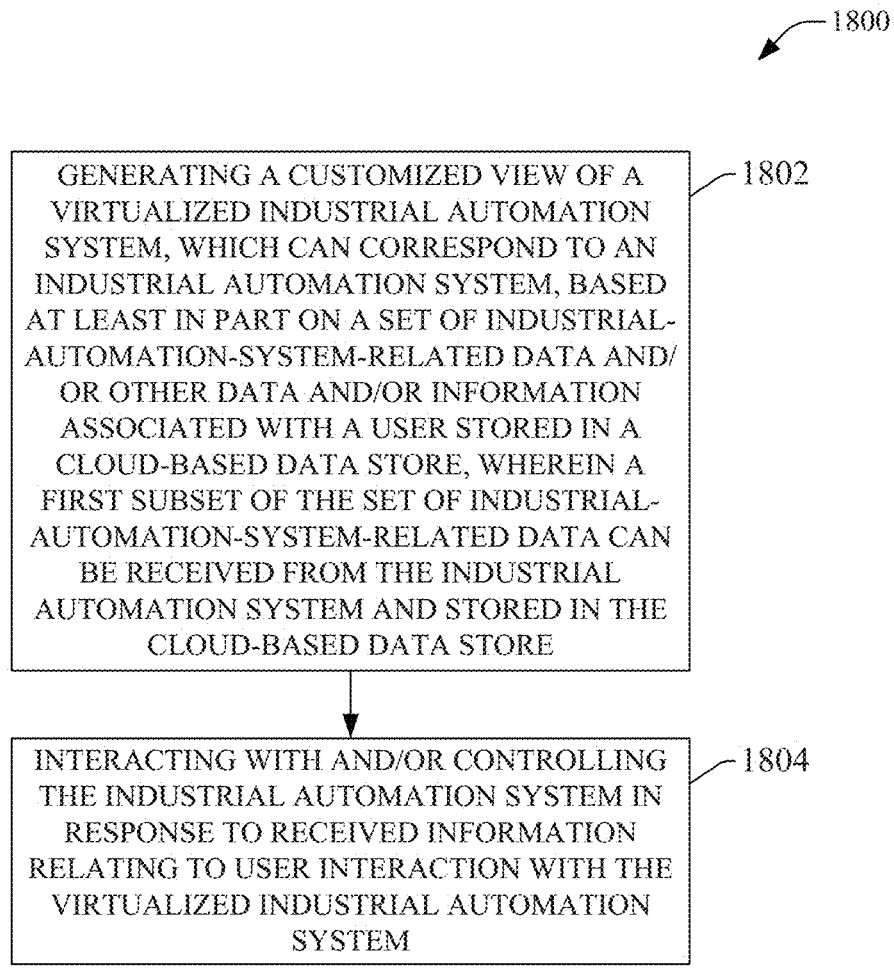
FIG. 18 illustrates a flow diagram of an example method that can facilitate generating and managing a customized views of a virtualized industrial automation system that can correspond to an industrial automation system associated with an industrial enterprise based at least in part on cloud-based data relating to the industrial enterprise, in accordance with various implementations and embodiments of the disclosed subject matter.

FIG. 18 illustrates a flow diagram of an example method 1800 that can facilitate generating and managing a customized views of a virtualized industrial automation system that can correspond to an industrial automation system associated with an industrial enterprise based at least in part on cloud-based data relating to the industrial enterprise, in accordance with various implementations and embodiments of the disclosed subject matter. The method 1800 can be implemented by a virtualization system that can comprise a virtualization component that can comprise a collection component, a data store, and/or a virtualization management component, etc. All or a desired portion of the virtualization component can reside in a cloud platform.

At 1802, a customized view of a virtualized industrial automation system, which can correspond to an industrial automation system, can be generated based at least in part on a set of industrial-automation-system-related data and/or other data stored in a cloud-based data store and information associated with a user in connection with the industrial automation system, wherein a first subset of the set of industrial-automation-system-related data can be received (e.g., collected, obtained, detected, etc.) from the industrial automation system and stored in the cloud-based data store. The set of industrial-automation-system-related data can comprise, for example, device-related data (e.g., industrial device-related data, network device-related data), asset-related data, process-related data (e.g., industrial-automation-process-related data), data relating to users associated with the industrial automation system (e.g., role information, user preferences, etc.), and/or other industrial-automation-system-related data associated with an industrial enterprise. The industrial-automation-system-related data can be migrated (e.g., communicated) to the cloud platform using one or more cloud gateways (e.g., communication gateway components) that can serve as uni-directional or bi-directional communication interfaces between industrial devices of the industrial automation system and the cloud platform. The device-related data, asset-related data, process-related data, and/or other industrial-automation-system-related data can be stored in the cloud-based data store in association with identification information, such as, for example, a customer identifier and other customer-specific information.

The collection component can facilitate collecting or obtaining the industrial-automation-system-related data, and can store the industrial-automation-system-related data in the cloud-based data store. The virtualization management component can access the cloud-based data store and can receive (e.g., collect, obtain, etc.) the set of industrial-automation-system-related data from the cloud-based data store. The virtualization management component can analyze the set of industrial-automation-system-related data to generate analysis results. The virtualization management component can generate, manage, modify, and/or update the customized view of the virtualized industrial automation system associated with the industrial automation system based at least in part on the results of the analysis of the set of industrial-automation-system-related data. For example, using the analysis results, the virtualization management component can facilitate generating, managing, modifying, and/or updating the customized view of the virtualized industrial automation system, based at least in part on virtualization of industrial devices, software and/or firmware configurations (including software or firmware revisions or updates) associated with industrial devices and/or other components of the industrial automation system, network-related devices (e.g., communication devices, computers, routers, etc.) associated with the industrial automation system, functional and communicative relationships between industrial devices, industrial processes, network-related devices, etc. (e.g., communication connections or conditions between industrial devices, types of connections between industrial devices, communication connections between industrial devices and network-related devices, etc.), mechanical or process properties or characteristics associated with industrial devices (e.g., mechanical latency, process cycle times, operating schedules, etc., associated with industrial devices), user behavior or interaction in connection with the industrial automation system (e.g., maintenance schedules, shift-specific or operator-specific behavior or interaction of operators with the industrial automation system), user behavior or interaction in connection with the virtualized industrial automation system (e.g., via a communication device of a user), production or process flows of the industrial automation system at particular times or in connection with particular projects, and/or other aspects or features of the industrial automation system.

To facilitate customizing the view of the virtualized industrial automation system for a user, the virtualization management component can analyze the information associated with the user, and can determine the role of the user with respect to the industrial automation system, preferences of the user with regard to customization of the user's view of the virtualized industrial automation system, and/or other customization factors (e.g., whether or what type of a data filter was selected, the viewability scope associated with data, etc.) associated with the user, based at least in part on the results of the data analysis. The virtualization management component can generate, manage, modify, and/or update the customized view of the virtualized industrial automation system associated with the industrial automation system based at least in part on the role of the user in connection with the industrial automation system.

At 1804, the industrial automation system can be interacted with and/or controlled in response to received information relating to user interaction with the customized view of the virtualized industrial automation system. Using a communication device (e.g., computer, smart phone, electronic pad or tablet, electronic glasses, etc.), a user can perceive (e.g., look at) the customized view of the virtualized industrial automation system. The user, using the communication device, can interact (e.g., monitor or track operation of, adjust a control, modify a parameter, perform another type of work task, etc.) with the virtualized industrial automation system, or portion thereof (e.g., customized portion), displayed on the display screen of the communication device. The virtualization management component can receive information relating to the interaction of the user with the customized view of the virtualized industrial automation system from the communication device in connection with the user desiring to facilitate interacting with or controlling the operation of the industrial automation system associated with the customized view of the virtualized industrial automation system. In some implementations, in response to the interaction-related information received from the communication device in connection with controlling the industrial automation system, the virtualization management component can generate one or more control signals that can correspond to the controlling of the industrial automation system that the user desired based at least in part on the information relating to the interaction of the user with the customized view of the virtualized industrial automation system.

The industrial automation system can receive the one or more control signals from the virtualization management component. In response to the one or more control signals, operation of the industrial automation system can be controlled in accordance with the information relating to the interaction of the user with the customized view of the virtualized industrial automation system, and in accordance with the defined virtualization management criteria. The virtualization component can monitor the operational response of the industrial automation system to the one or more control signals. The collection component can receive or collect data relating to the operational response of the industrial automation system to the one or more control signals. The virtualization management component also can facilitate updating the virtualized industrial automation system, or portion (e.g., customized portion) thereof, to control the virtual operation of the virtualized industrial automation system, in response to the interaction of the user with the customized view of the virtualized industrial automation system and in response to the operational response of the industrial automation system to the one or more control signals.

Figure 19:
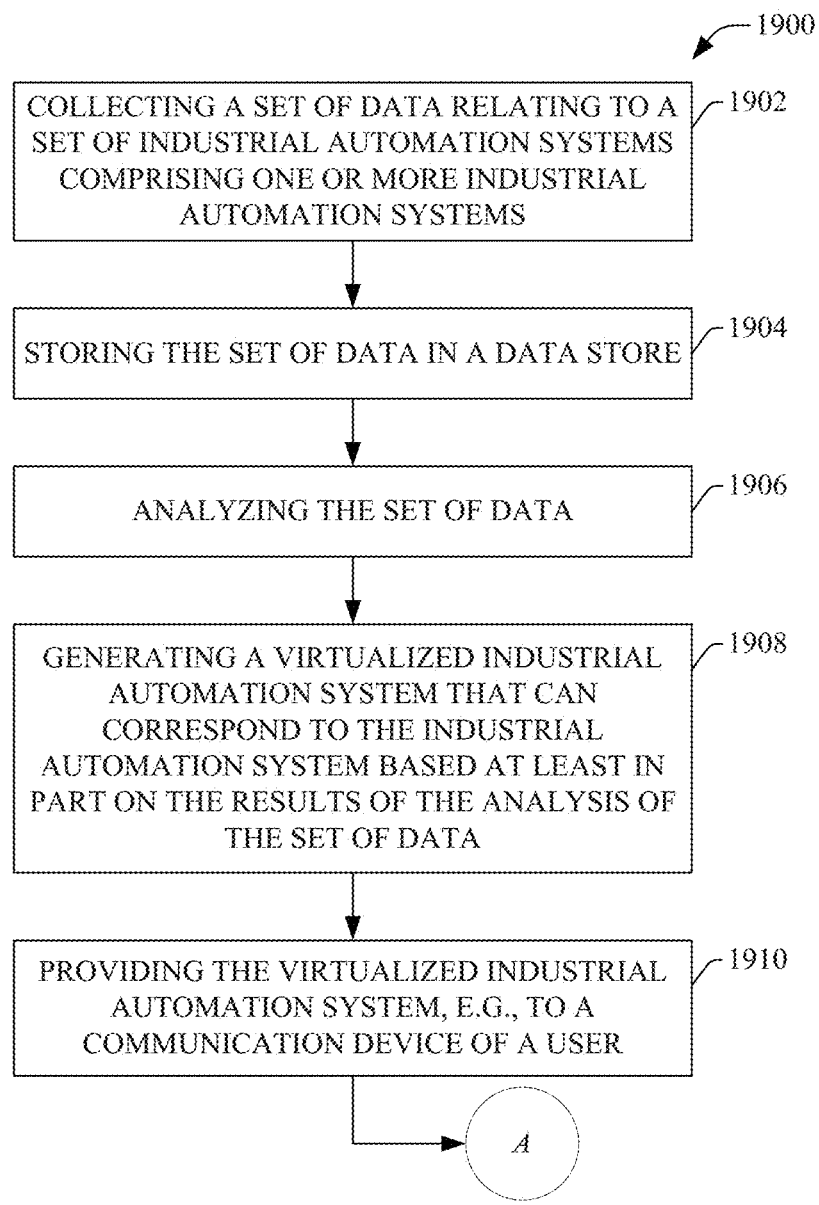
FIG. 19 depicts a flow diagram of an example method that can facilitate generating and managing a virtualized industrial automation system that can correspond to an industrial automation system associated with an industrial enterprise based at least in part on cloud-based data relating to the industrial enterprise, in accordance with various implementations and embodiments of the disclosed subject matter.

FIG. 19 depicts a flow diagram of another example method 1900 that can facilitate generating and managing a virtualized industrial automation system that can correspond to an industrial automation system associated with an industrial enterprise based at least in part on cloud-based data relating to the industrial enterprise, in accordance with various implementations and embodiments of the disclosed subject matter. The method 1900 can be implemented by a virtualization system that can comprise a virtualization component that can comprise a collection component, a data store, and/or a virtualization management component, etc. All or a desired portion of the virtualization component can reside in a cloud platform.

At 1902, a set of data relating to a set of industrial automation systems comprising one or more industrial automation systems can be collected. The virtualization system can comprise a collection component that can collect the set of data relating to the set of industrial automation systems. The set of data can comprise data relating to industrial devices, industrial processes, other industrial assets, and/or network-related devices, etc., associated with the one or more industrial automation systems of the set of industrial automation systems. The set of industrial automation systems can be associated with one or more industrial enterprises.

In some implementations, all or part of the virtualization system can be located in a cloud platform. For example, virtualization component, the collection component, the data store (e.g., cloud-based data store), the virtualization management component, and/or another component(s) of the virtualization system can be located in the cloud platform. In other implementations, certain components (e.g., virtualization management component or collection component) can be located outside of the cloud platform and can access the cloud platform (e.g., the data store in the cloud platform) to facilitate analyzing the data in the data store to facilitate generating, managing, and/or updating a virtualized industrial automation system that can correspond to, and interface or interact with, an industrial automation system of the set of industrial automation systems.

At 1904, the set of data can be stored in a data store. The collection component can facilitate storing the set of data in the data store, wherein the data store can be a cloud-based data store located in the cloud platform.

At 1906, the set of data can be analyzed. The virtualization management component can access the cloud-based data store and can retrieve, obtain, read the set of data from the cloud-based data store. The virtualization management component can analyze the set of data (e.g., perform big data analysis on the set of data) to facilitate generating, managing, and/or updating a virtualized industrial automation system that can correspond to, and interface or interact with, an industrial automation system. The virtualization management component can analyze the set of data to facilitate identifying or determining industrial devices, industrial processes, operating systems, software (e.g., software type, software version, software functions, software manufacturer, etc.), firmware (e.g., firmware type, firmware version, firmware functions, firmware manufacturer, etc.), network-related devices, etc., associated with the industrial automation system; identifying or determining configuration of the industrial devices, industrial processes, operating systems, software, firmware, and network-related devices, including the functional relationships or connections between respective industrial devices, industrial processes, operating systems, software, firmware, and network-related devices; respective properties or characteristics associated with the respective industrial devices, industrial processes, operating systems, software, firmware, and network-related devices; etc.

At 1908, a virtualized industrial automation system that can correspond to (e.g., be a virtual replication of) the industrial automation system, comprising the industrial devices, industrial processes, operating systems, software, firmware, network-related devices, etc., can be generated based at least in part on the results of the analysis of the set of data. The virtualization management component can generate the virtualized industrial automation system associated with the industrial automation system, including generating virtualized industrial devices, virtualized software and/or firmware configurations (including virtualized software or firmware revisions or updates) associated with the industrial devices and/or other components of the industrial automation system, virtualized network-related devices (e.g., virtualized communication devices, computers, routers, etc.) associated with the industrial automation system, virtualized functional and communicative relationships between industrial devices, industrial processes, network-related devices, etc. (e.g., virtualized communication connections or conditions between industrial devices, types of connections between industrial devices, virtualized communication connections between industrial devices and network-related devices, etc.), virtualized mechanical or process properties or characteristics associated with industrial devices (e.g., virtualized mechanical latency, process cycle times, operating schedules, etc., associated with industrial devices), virtualized properties or characteristics associated with the network-related devices (e.g., virtualized communication conditions, virtualized total bandwidth, virtualized available bandwidth, virtualized wireless communications, virtualized wireline communications, etc., associated with the network-related devices), and/or other aspects or features of the industrial automation system.

At 1910, the virtualized industrial automation system can be provided (e.g., communicated, presented), for example, to a communication device of a user. The virtualization management component can provide the virtualized industrial automation system to the communication device of the user via a communication network (e.g., a communication network comprising an IP-based network (e.g., Internet, intranet), a mobile core network, and/or a local area network (LAN)). The user can use the communication device to access the virtualized industrial automation system to facilitate remotely controlling the associated industrial automation system, as more fully disclosed herein.

At this point, the method 1900 can proceed to reference point A, wherein, for example, from reference point A, as disclosed with regard to method 2000, the generated virtualized industrial automation system can be used to facilitate controlling operation of the industrial automation system, and/or as disclosed with regard to method 2100, the generated virtualized industrial automation system can be customized to provide a user a customized view of, and/or customized overlay of data associated with, the virtualized industrial automation system via the user's communication device.

Information relating to the virtualized industrial automation system can be stored in the cloud-based data store or another desired data store, wherein the virtualization management component can access data relating to the virtualized industrial automation system from the cloud-based data store or other data store, and can use the data relating to the virtualized industrial automation system to facilitate updating the virtualized industrial automation system, controlling operation of the industrial automation system associated with the virtualized industrial automation system, customizing a view of the virtualized industrial automation system for a user, and/or performing other operations on the virtualized industrial automation system or associated industrial automation system, as more fully disclosed herein.

Figure 20:
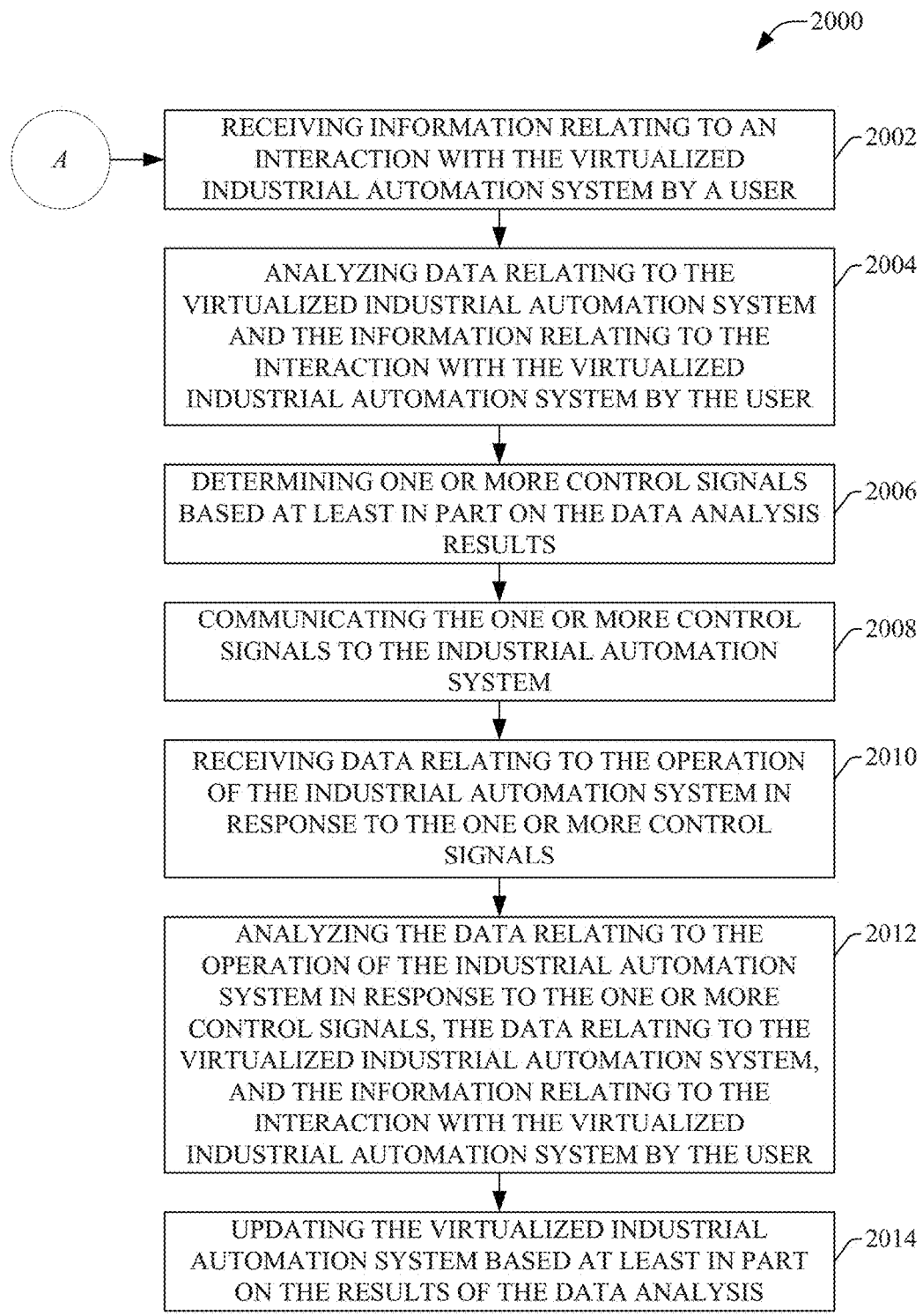
FIG. 20 presents a flow diagram of an example method that can employ a virtualized industrial automation system to facilitate controlling an industrial automation system, in accordance with various implementations and embodiments of the disclosed subject matter.

FIG. 20 presents a flow diagram of an example method 2000 that can employ a virtualized industrial automation system to facilitate controlling an industrial automation system, in accordance with various implementations and embodiments of the disclosed subject matter. The method 2000 can proceed, for example, from reference point A of the method 1900. The method 2000 can be implemented by a virtualization system that can comprise a virtualization component that can comprise a collection component, a data store, and/or a virtualization management component, etc. All or a desired portion of the virtualization component can reside in a cloud platform.

At 2002, information relating to an interaction with the virtualized industrial automation system by a user can be received. The user can use the user's communication device to interact with (e.g., monitor operation of, track operation of, adjust a control of, modify a system parameter of, and/or perform another work task in connection with, etc.) the virtualized industrial automation system, or portion thereof (e.g., a customized view or version of), to facilitate interaction with and/or controlling operation of the industrial automation system associated with (e.g., interfaced with or communicatively connected to) the virtualized industrial automation system. The communication device can communicate the information relating to the interaction with the virtualized industrial automation system by the user to the virtualization management component via a communication network (e.g., a communication network comprising an IP-based network (e.g., Internet, intranet), a mobile core network, and/or a LAN). The virtualization management component can receive the information relating to the interaction with the virtualized industrial automation system by the user.

At 2004, data relating to the virtualized industrial automation system and the information relating to the interaction with the virtualized industrial automation system by the user can be analyzed. The virtualization management component can analyze the data relating to the virtualized industrial automation system and the information relating to the interaction with the virtualized industrial automation system, or portion thereof (e.g., the customized view or version of), by the user to facilitate interacting with and/or controlling the virtual operation of the virtualized industrial automation system and determining the interaction with the industrial automation system that is desired or initiated by the user to facilitate controlling the operation of the industrial automation system, in accordance with the interaction of the user with the virtualized industrial automation system.

At 2006, one or more control signals can be determined based at least in part on the data analysis results at 2004. The virtualization management component can determine one or more control signals that can be used to facilitate interacting with and/or controlling the operation of the industrial automation system, in accordance with the interaction with the virtualized industrial automation system, or portion thereof (e.g., the customized view or version of), by the user, based at least in part on the data analysis results at 2004.

At 2008, the one or more control signals can be communicated to the industrial automation system. The virtualization management component can communicate the one or more control signals to the industrial automation system via the communication network to facilitate interacting with and/or controlling the operation of the industrial automation system, in accordance with the interaction with the virtualized industrial automation system, or portion thereof (e.g., the customized view or version of), by the user. For example, the industrial automation system can receive the one or more control signals. In response to the one or more control signals, the operation of the industrial automation system can be controlled, in accordance with the interaction with the virtualized industrial automation system by the user.

At 2010, data relating to the operation of the industrial automation system in response to the one or more control signals can be received. The collection component can receive or collect the data relating to the operation (e.g., the change in operation) of the industrial automation system in response to the one or more control signals.

At 2012, the data relating to the operation of the industrial automation system in response to the one or more control signals, the data relating to the virtualized industrial automation system, and the information relating to the interaction with the virtualized industrial automation system by the user can be analyzed. The virtualization management component can analyze the data relating to the operation of the industrial automation system in response to the one or more control signals, the data relating to the virtualized industrial automation system, and the information relating to the interaction with the virtualized industrial automation system by the user to facilitate updating the virtualized industrial automation system (or updating the customized view of, and/or customized data overlay associated with, the virtualized industrial automation system).

At 2014, the virtualized industrial automation system (and/or customized view of, and/or customized data overlay associated with, the virtualized industrial automation system) can be updated based at least in part on the results of the data analysis at 2012. The virtualization management component can control the virtual operation of the virtualized industrial automation system based at least in part on the data analysis results obtained at 2012. For instance, in response to the information relating to the interaction with the virtualized industrial automation system by the user and in response to the operational response of the industrial automation system to the one or more control signals, the virtualization management component can update the virtualized industrial automation system (and/or the customized view of, and/or customized data overlay associated with, the virtualized industrial automation system), which can facilitate interacting with, and/or controlling the virtual operation of, the virtualized industrial automation system.

Figure 21:
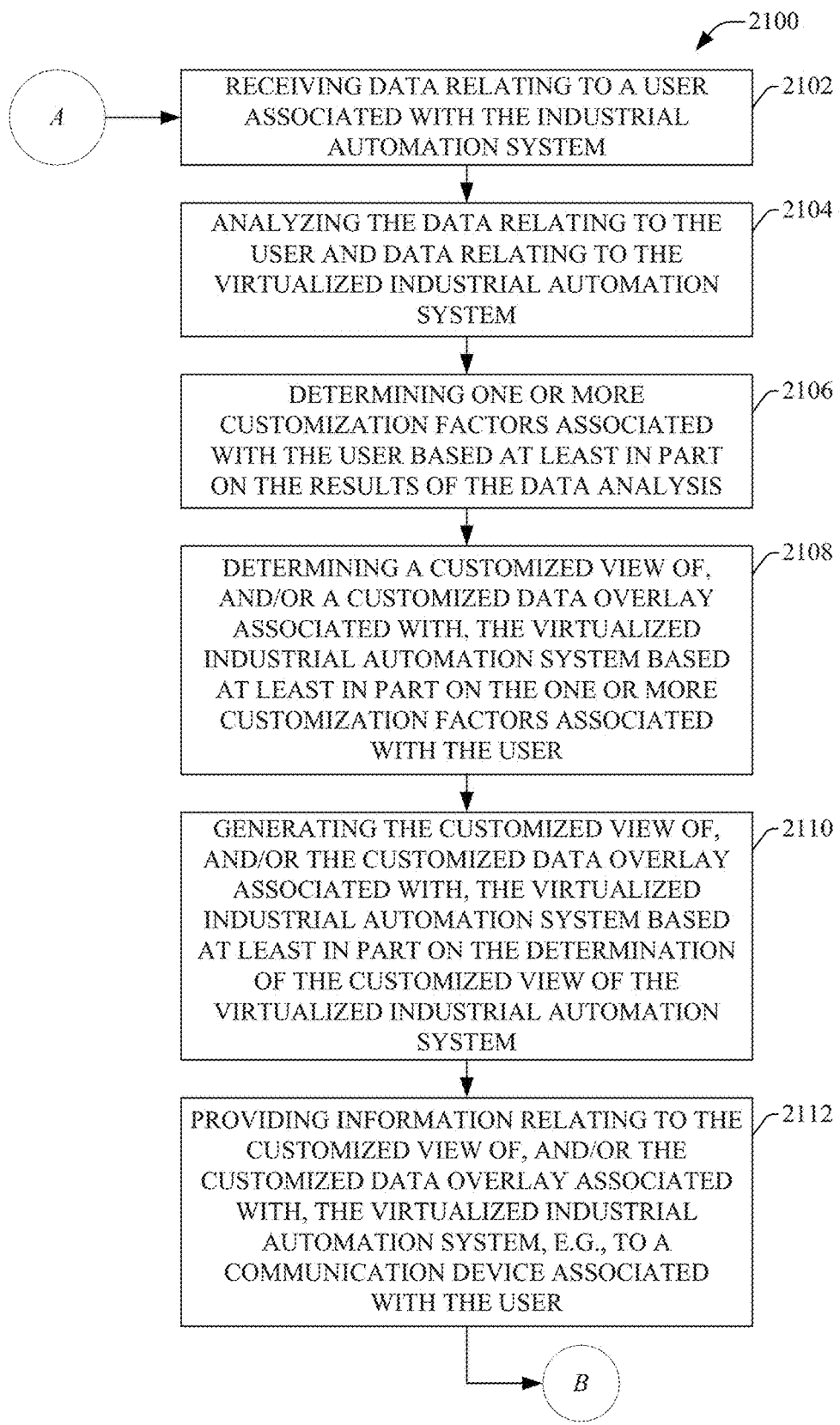
FIG. 21 presents a flow diagram of an example method that can filter a subset of operational data associated with a customized view of, and/or a customized data overlay associated with, a virtualized industrial automation system associated with an industrial automation system, in accordance with various implementations and embodiments of the disclosed subject matter.

FIG. 21 depicts a flow diagram of an example method 2100 that can customize a view of, and/or customize an overlay of data associated with, a virtualized industrial automation system associated with an industrial automation system, in accordance with various implementations and embodiments of the disclosed subject matter. The method 2100 can proceed, for example, from reference point A of the method 1900. The method 2100 can be implemented by a virtualization system that can comprise a virtualization component that can comprise a collection component, a data store, and/or a virtualization management component, etc. All or a desired portion of the virtualization component can reside in a cloud platform.

At 2102, data relating to a user associated with the industrial automation system can be received. The virtualization component can monitor operations of the industrial automation system and monitor movements, behavior, interactions, etc., of the user with respect to the industrial automation system. The collection component can receive, collect, and/or obtain the data relating to the user, wherein the data relating to the user can comprise data relating to the operations of the industrial automation system and the movements, behavior, interactions, etc., of the user with respect to the industrial automation system and/or other data (e.g., data identifying the user, identifying the role of the user with respect to the industrial automation system, identifying preferences of the user with regard to customizing the view of, and/or customizing the data overlay associated with) the virtualized industrial automation system to be provided to the user, etc.). The data relating to the user can be stored in the data store.

At 2104, the data relating to the user and data relating to the virtualized industrial automation system can be analyzed. The virtualization management component can analyze the data relating to the user and data relating to the virtualized industrial automation system to facilitate determining one or more customization factors that can be employed to facilitate determining how the view of, and/how the data overlay associated with, the virtual industrial automation system is to be customized for the user.

At 2106, one or more customization factors associated with the user can be determined based at least in part on the results of the data analysis of 2104. The virtualization management component can determine the one or more customization factors associated with the user based at least in part on the results of the data analysis of 2104. The one or more customization factors can comprise or relate to, for example, the role of the user in connection with the industrial automation system, the identity of the user, the device identifier associated with the communication device, the RFID tag associated with the user, the set of access rights of the user to access the virtualized industrial automation system or the industrial automation system, authentication information associated with the user, the location of the user in relation to the industrial automation system, the location of the communication device in relation to the industrial automation system, the location of the radio-frequency identification tag associated with the user in relation to the industrial automation system, the preference(s) of the user with regard to customizing the view of, and/or customizing the data overlay associated with, the virtualized industrial automation system, a data filter(s) selected by the user to facilitate filtering the overlay data, and/or the context of a set of data associated with the virtualized industrial automation system or the user.

At 2108, a customized view of, and/or a customized data overlay associated with, the virtualized industrial automation system can be determined based at least in part on the one or more customization factors associated with the user. The virtualization management component can determine a customized view of, and/or a customized data overlay associated with, the virtualized industrial automation system based at least in part on the one or more customization factors associated with the user. For example, the results of the data analysis can indicate that the role of the user in connection with the industrial automation system is a customization factor. The virtualization management component also can identify the role of the user in connection with the industrial automation system. In such instance, the virtualization management component can determine the customized view of the virtualized industrial automation system based at least in part on the role of the user in connection with the industrial automation system. For instance, if the virtualization management component determines that the user has a first role (e.g., operator) in connection with the industrial automation system, the virtualization management component can determine a first customized view of, and/or a first customized data overlay associated with, the virtualized industrial automation system based at least in part on the first role of the user; or, alternatively, if the virtualization management component determines that the user has a second role (e.g., maintenance engineer) in connection with the industrial automation system, the virtualization management component can determine a second customized view of, and/or a second customized data overlay associated with, the virtualized industrial automation system based at least in part on the second role of the user. The first customized view, and/or the first customized data overlay associated with, can facilitate presenting a first portion of the virtualized industrial automation system on a communication device associated with the first user, wherein a first subset of data can be overlaid on the first portion of the virtualized industrial automation system. The second customized view, and/or the second customized data overlay associated with, can facilitate presenting a second portion of the virtualized industrial automation system on a communication device associated with the second user, wherein a second subset of data can be overlaid on the second portion of the virtualized industrial automation system. As part of customizing the view of the virtualized industrial automation system, the virtualization management component also can filter the data (e.g., overlaid data) presented via the virtualized industrial automation system to generate an augmented and/or further customized subset of the data for presenting via (e.g., for overlaying on) the customized view of the virtualized industrial automation system.

At 2110, the customized view of, and/or a customized data overlay associated with, the virtualized industrial automation system can be generated based at least in part on the determination of the customized view of, and/or a customized data overlay associated with, the virtualized industrial automation system. The virtualization management component can generate the customized view of, and/or a customized data overlay associated with, the virtualized industrial automation system in response to determining the customized view of, and/or a customized data overlay associated with, the virtualized industrial automation system.

At 2112, information relating to the customized view of, and/or a customized data overlay associated with, the virtualized industrial automation system can be provided (e.g., communicated, presented), for example, to a communication device associated with the user. The virtualization management component can provide the customized view of, and/or a customized data overlay associated with, the virtualized industrial automation system to the communication device associated with the user, wherein the customized view of, and/or a customized data overlay associated with, the virtualized industrial automation system can be displayed on the display screen of the communication device. Via the communication device, the user can interact with the customized view of, and/or a customized data overlay associated with, the virtualized industrial automation system to facilitate remotely interacting with and/or controlling the virtualized industrial automation system. In some implementations, the virtualization management component and/or the communication device can facilitate providing (e.g., communicating, presenting, sharing) the customized view of, and/or a customized data overlay associated with, the virtualized industrial automation system with one or more other communication devices of one or more other users associated with the industrial automation system, in accordance with the defined virtualization management criteria (e.g., when the criteria indicates that the sharing of the customized view of the virtualized industrial automation system with one or more other communication devices is permitted).

In some implementations, the method 2100 can proceed to reference point B, wherein, for example, from reference point B, as disclosed with regard to method 2100, the subset of data associated with a customized view of, and/or a customized data overlay associated with, the virtualized industrial automation system can be filtered using a desired filter.

Figure 22:
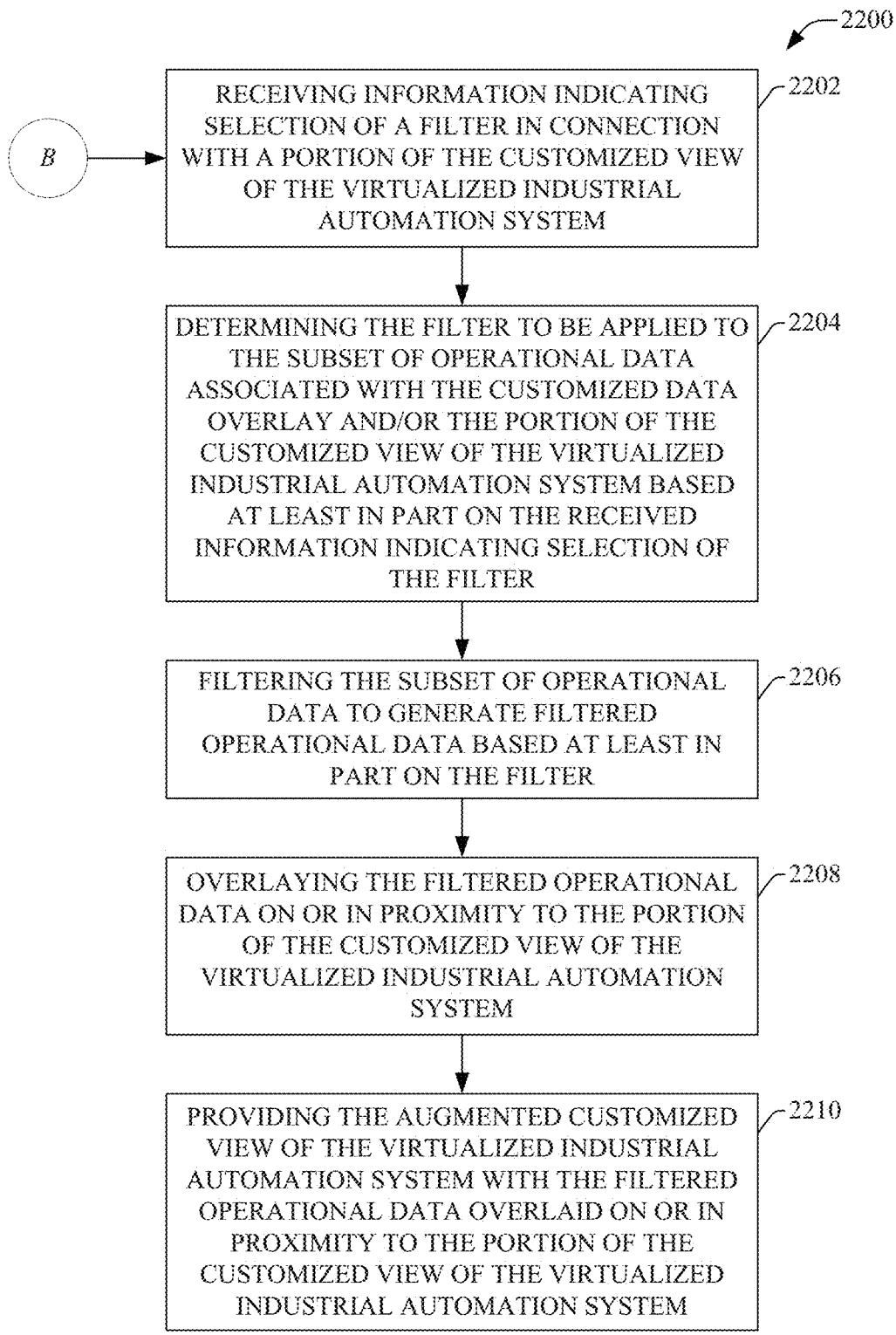
FIG. 22 illustrates a flow diagram of an example method that can filter a subset of operational data associated with a customized view of, and/or a customized data overlay associated with, a virtualized industrial automation system associated with an industrial automation system, in accordance with various implementations and embodiments of the disclosed subject matter.

FIG. 22 illustrates a flow diagram of an example method 2200 that can filter a subset of operational data associated with a customized view of, and/or a customized data overlay associated with, a virtualized industrial automation system associated with an industrial automation system, in accordance with various implementations and embodiments of the disclosed subject matter. The method 2200 can proceed, for example, from reference point B of the method 2100. The method 2200 can be implemented by a virtualization system that can comprise a virtualization component that can comprise a collection component, a data store, and/or a virtualization management component, etc. All or a desired portion of the virtualization component can reside in a cloud platform.

At 2202, information indicating selection of a filter in connection with a portion of the customized view of the virtualized industrial automation system can be received. The user can use the user's communication device to input information (e.g., selection information) that can indicate a filter that the user desires to use to filter a subset of operational data associated with a customized view of, and/or a customized data overlay associated with, a virtualized industrial automation system. The subset of operational data can be part of the customized data overlay and/or can be associated with the portion of the customized view of the virtualized industrial automation system, for example. The virtualization management component can receive the information indicating selection of the filter from the user's communication device, for example, via a communication network.

At 2204, the filter to be applied to the subset of operational data associated with the customized data overlay and/or the portion of the customized view of the virtualized industrial automation system can be determined based at least in part on the received information indicating selection of the filter. The virtualization management component can analyze the received information indicating selection of the filter, and can determine the filter that is to be applied to the subset of operational data based at least in part on the analysis results. The filter can be one of the types of data filters disclosed herein, for example.

At 2206, the subset of operational data can be filtered to generate filtered operational data based at least in part on the filter. The virtualization management component can apply the filter to the subset of operational data to filter the subset of operational data to generate the filtered operational data. Based at least in part on the type of filter, the filtered operational data can comprise a portion of the subset of operational data and/or can comprise other data (e.g., more detailed operational data obtained from applying the filter to a set of operational data)

At 2208, the filtered operational data can be overlaid on or in proximity to the portion of the customized view of the virtualized industrial automation system. The virtualization management component can augment the original portion of the customized view and original data overlay associated with the virtualized industrial automation system to, for example, replace at least a portion of the original data overlay with the filtered operational data, which can be overlaid on or in proximity to the portion of the customized view of the virtualized industrial automation system. For example, the virtualization management component can remove (e.g., filter out) all or a portion of the original data overlay associated with the original portion of the customized view of the virtualized industrial automation system, and can overlay the filtered operational data on or in proximity to the portion of the customized view of the virtualized industrial automation system.

At 2210, the augmented customized view of the virtualized industrial automation system, with the filtered operational data overlaid on or in proximity to the portion of the customized view of the virtualized industrial automation system, can be provided (e.g., for display). The virtualization management component can provide the augmented customized view of the virtualized industrial automation system, which can have the filtered operational data overlaid on or in proximity to the portion of the customized view of the virtualized industrial automation system, to the communication device of the user. The communication device can display the augmented customized view of the virtualized industrial automation system to the user to facilitate providing desired information (e.g., the filtered operational data) to the user. Using the user's communication device (e.g., computer, phone, electronic pad or tablet, electronic glasses (e.g., smart glasses) with communication functionality, etc.), the user can monitor, track, and/or interact with the information relating to the industrial automation system via the augmented customized view of the virtualized industrial automation system to facilitate performing work tasks in connection with the industrial automation system.

Figure 23:
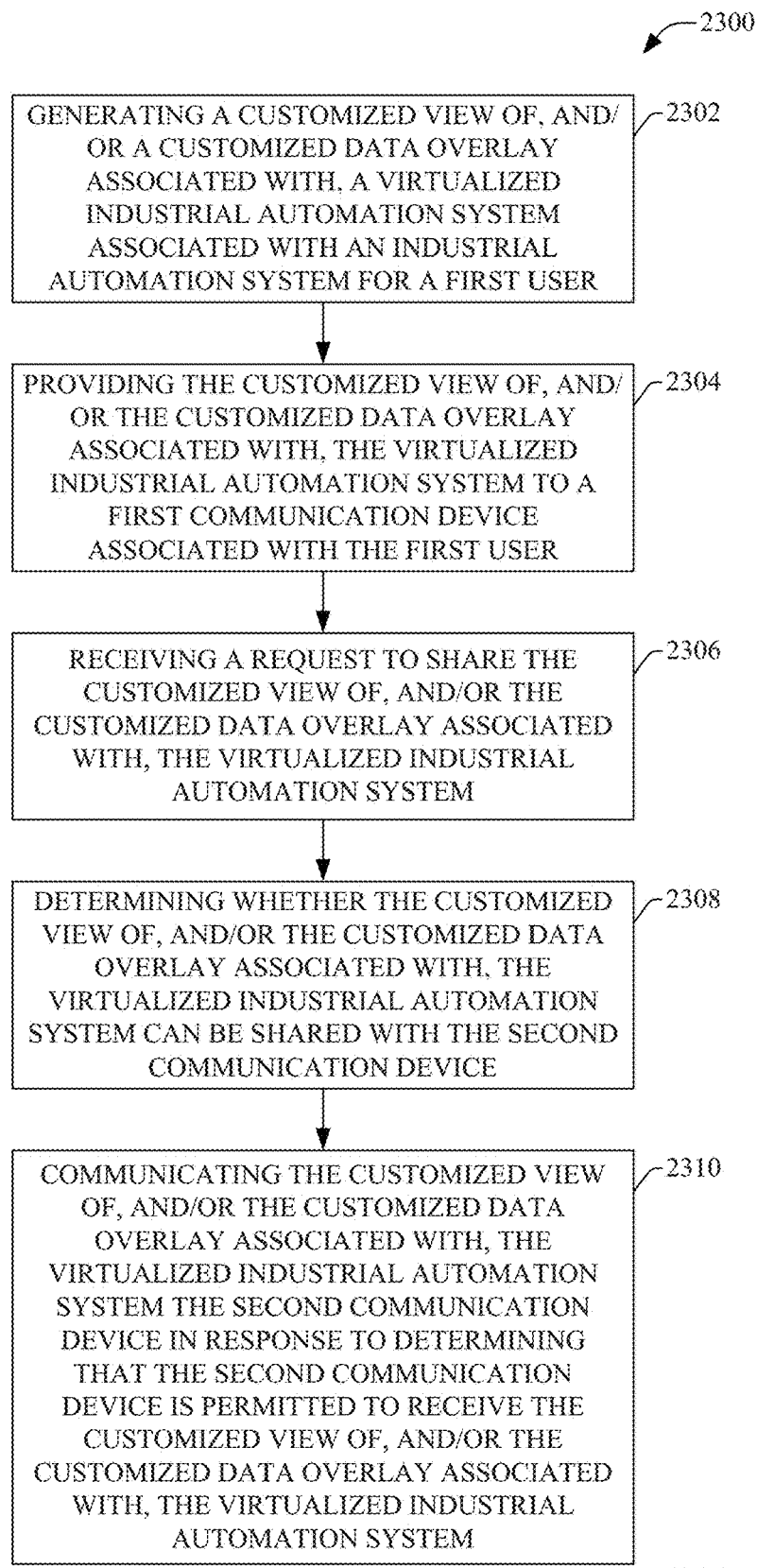
FIG. 23 presents a flow diagram of an example method that can facilitate sharing a customized view of, and/or a customized data overlay associated with, a virtualized industrial automation system associated with an industrial automation system of a first user with a communication device of a second user, in accordance with various implementations and embodiments of the disclosed subject matter.

FIG. 23 presents a flow diagram of an example method 2300 that can facilitate sharing a customized view of, and/or a customized data overlay associated with, a virtualized industrial automation system associated with an industrial automation system of a first user with a communication device of a second user, in accordance with various implementations and embodiments of the disclosed subject matter. The method 2300 can be implemented by a virtualization system that can comprise a virtualization component that can comprise a collection component, a data store, and/or a virtualization management component, etc. All or a desired portion of the virtualization component can reside in a cloud platform.

At 2302, a customized view of, and/or a customized data overlay associated with, a virtualized industrial automation system associated with an industrial automation system for a first user can be generated. In connection with a first user, the virtualization management component can generate the customized view of, and/or the customized data overlay associated with, the virtualized industrial automation system, based at least in part on a set of customization factors associated with the first user and the defined virtualization management criteria, in accordance with the disclosed subject matter.

At 2304, the customized view of, and/or the customized data overlay associated with, the virtualized industrial automation system can be provided (e.g., communicated) to a first communication device associated with the first user. The virtualization management component can communicate the customized view of, and/or the customized data overlay associated with, the virtualized industrial automation system to the first communication device for display on the first communication device for viewing by the first user.

At 2306, a request to share the customized view of, and/or the customized data overlay associated with, the virtualized industrial automation system can be received. For instance, the first user can input information to the first communication device that indicates that the first user requests to share the customized view of, and/or the customized data overlay associated with, the virtualized industrial automation system with a second communication device associated with a second user. The first user can use the first communication device to communicate the request to share to the virtualization management component, which can receive the request to share.

At 2308, a determination can be made regarding whether the customized view of, and/or the customized data overlay associated with, the virtualized industrial automation system can be shared with the second communication device. The virtualization management component can analyze information associated with the request to share, and information associated with the second user, to generate analysis results that can facilitate determining whether whether the customized view of, and/or the customized data overlay associated with, the virtualized industrial automation system can be shared with the second communication device associated with the second user. For instance, the virtualization management component can determine the identity or role of the second user, determine what information associated with the virtualized industrial automation system will be made available to the second user if the request to share is granted, determine access rights of the second user in connection with viewing the customized view of, and/or the customized data overlay associated with, the virtualized industrial automation system, determine the location of the second user or the second communication device with respect to the industrial automation system, etc., based at least in part on the analysis results.

At 2310, the customized view of, and/or the customized data overlay associated with, the virtualized industrial automation system can be communicated to (e.g., shared with) the second communication device in response to determining that the second communication device is permitted to receive the customized view of, and/or the customized data overlay associated with, the virtualized industrial automation system. For example, the virtualization management component can determine that the second user and associated second communication device are permitted to receive the customized view of, and/or the customized data overlay associated with, the virtualized industrial automation system associated with the first user, based at least in part on the data analysis results and the defined virtualized management criteria. For instance, the data analysis results can indicate the second user has a role with respect to the industrial automation system that is associated with a set of access rights with respect to information associated with the industrial automation system that allow the second user to access the customized view of, and/or the customized data overlay associated with, the virtualized industrial automation system. Based at least in part on such data analysis results, the virtualization management component can determine that the second user and associated second communication device are permitted to receive the customized view of, and/or the customized data overlay associated with, the virtualized industrial automation system associated with the first user, in accordance with the defined virtualization management criteria. The virtualization management component can facilitate communicating the customized view of, and/or the customized data overlay associated with, the virtualized industrial automation system to the second communication device for presentation on the display screen of the second communication device to the second user. In this way, the first user can share the customized view of, and/or the customized data overlay associated with, the virtualized industrial automation system with the second user.

If the virtualization management component had determined that the second user or second communication device were not authorized to receive or access the customized view of, and/or the customized data overlay associated with, the virtualized industrial automation system, the virtualization management component can deny the request to share and can deny the second user and second communication device the ability to receive or access the customized view of, and/or the customized data overlay associated with, the virtualized industrial automation system. The virtualization management component also can communicate a denial message to the first communication device and/or second communication device to notify the first user and/or second user that the request to share was denied.

Figure 24:
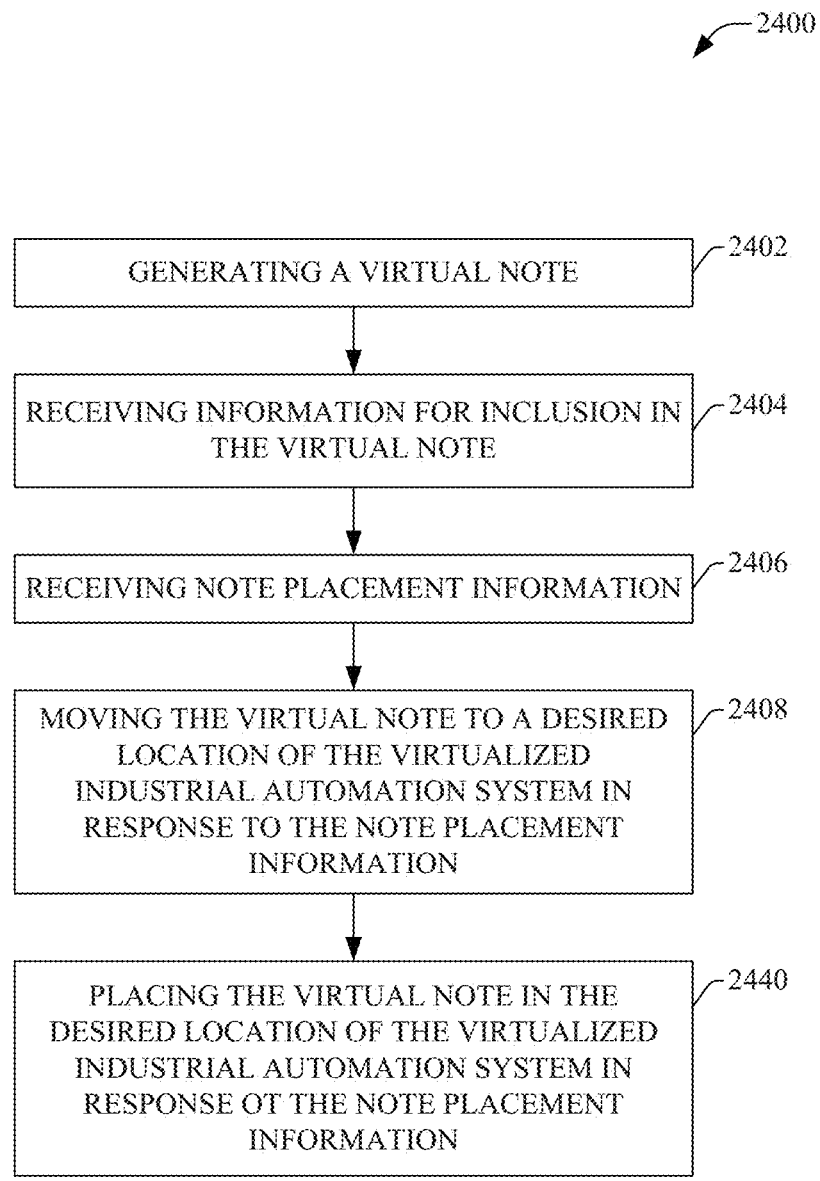
FIG. 24 illustrates a flow diagram of an example method that can facilitate associating a virtual note with a virtualized industrial automation system associated with an industrial automation system, in accordance with various implementations and embodiments of the disclosed subject matter.

FIG. 24 illustrates a flow diagram of an example method 2400 that can facilitate associating a virtual note with a virtualized industrial automation system associated with an industrial automation system, in accordance with various implementations and embodiments of the disclosed subject matter. The method 2400 can be implemented by a virtualization system that can comprise a virtualization component that can comprise a collection component, a data store, and/or a virtualization management component, etc. All or a desired portion of the virtualization component can reside in a cloud platform.

At 2402, a virtual note can be generated. A user can use a communication device to interact with the application or service associated with the virtualized industrial automation system to, for example, select a note generation control to facilitate generating a virtual note. The virtualization management component can receive information relating to the selection of the note generation control from the communication device. The virtualization management component can generate the virtual note in response to the selection of the note generation control.

At 2404, information for inclusion in the virtual note can be received. The user can use the communication device to input (e.g., enter) information that the user desires to include in the virtual note. The communication device can communicate such information for the virtual note to the virtualization management component. The virtualization management component can receive the information that is to be included in the virtual note and can insert such information in the virtual note.

At 2406, note placement information can be received. The user can use the communication device to input (e.g., enter) note placement information that can facilitate placing the virtual note in a desired location of the virtualized industrial automation system. The note placement information can comprise keystrokes, user gestures (e.g., touch screen gestures), mouse movement and/or clicks, and/or drag-and-drop information, for example. For instance, the user can drag (e.g., via touch screen gesture, or mouse movement and/or click) the virtual note across the virtualized industrial automation system to a desired location of the virtualized industrial automation system where the user desires to place the virtual note on the virtualized industrial automation system. Such actions by the user can facilitate generating the note placement information. The communication device can communicate the note placement information to the virtualization management component.

At 2408, the virtual note can be moved to a desired location of the virtualized industrial automation system in response to the note placement information. At 2410, the virtual note can be placed in the desired location of the virtualized industrial automation system in response of the note placement information. In response to the note placement information, the virtualization management component can move the virtual note to the desired location of the virtualized industrial automation system and can place the virtual note in the desired location of the virtualized industrial automation system. For example, as the note placement information is being generated by the communication device, the generated note placement information can be communicated to the virtualization management component. In response to the generated note placement information, the virtualization management component can move the virtual note in relation to the virtualized industrial automation system, and can communicate information relating to such movement to the communication to facilitate showing, on the display screen of the communication device, the virtual note being moved in relation to the virtualized industrial automation system. This can continue until the virtual note is placed in the desired location of the virtualized industrial automation system, in accordance with the note placement information.

Embodiments, systems, and components described herein, as well as industrial automation or control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 25:
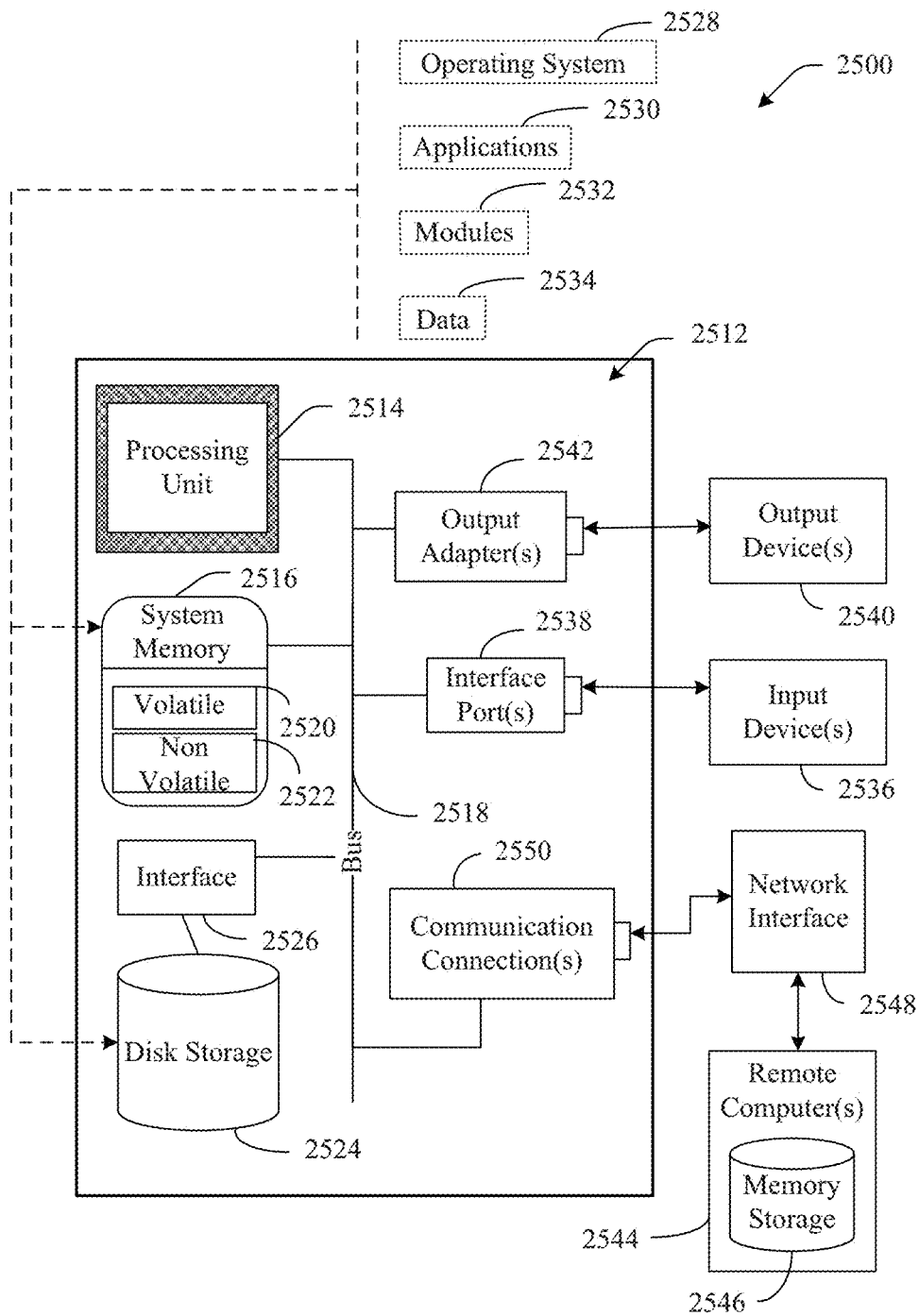
FIG. 25 is an example computing and/or operating environment.
Figure 26:
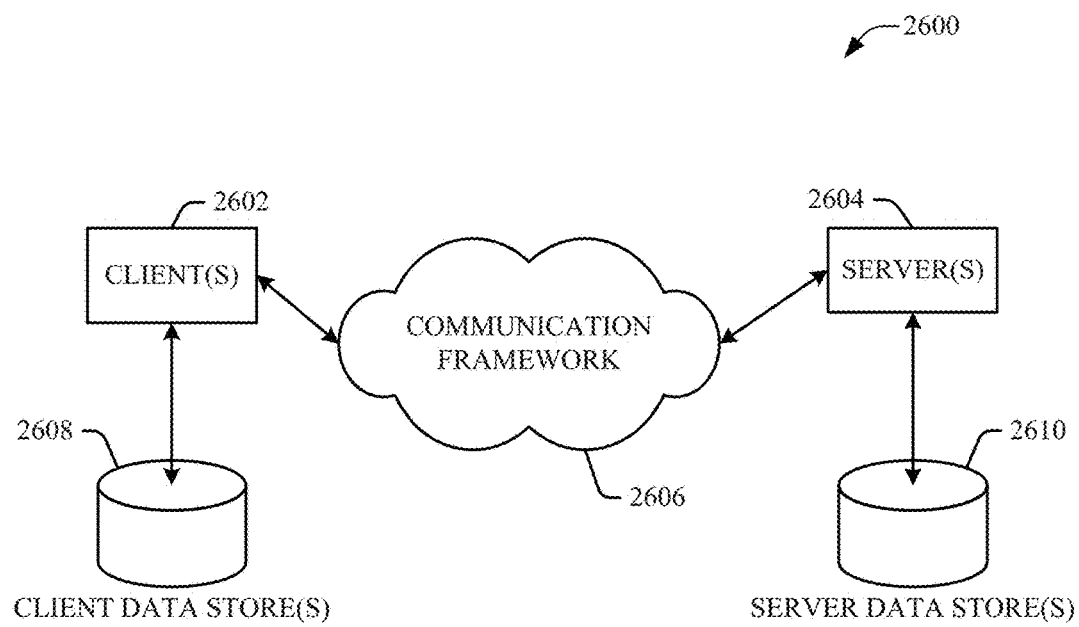
FIG. 26 is an example computing and/or networking environment.

In order to provide a context for the various aspects of the disclosed subject matter, FIGS. 25 and 26 as well as the following discussion are intended to provide a brief, general description of a suitable environment in which the various aspects of the disclosed subject matter can be implemented.

With reference to FIG. 25, an example environment 2500 for implementing various aspects of the aforementioned subject matter includes a computer 2512. The computer 2512 includes a processing unit 2514, a system memory 2516, and a system bus 2518. The system bus 2518 couples system components including, but not limited to, the system memory 2516 to the processing unit 2514. The processing unit 2514 can be any of various available processors. Multicore microprocessors and other multiprocessor architectures also can be employed as the processing unit 2514.

The system bus 2518 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2516 includes volatile memory 2520 and nonvolatile memory 2522. The basic input/output system (BIOS), containing the basic routines to transfer information between elements within the computer 2512, such as during start-up, is stored in nonvolatile memory 2522. By way of illustration, and not limitation, nonvolatile memory 2522 can include read only memory (ROM), programmable ROM (PROM), electrically programmable ROM (EPROM), electrically erasable PROM (EEPROM), or flash memory. Volatile memory 2520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2512 also includes removable/non-removable, volatile/nonvolatile computer storage media. FIG. 25 illustrates, for example a disk storage 2524. Disk storage 2524 includes, but is not limited to, devices like a magnetic disk drive, floppy disk drive, tape drive, Jaz drive, Zip drive, LS-100 drive, flash memory card, or memory stick. In addition, disk storage 2524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2524 to the system bus 2518, a removable or non-removable interface is typically used such as interface 2526.

It is to be appreciated that FIG. 25 describes software that acts as an intermediary between users and the basic computer resources described in suitable operating environment

2500. Such software includes an operating system 2528. Operating system 2528, which can be stored on disk storage 2524, acts to control and allocate resources of the computer 2512. System applications 2530 take advantage of the management of resources by operating system 2528 through program modules 2532 and program data 2534 stored either in system memory 2516 or on disk storage 2524. It is to be appreciated that one or more embodiments of the subject disclosure can be implemented with various operating systems or combinations of operating systems.

A user enters commands or information into the computer 2512 through input device(s) 2536. Input devices 2536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2514 through the system bus 2518 via interface port(s) 2538. Interface port(s) 2538 include, for example, a serial port, a parallel port, a game port, and a universal serial bus (USB). Output device(s) 2540 use some of the same type of ports as input device(s) 2536. Thus, for example, a USB port may be used to provide input to computer 2512, and to output information from computer 2512 to an output device 2540. Output adapters 2542 are provided to illustrate that there are some output devices 2540 like monitors, speakers, and printers, among other output devices 2540, which require special adapters. The output adapters 2542 include, by way of illustration and not limitation, video and sound cards that provide a means of connection between the output device 2540 and the system bus 2518. It should be noted that other devices and/or systems of devices provide both input and output capabilities such as remote computer(s) 2544.

Computer 2512 can operate in a networked environment using logical connections to one or more remote computers, such as remote computer(s) 2544. The remote computer(s) 2544 can be a personal computer, a server, a router, a network PC, a workstation, a microprocessor based appliance, a peer device or other common network node and the like, and typically includes many or all of the elements described relative to computer 2512. For purposes of brevity, only a memory storage device 2546 is illustrated with remote computer(s) 2544. Remote computer(s) 2544 is logically connected to computer 2512 through a network interface 2548 and then physically connected via communication connection 2550. Network interface 2548 encompasses communication networks such as local-area networks (LAN) and wide-area networks (WAN). LAN technologies include Fiber Distributed Data Interface (I-DDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2550 refers to the hardware/software employed to connect the network interface 2548 to the system bus 2518. While communication connection 2550 is shown for illustrative clarity inside computer 2512, it can also be external to computer 2512. The hardware/software necessary for connection to the network interface 2548 includes, for exemplary purposes only, internal and external technologies such as, modems including regular telephone grade modems, cable modems and DSL modems, ISDN adapters, and Ethernet cards.

FIG. 26 is a schematic block diagram of a sample computing and/or networking environment 2600 with which the disclosed subject matter can interact. The computing and/or networking environment 2600 can include one or more clients 2602. The client(s) 2602 can be hardware and/or software (e.g., threads, processes, computing devices). The computing and/or networking environment 2600 also can include one or more servers 2604. The server(s) 2604 can also be hardware and/or software (e.g., threads, processes, computing devices). The servers 2604 can house threads to perform transformations by employing one or more embodiments as described herein, for example. One possible communication between a client 2602 and servers 2604 can be in the form of a data packet adapted to be transmitted between two or more computer processes. The computing and/or networking environment 2600 can include a communication framework 2606 that can be employed to facilitate communications between the client(s) 2602 and the server(s) 2604. The client(s) 2602 are operably connected to one or more client data stores 2608 that can be employed to store information local to the client(s) 2602. Similarly, the server(s) 2604 are operably connected to one or more server data stores 2610 that can be employed to store information local to the servers 2604.

What has been described above includes examples of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

It is to be appreciated and understood that components (e.g., virtualization component, collection component, virtualization management component, processor component, data store, etc.), as described with regard to a particular system or method, can include the same or similar functionality as respective components (e.g., respectively named components or similarly named components) as described with regard to other systems or methods disclosed herein.

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A cloud-based system, comprising:
a memory that stores computer-executable components;
a processor, operatively coupled to the memory, that executes computer-executable components, the computer-executable components comprising:
a virtualization management component configured to:
generate a virtualized industrial automation system that corresponds to and interfaces with an industrial automation system in a facility, based on a result of an analysis of industrial data collected from the industrial automation system and data relating to a user, wherein the virtualized industrial automation system facilitates remotely interacting with the industrial automation system in response to an interaction by the user with the virtualized industrial automation system; and
remotely control the industrial automation system in response to the interaction with the virtualized industrial automation system, wherein the remote control via the interaction is enabled for a first set of control commands with respect to a first portion of the virtualized industrial automation system that corresponds to a second portion of the industrial automation system, wherein the second portion is within a defined distance of a current physical location of the user in the facility, and wherein the remote control is further enabled for a second set of control commands for a third portion of the virtualized industrial automation system that corresponds to a fourth portion of the industrial automation system, wherein the fourth portion is outside of the defined distance of the current physical location of the user in the facility, and wherein the second set of commands comprises less than all of the first set of control commands.

2. The cloud-based system of claim 1, further comprising a collection component configured to collect the industrial data from a set of industrial devices of the industrial automation system.

3. The cloud-based system of claim 2, further comprising an interface component configured to interface the cloud-based system with the industrial automation system via a cloud gateway device of the industrial automation system to facilitate communication of the industrial data from the industrial automation system to at least one of the collection component or the virtualization management component.

4. The cloud-based system of claim 1, wherein the virtualization management component is further configured to determine the data relating to the user comprising the current physical location of the user is based upon location information of a mobile device associated with the user.

5. The cloud-based system of claim 1, wherein the virtualization management component is further configured to determine the data relating to the user comprising the current physical location of the user based upon location information of a radio-frequency identification tag associated with the user.

6. The cloud-based system of claim 1, wherein the virtualized industrial automation system comprises a customization of a view of the first portion of the virtualized industrial automation system that corresponds to the second portion of the industrial automation system.

7. The cloud-based system of claim 6, wherein the customization of the view comprises a customized subset of operational data to overlay on the view of the virtualized industrial automation system based on the second portion of the industrial automation system within the defined distance of the current physical location of the user.

8. A method, comprising:
generating, by a cloud-based system comprising a processor, a virtualized industrial automation system that corresponds to a portion of an industrial automation system in a facility, based on a result of analyzing industrial data collected from the industrial automation system and data relating to a user, to facilitate remotely interacting with the industrial automation system in response to an interaction with the virtualized industrial automation system; and
remotely controlling, by the cloud-based system, the industrial automation system in response to the interaction with the virtualized industrial automation system, wherein the remote control via the interaction is enabled for a first set of control commands with respect to a first portion of the virtualized industrial automation system that corresponds to a second portion of the industrial automation system, wherein the second portion is within a defined distance of a current physical location of the user in the facility, and wherein the remote control is further enabled for a second set of control commands for a third portion of the virtualized industrial automation system that corresponds to a fourth portion of the industrial automation system, wherein the fourth portion is outside of the defined distance of the current physical location of the user in the facility, and wherein the second set of commands comprises less than all of the first set of control commands.

9. The method of claim 8, further comprising receiving, by the cloud-based system, the industrial data from a set of industrial devices of the industrial automation system.

10. The method of claim 8, further comprising determining, by the cloud-based system, the data relating to the user comprising the current physical location of the user based upon location information of a mobile device associated with the user.

11. The method of claim 8, further comprising determining, by the cloud-based system, the data relating to the user comprising the current physical location of the user is based upon location information of a radio-frequency identification tag associated with the user.

12. The method of claim 8, further comprising generating, by the cloud-based system, a customized view of the virtualized industrial automation system comprising a customization of a view of the first portion of the virtualized industrial automation system that corresponds to the second portion of the industrial automation system.

13. The method of claim 12, wherein the customization of the view comprises a customized subset of operational data overlaid on the view of the virtualized industrial automation system based on the second portion of the industrial automation system within the defined distance of the current physical location of the user.

14. The method of claim 13, further comprising:
communicating, by the system, the customized view of the virtualized industrial automation system with the customized subset of operational data overlaid thereon to a communication device of the user for display on the communication device.

15. A non-transitory computer-readable medium storing computer-executable instructions that, in response to execution, cause a cloud-based system comprising a processor to perform operations, comprising:
generating a virtualized industrial automation system that corresponds to a portion of an industrial automation system in a facility, based on a result of analyzing industrial data collected from the industrial automation system and data relating to a user, to facilitate remotely interacting with the industrial automation system in response to an interaction with the virtualized industrial automation system; and
remotely controlling the industrial automation system in response to the interaction with the virtualized industrial automation system, wherein the remote control via the interaction is enabled for a first set of control commands with respect to a first portion of the virtualized industrial automation system that corresponds to a second portion of the industrial automation system, wherein the second portion is within a defined distance of a current physical location of the user in the facility, and wherein the remote control is further enabled for a second set of control commands for a third portion of the virtualized industrial automation system that corresponds to a fourth portion of the industrial automation system, wherein the fourth portion is outside of the defined distance of the current physical location of the user in the facility, and wherein the second set of commands comprises less than all of the first set of control commands.

16. The non-transitory computer-readable medium of claim 15, the operations further comprising receiving the industrial data from a set of industrial devices of the industrial automation system.

17. The non-transitory computer-readable medium of claim 15, the operations further comprising determining the data relating to the user comprising the current physical location of the user based upon location information of a mobile device associated with the user.

18. The non-transitory computer-readable medium of claim 15, the operations further comprising determining the data relating to the user comprising the current physical location of the user is based upon location information of a radio-frequency identification tag associated with the user.

19. The non-transitory computer-readable medium of claim 15, the operations further comprising generating a customized view of the virtualized industrial automation system comprising a customization of a view of the first portion of the virtualized industrial automation system that corresponds to the second portion of the industrial automation system, wherein the customization of the view comprises a customized subset of operational data overlaid on the view of the virtualized industrial automation system based on the second portion of the industrial automation system within the defined distance of the current physical location of the user.

20. The non-transitory computer-readable medium of claim 19, the operations further comprising:
communicating, by the system, the customized view of the virtualized industrial automation system with the customized subset of operational data overlaid thereon to a communication device of the user for display on the communication device.

* * * * *